(12) United States Patent
Soldati et al.

(10) Patent No.: US 12,556,940 B2
(45) Date of Patent: Feb. 17, 2026

(54) REQUESTING A CONFIGURATION CHANGE FOR A RADIO ACCESS NETWORK NODE

(71) Applicant: Telefonaktiebolaget LM Ericsson (publ), Stockholm (SE)

(72) Inventors: Pablo Soldati, Solna (SE); Luca Lunardi, Genoa (IT); Angelo Centonza, Torrenueva Costa (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 426 days.

(21) Appl. No.: 18/019,649

(22) PCT Filed: Aug. 5, 2021

(86) PCT No.: PCT/SE2021/050773
§ 371 (c)(1),
(2) Date: Feb. 3, 2023

(87) PCT Pub. No.: WO2022/031210
PCT Pub. Date: Feb. 10, 2022

(65) Prior Publication Data
US 2024/0259837 A1 Aug. 1, 2024

Related U.S. Application Data

(60) Provisional application No. 63/062,169, filed on Aug. 6, 2020.

(51) Int. Cl.
*H04W 24/02* (2009.01)
*H04W 16/28* (2009.01)
(52) U.S. Cl.
CPC .......... *H04W 24/02* (2013.01); *H04W 16/28* (2013.01)

(58) Field of Classification Search
CPC ..... H04W 24/02; H04W 16/10; H04W 16/28; H04W 92/20; H04L 5/005; H04L 5/0096
See application file for complete search history.

(56) References Cited

U.S. PATENT DOCUMENTS

| 12,317,094 B2* | 5/2025 | Jin | H04W 24/02 |
| 2010/0210255 A1* | 8/2010 | Amirijoo | H04W 74/002 455/419 |

(Continued)

FOREIGN PATENT DOCUMENTS

| EP | 2373076 A1 | 10/2011 |
| EP | 3229515 A1 | 10/2017 |

(Continued)

OTHER PUBLICATIONS

International Search Report and Written Opinion of the International Searching Authority, PCT/SE2021/050773, mailed Nov. 10, 2021, 15 pages.

(Continued)

*Primary Examiner* — Siu M Lee
(74) *Attorney, Agent, or Firm* — Sage Patent Group

(57) ABSTRACT

A first network node in a network including a second network node can, responsive to detecting a capacity issue and/or a coverage issue, transmit a configuration update request message to the second network node. The configuration update request message includes an indication of a requested configuration change for the second network node. The first network node can receive a configuration update message from the second network node. The configuration update message can include an indication of a configuration update selected by the second network node.

20 Claims, 47 Drawing Sheets

(56) References Cited

U.S. PATENT DOCUMENTS

| | | | | |
|---|---|---|---|---|
| 2019/0349819 A1* | 11/2019 | Xu | ............... | H04B 7/0695 |
| 2023/0171810 A1* | 6/2023 | Belleschi | ............ | H04W 74/0833 |
| | | | | 370/329 |

FOREIGN PATENT DOCUMENTS

| | | | |
|---|---|---|---|
| EP | 3550889 A1 | 10/2019 | |
| JP | 2017516360 A | 6/2017 | |
| JP | 2020092453 A | 6/2020 | |
| WO | 2013136812 A1 | 9/2013 | |
| WO | 2014034118 A1 | 3/2014 | |
| WO | 2014162722 A1 | 10/2014 | |
| WO | WO-2015195005 A1 * | 12/2015 | ............ H04W 24/02 |
| WO | 2016059867 A1 | 4/2016 | |
| WO | 2021034254 A1 | 2/2021 | |

OTHER PUBLICATIONS

Ericsson, "Solution for RACH Conflict Detection and Resolution at gNB-DU," 3GPP TSG-RAN3 #107bis-e, R3-202266, Online, Apr. 20-30, 2020, 97 pages.

Ericsson, "(TP for SON BL CR for TS 38.423, TS 38.473, TS 38.300): CCO," 3GPP TSG-RAN WG3 Meeting #110-e, R3-206514, Online, Nov. 2-12, 2020, 41 pages.

3GPP TS 36.300 v16.2.0 (Jul. 2020); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), 390 pages.

ETSI TS 138 331 v16.1.0 (Jul. 2020); Technical Specification; 5G; NR; Radio Resource Control (RRC); Protocol specification (3GPP TS 38.331 version 16.1.0 Release 16), 886 pages.

3GPP TS 38.213 v16.2.0 (Jun. 2020); 3rd Generation Partnership Project; Technical Specification Group Radio Access Network; NR; Physical layer procedures for control (Release 16), 176 pages.

ETSI TS 138 214 v16.2.0 (Jul. 2020); Technical Specification; 5G; NR; Physical layer procedures for data (3GPP TS 38.214 version 16.2.0 Release 16), 167 pages.

3GPP TS 36.423 v16.2.0 (Jul. 2020); 3rd Generation Partnership Project; Technical Specification Group Radio Access Network; Evolved Universal Terrestrial Radio Access Network (E-UTRAN); X2 application protocol (X2AP) (Release 16), 489 pages.

3GPP TS 37.340 v16.2.0 (Jul. 2020); 3rd Generation Partnership Project; Technical Specification Group Radio Access Network; Evolved Universal Terrestrial Radio Access (E-UTRA) and NR; Multi-connectivity; Stage 2 (Release 16), 78 pages.

3GPP TS 38.300 v16.2.0 (Jul. 2020); 3rd Generation Partnership Project; Technical Specification Group Radio Access Network; NR; NR and NG-RAN Overall Description; Stage 2 (Release 16), 148 pages.

3GPP TS 38.401 v16.2.0 (Jul. 2020); 3rd Generation Partnership Project; Technical Specification Group Radio Access Network; NG-RAN; Architecture description (Release 16), 77 pages.

3GPP TS 38.473 v16.2.0 (Jul. 2020); 3rd Generation Partnership Project; Technical Specification Group Radio Access Network; NG-RAN; F1 application protocol (F1AP) (Release 16), 363 pages.

3GPP TS 38.472 v16.0.0 (Jul. 2020); 3rd Generation Partnership Project; Technical Specification Group Radio Access Network; NG-RAN; F1 signalling transport (Release 16), 9 pages.

3GPP TS 38.401 v15.4.0 (Dec. 2018); 3rd Generation Partnership Project; Technical Specification Group Radio Access Network; NG-RAN; Architecture description (Release 15), 40 pages.

3GPP TS 36.300 v15.10.0 (Jul. 2020); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 365 pages.

3GPP TS 38.423 v16.2.0 (Jul. 2020); 3rd Generation Partnership Project; Technical Specification Group Radio Access NetWork; NG-RAN; Xn application protocol (XnAP) (Release 16), 447 pages.

Ericsson, "Scope of Coverage and Capacity Optimisation Solution for NR", 3GPP TSG RAN WG3 #104, R3-193068, Reno, Nevada, US, May 13-May 17, 2019.

* cited by examiner

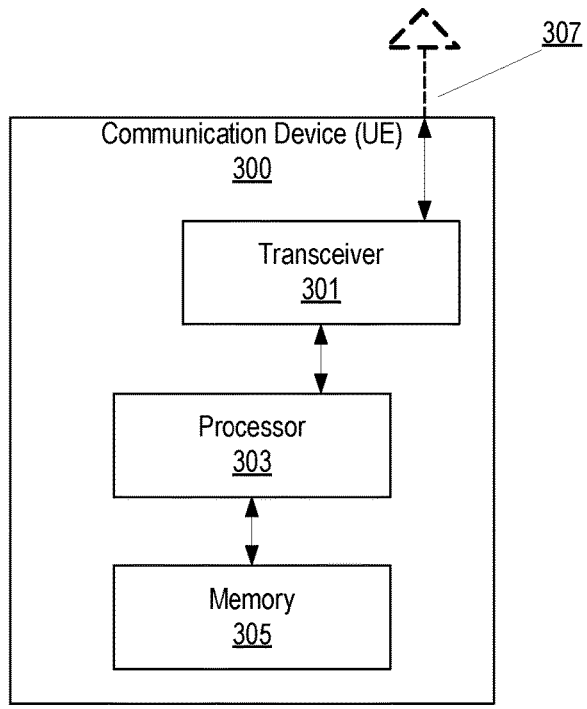
FIG. 32
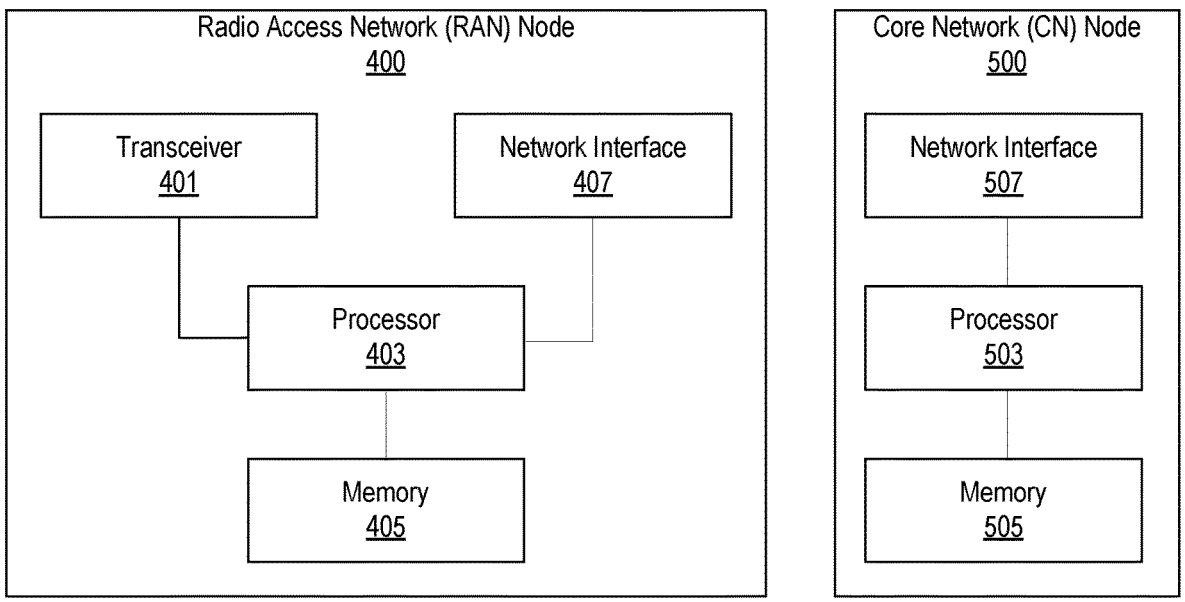
FIG. 33
FIG. 34

| First Network Node | Second Network Node | Signaling Interface |
|---|---|---|
| NG-RAN node | NG-RAN node | Xn |
| NG-RAN node | eNB | X2 |
| eNB | NG-RAN node / en-gNG | X2 |
| gNB-CU | gNB-DU | F1 |
| gNB-CU | eNB | X2 |
| eNB | gNB-CU | X2 |

FIG. 37

| Elementary Procedure | Initiating Message |
|---|---|
| Load Indication | LOAD INFORMATION |
| Handover Cancel | HANDOVER CANCEL |
| SN Status Transfer | SN STATUS TRANSFER |
| UE Context Release | UE CONTEXT RELEASE |
| Resource Status Reporting | RESOURCE STATUS UPDATE |
| Error Indication | ERROR INDICATION |
| Radio Link Failure Indication | RLF INDICATION |
| Handover Report | HANDOVER REPORT |
| X2 Release | X2 RELEASE |
| X2AP Message Transfer | X2AP MESSAGE TRANSFER |
| SeNB Reconfiguration Completion | SENB RECONFIGURATION COMPLETE |
| MeNB initiated SeNB Release | SENB RELEASE REQUEST |
| SeNB Counter Check | SENB COUNTER CHECK REQUEST |
| SgNB Reconfiguration Complete | SGNB RECONFIGURATION COMPLETE |
| SgNB Counter Check | SGNB COUNTER CHECK REQUEST |
| RRC Transfer | RRC TRANSFER |
| Secondary RAT Data Usage Report | SECONDARY RAT DATA USAGE REPORT |
| SgNB Activity Notification | SGNB ACTIVITY NOTIFICATION |
| Data Forwarding Address Indication | DATA FORWARDING ADDRESS INDICATION |
| gNB Status Indication | GNB STATUS INDICATION |
| EN-DC Configuration Transfer | EN-DC CONFIGURATION TRANSFER |
| Trace Start | TRACE START |
| Deactivate Trace | DEACTIVATE TRACE |
| Handover Success | HANDOVER SUCCESS |
| Conditional Handover Cancel | CONDITIONAL HANDOVER CANCEL |
| Early Status Transfer | EARLY STATUS TRANSFER |
| EN-DC Resource Status Reporting | EN-DC RESOURCE STATUS UPDATE |
| Cell Traffic Transfer | CELL TRAFFIC TRACE |
| F1-C Traffic Transfer | F1-C TRAFFIC TRANSFER |
| EN-DC Configuration Request | EN-DC CONFIGURATION REQUEST |

FIG. 38

| IE/Group Name | Presence | IE type and reference | Semantics Description | Criticality | Assigned Criticality |
|---|---|---|---|---|---|
| Message Type | M | 9.2.3.1 | | YES | Reject |
| Transaction ID | M | 9.2.3.23 | | YES | Reject |
| CHOICE Configuration Update Request Type | M | | | YES | Reject |
| >CCO Issue detection | M | ENUMERATED (capacity,coverage,imbalance ....) | Indicates which type of CCO issue has been detected | YES | Ignore |

FIG. 39

| IE/Group Name | Presence | Range | IE type and reference | Semantics Description | Criticality | Assigned Criticality |
|---|---|---|---|---|---|---|
| Message Type | M | | 9.2.13 | | YES | Reject |
| CHOICE Initiating NodeType | M | | | | YES | Reject |
| >eNB | | | | | | |
| >>Cell Assistance Information | O | | 9.2.115 | | YES | Reject |
| >>Served E-UTRA Cells To Add | | 0..<maxCellineNB> | | | GLOBAL | Reject |
| >>>Served E-UTRA Cell Information | M | | Served Cell Information 9.2.8 | | - | |
| >>>NR Neighbour Information | O | | 9.2.98 | NR neighbors | - | |
| >>Served E-UTRA Cells To Modify | | 0..<maxCellineNB> | | | GLOBAL | Reject |
| >>>Old ECGI | M | | ECGI 9.2.14 | Old E-UTRAN Cell Global Identifier | - | |
| >>>Served E-UTRA Cell Information | M | | Served Cell Information 9.2.8 | | - | |
| >>>NR Neighbour Information | O | | 9.2.98 | NR neighbours | - | |
| >>Served E-UTRA Cells To Delete | | 0..<maxCellineNB> | | Complete list of deleted cells served by the eNB | GLOBAL | Reject |
| >>>Old ECGI | M | | ECGI 9.2.14 | Old E-UTRAN Cell Global Identifier of the cell to be deleted | - | |
| >> EUTRA Coverage Modification List | | 0..<maxCellineNB> | | List of E-UTRAN cells with modified coverage | GLOBAL | Reject |

FIG. 40

| IE/Group Name | Presence | Range | IE type and reference | Semantics Description | Criticality | Assigned Criticality |
|---|---|---|---|---|---|---|
| >>> ECGI | M | | ECGI 9.2.14 | E-UTRAN Cell Global Identifier of the cell to be modified | - | - |
| >>> EUTRA Cell Coverage State | M | | INTEGER (0..15, ...) | Value '0' indicates that the cell is inactive. Other values Indicates that the cell is active and also indicates the coverage configuration of the concerned cell | - | - |
| >>> EUTRA Cell Deployment Status Indicator | O | | ENUMERATED( pre-change-notification, ...) | Indicates the Cell Coverage State is planned to be used at the next reconfiguration | - | - |
| >>> EUTRA Cell Replacing Info | C-ifCellDeploymentStatusIndicatorPresent | | | | - | - |
| >>>> EUTRA Replacing Cells | | 0..<maxCellineNB> | | | - | - |
| >>>>> ECGI | | | ECGI 9.2.14 | E-UTRAN Cell Global Identifier of a cell that may replace all or part of the coverage of the cell to be modified | - | - |
| >en-gNB | | | | | | |
| >>Served NR Cells To Add | | 0..<maxCellinengNB> | | | GLOBAL | Reject |
| >>>Served NR Cell Information | M | | 9.2.110 | | - | - |
| >>>NR Neighbour Information | O | | 9.2.98 | NR neighbors | - | - |

FIG. 40 (Cont. 1)

| IE/Group Name | Presence | Range | IE type and reference | Semantics Description | Criticality | Assigned Criticality |
|---|---|---|---|---|---|---|
| >>Served NR Cells To Modify | | 0 .. <maxCellinengNB> | | | GLOBAL | Reject |
| >>>Old NR-CGI | M | | NR CGI 9.2.111 | | - | |
| >>>Served NR Cell Information | M | | 9.2.110 | | - | |
| >>>NR Neighbour Information | O | | 9.2.98 | NR neighbors | | |
| >>>NR Deactivation Indication | O | | ENUMERATED( deactivated, ...) | Indicates that the concerned NR cell is switched off for energy saving reasons. If this IE is not included, indicates that the concerned cell is activated. | YES | Ignore |
| >>Served NR Cells To Delete | | 0 .. <maxCellinengNB> | | | GLOBAL | Reject |
| >>>Old NR-CGI | M | | NR CGI 9.2.111 | | - | |
| >> NG-RAN Coverage Modification List | | 0 .. < maxnoofCellsinNG-RANnode > | | List of NR cells with modified coverage | GLOBAL | Reject |
| >>> NR Cell Global ID | M | | NR CGI 9.2.3.25 | NR Cell Global Identifier of the cell to be modified | - | |
| >>> NR Cell Coverage State | M | | INTEGER (0..15, ...) | Value '0' indicates that the cell is inactive. Other values Indicates that the cell is active and also indicates the coverage configuration of the concerned cell | - | |

FIG. 40 (Cont. 2)

| IE/Group Name | Presence | Range | IE type and reference | Semantics Description | Criticality | Assigned Criticality |
|---|---|---|---|---|---|---|
| >>> NG-RAN Deployment Status Indicator | O | | ENUMERATED(pre-change-notification, ...) | Indicates that the NR Cell Coverage State is planned to be used at the next reconfiguration | - | - |
| >>> NG-RAN Replacing Info | C-ifNGRANDeploymentStatusIndicatorPresent | | | | - | - |
| >>>> Replacing NR Cells | | 0..< maxnoofCellsinNG-RANnode > | | | - | - |
| >>>>> NR Cell Global ID | | | NR CGI 9.2.3.25 | NR Cell Global Identifier of a cell that may replace all or part of the coverage of the cell to be modified | - | - |
| Interface Instance Indication | O | | 9.2.143 | | YES | Reject |
| TNL Transport Layer Address info | O | | 9.2.149 | | YES | Ignore |
| TNLA To Add List | | 0..1 | | | YES | Ignore |
| >TNLA To Add Item IEs | | 1..<maxnoofTNLAssociations> | | | - | - |
| >>TNLA Transport Layer Information | M | | 9.2.150 | CP Transport Layer Information of the en-gNB | - | - |
| >>TNLA Usage | M | | 9.2.151 | | - | - |
| TNLA To Update List | | 0..1 | | | YES | Ignore |

FIG. 40 (Cont. 3)

| IE/Group Name | Presence | Range | IE type and reference | Semantics Description | Criticality | Assigned Criticality |
|---|---|---|---|---|---|---|
| >TNLA To Update Item IEs | | 1..<maxnoofTNL Associations> | | | - | - |
| >>TNLA Transport Layer Information | M | | 9.2.150 | CP Transport Layer Information of the en-gNB | - | - |
| >>TNLA Usage | O | | 9.2.151 | | - | - |
| TNLA To Remove List | | 0..1 | | | YES | Ignore |
| >TNLA To Remove Item IEs | | 1..<maxnoofTNL Associations> | | | - | - |
| >>TNLA Transport Layer Information | M | | 9.2.150 | CP Transport Layer Information of the en-gNB | - | - |

FIG. 40 (Cont. 4)

| Range bound | Explanation |
|---|---|
| maxCellineNB | Maximum no. cells that can be served by an eNB. Value is 256. |
| maxCellinengNB | Maximum no. cells that can be served by an en-gNB. Value is 16384. |
| maxnoofTNLAssociations | Maximum numbers of TNL Associations between the eNB and the en-gNB. Value is 32. |
| maxnoofCellsinNG-RANnode | Maximum no. cells that can be served by an NG-RAN node. Value is 16384. |

FIG. 41

| Condition | Explanation |
|---|---|
| ifCellDeploymentStatusIndicatorPresent | This IE shall be present if the *Cell Deployment Status Indicator* IE is present. |
| ifNGRANDeploymentStatusIndicatorPresent | This IE shall be present if the *NG-RAN Deployment Status Indicator* IE is present. |

FIG. 42

| IE/Group Name | Presence | Range | IE type and reference | Semantics Description | Criticality | Assigned Criticality |
|---|---|---|---|---|---|---|
| NR Neighbour Information | | | | | - | |
| >NR Neighbour Information Item | | 1 .. <maxnoofNRNeighbours> | | | - | |
| >>NRPCI | M | | INTEGER (0..1007) | NR Physical Cell ID | - | |
| >>NR CGI | M | | 9.2.111 | | - | |
| >>5GS-TAC | O | | OCTET STRING (3) | Broadcast 5GS Tracking Area Code | - | |
| >>Configured TAC | O | | OCTET STRING (2) | This is the TAC configured in the en-gNB, different from the 5GS TAC broadcast in the NR cell and enables application of Roaming and Access Restrictions for EN-DC as specified in TS 37.340 [32]. | - | |

FIG. 43

| IE/Group Name | Presence | Range | IE type and reference | Semantics Description | Criticality | Assigned Criticality |
|---|---|---|---|---|---|---|
| >>Measurement Timing Configuration | M | | OCTET STRING | Contains the MeasurementTimingConfiguration inter-node message for the neighbour cell, as defined in TS 38.331 [31]. | | |
| >>Coverage Modification List NG-RAN | | 0.. <mxCellingNB> | | List of NR cells with modified coverage | GLOBAL | Reject |
| >>>NR Cell Global ID | M | | NR CGI 9.2.3.25 | NR Cell Global Identifier of the cell to be modified | - | |
| >>>Cell Coverage State NG-RAN | M | | INTEGER (0..15, ...) | Value '0' indicates that the cell is inactive. Other values Indicates that the cell is active and also indicates the coverage configuration of the concerned cell | | |
| >>>Cell Deployment Status Indicator NG-RAN | O | | ENUMERATED( pre-change-notification, ...) | Indicates the Cell Coverage State is planned to be used at the next reconfiguration | - | |
| >>>Cell Replacing Info NG-RAN | C-ifCellDeploymentStatusIndicatorPresent | | | | | |
| >>>>Replacing Cells NG-RAN | | 0.. <maxCellingNB> | | | | |
| >>>>> NR Cell Global ID | | | NR CGI 9.2.3.25 | NR Cell Global Identifier of a cell that may replace all or part of the coverage of the cell to be modified | | |

FIG. 43 (Cont. 1)

| IE/Group Name | Presence | Range | IE type and reference | Semantics Description | Criticality | Assigned Criticality |
|---|---|---|---|---|---|---|
| >>>>> SSB Index | | | INTEGER (0..63) | Identify an SSB area of an NR cell | | |
| >>CHOICE NR-Neighbour-Mode-Info | M | | | | - | |
| >>>FDD | | | | | | |
| >>>>FDD Info | | 1 | | | - | |
| >>>>>UL ARFCNFreqInfo | M | | NR ARFCN Frequency Info 9.2.106 | | - | |
| >>>>>DL ARFCNFreqInfo | M | | NR ARFCN Frequency Info 9.2.106 | | - | |
| >>>TDD | | | | | | |
| >>>>TDD Info | | 1 | | | - | |
| >>>>>ARFCNNRFreqInfo | M | | NR ARFCN Frequency Info 9.2.106 | | - | |
| >CSI-RS Transmission Indication | O | | ENUMERATED {activated, deactivated, ...} | This IE indicates the CSI-RS transmission status of the given cell. | YES | Ignore |

FIG. 43 (Cont. 2)

| Elementary Procedure | Initiating Message |
|---|---|
| Handover Cancel | HANDOVER CANCEL |
| SN Status Transfer | SN STATUS TRANSFER |
| RAN Paging | RAN PAGING |
| Xn-U Address Indication | XN-U ADDRESS INDICATION |
| S-NG-RAN node Reconfiguration Completion | S-NODE RECONFIGURATION COMPLETE |
| S-NG-RAN node Counter Check | S-NODE COUNTER CHECK REQUEST |
| UE Context Release | UE CONTEXT RELEASE |
| RRC Transfer | RRC TRANSFER |
| Error Indication | ERROR INDICATION |
| Notification Control Indication | NOTIFICATION CONTROL INDICATION |
| Activity Notification | ACTIVITY NOTIFICATION |
| Secondary RAT Data Usage Report | SECONDARY RAT DATA USAGE REPORT |
| Trace Start | TRACE START |
| Deactivate Trace | DEACTIVATE TRACE |
| Handover Success | HANDOVER SUCCESS |
| Conditional Handover Cancel | CONDITIONAL HANDOVER CANCEL |
| Early Status Transfer | EARLY STATUS TRANSFER |
| Failure Indication | FAILURE INDICATION |
| Handover Report | HANDOVER REPORT |
| Resource Status Reporting | RESOURCE STATUS UPDATE |
| Access And Mobility Indication | ACCESS AND MOBILITY INDICATION |
| NG-RAN Node Configuration Update Request | NG-RAN NODE CONFIGURATION UPDATE REQUEST |

FIG. 44

| IE/Group Name | Presence | Range | IE type and reference | Semantics Description | Criticality | Assigned Criticality |
|---|---|---|---|---|---|---|
| Message Type | M | | 9.2.3.1 | | YES | Reject |
| TAI Support List | O | | 9.2.3.20 | List of supported TAs and associated characteristics. | GLOBAL | Reject |
| CHOICE *Initiating NodeType* | M | | | | YES | Ignore |
| >gNB | | | | | | |
| >>Served Cells To Update NR | O | | 9.2.2.15 | | YES | Ignore |
| >>Cell Assistance Information NR | O | | 9.2.2.17 | | YES | Ignore |
| >NG-RAN Coverage Modification List | | 0 .. < maxnoofCellsinNG-RANnode > | | List of NR cells and SSB beams with modified coverage | GLOBAL | Reject |
| >> NR Cell Global ID | M | | NR CGI 9.2.3.25 | NR Cell Global Identifier of the cell to be modified | - | - |
| >> NR Cell Coverage State | M | | INTEGER (0..15, ...) | Value '0' indicates that the cell is inactive. Other values Indicates that the cell is active and also indicates the coverage configuration of the concerned cell | - | - |
| >> SSB Beam List | | 0 .. < maxnoofSSBBeam > | | | - | - |
| >>> SSB Beam Index | | | INTEGER (0..63) | Identify an SSB area of an NR cell | - | - |

FIG. 45

| IE/Group Name | Presence | Range | IE type and reference | Semantics Description | Criticality | Assigned Criticality |
|---|---|---|---|---|---|---|
| >>> SSB Beam Coverage State | M | | INTEGER (0..15, ...) | Value '0' indicates that the SSB beam is inactive. Other values Indicates that the SSB beam is active and also indicates the coverage configuration of the concerned SSB beam | - | - |
| >> NG-RAN Deployment Status Indicator | O | | ENUMERATED( pre-change-notification, ...) | Indicates that the NR Cell Coverage State and, if present, the SSB Beam Coverage State, is planned to be used at the next reconfiguration | - | - |
| >> NG-RAN Replacing Info | C-ifNGRANDeploymentStatusIndicatorPresent | | | | - | - |
| >>> Replacing NR Cells | | 0 .. < maxnoofCellsinNG-RANnode > | | | - | - |
| >>>> NR Cell Global ID | | | NR CGI 9.2.3.25 | NR Cell Global Identifier of a cell that may replace all or part of the coverage of the cell to be modified | - | - |
| >>>> Replacing SSB Beams | | 0 .. < maxnoofSSBBeam > | | | - | - |
| >>>>> SSB Beam Index | | | INTEGER (0..63) | Identify an SSB area of an NR cell | - | - |
| >>Served Cells to Update E-UTRA | O | | 9.2.2.16 | | YES | Ignore |

FIG. 45 (Cont. 1)

| IE/Group Name | Presence | Range | IE type and reference | Semantics Description | Criticality | Assigned Criticality |
|---|---|---|---|---|---|---|
| >>Cell Assistance Information NR | O | | 9.2.2.17 | | YES | Ignore |
| TNLA To Add List | | 0..1 | | | YES | Ignore |
| >TNLA To Add Item | | 1..<maxnoofTNL Associations> | | | - | - |
| >>TNLA Transport Layer Information | M | | CP Transport Layer Information 9.2.3.31 | CP Transport Layer Information of NG-RAN node₁ | - | - |
| >> TNL Association Usage | O | | 9.2.3.84 | | - | - |
| TNLA To Update List | | 0..1 | | | YES | Ignore |
| >TNLA To Update Item | | 1..<maxnoofTNL Associations> | | | - | - |
| >>TNLA Transport Layer Information | M | | CP Transport Layer Information 9.2.3.31 | CP Transport Layer Information of NG-RAN node₁ | - | - |
| >> TNL Association Usage | O | | 9.2.3.84 | | - | - |
| TNLA To Remove List | | 0..1 | | | YES | Ignore |
| >TNLA To Remove Item | | 1..<maxnoofTNL Associations> | | | - | - |
| >>TNLA Transport Layer Information | M | | CP Transport Layer Information 9.2.3.31 | CP Transport Layer Information of NG-RAN node₁ | - | - |
| Global NG-RAN Node ID | O | | 9.2.2.3 | | YES | Reject |

FIG. 45 (Cont. 2)

| IE/Group Name | Presence | Range | IE type and reference | Semantics Description | Criticality | Assigned Criticality |
|---|---|---|---|---|---|---|
| AMF Region Information To Add | O | | AMF Region Information 9.2.3.83 | List of all added AMF Regions to which the NG-RAN node belongs. | YES | Reject |
| AMF Region Information To Delete | O | | AMF Region Information 9.2.3.83 | List of all added AMF Regions to which the NG-RAN node belongs. | YES | Reject |
| Interface Instance Indication | O | | 9.2.2.39 | | YES | Reject |
| TNL Configuration Info | O | | 9.2.3.96 | | YES | Ignore |

FIG. 45 (Cont. 3)

| Range bound | Explanation |
|---|---|
| maxnoofTNLAssociations | Maximum numbers of TNL Associations between the NG RAN nodes. Value is 32. |
| maxnoofCellsinNG-RANnode | Maximum no. cells that can be served by an NG-RAN node. Value is 16384. |

FIG. 46

| Condition | Explanation |
|---|---|
| ifNGRANDeploymentStatusIndicatorPresent | This IE shall be present if the *NG-RAN Deployment Status Indicator* IE is present. |

FIG. 47

| IE/Group Name | Presence | Range | IE type and reference | Semantics Description | Criticality |
|---|---|---|---|---|---|
| 1> Message Type | 2> M | 3> | 4> 9.3.1.1 | 5> | YES |
| 6> Transaction ID | 7> M | 8> | 9> 9.3.1.23 | 10> | YES |
| Served Cells To Add List | | 0..1 | | Complete list of added cells served by the gNB-DU | YES |
| >Served Cells To Add Item | | 1.. <maxCellingNBDU> | | | EACH |
| >>Served Cell Information | M | | 9.3.1.10 | Information about the cells configured in the gNB-DU | - |
| >>gNB-DU System Information | O | | 9.3.1.18 | RRC container with system information owned by gNB-DU | - |
| Served Cells To Modify List | | 0..1 | | Complete list of modified cells served by the gNB-DU | YES |
| >Served Cells To Modify Item | | 1.. <maxCellingNBDU> | | | EACH |
| >>Old NR CGI | M | | NR CGI 9.3.1.12 | | - |
| >>Served Cell Information | M | | 9.3.1.10 | Information about the cells configured in the gNB-DU | - |
| >>gNB-DU System Information | O | | 9.3.1.18 | RRC container with system information owned by gNB-DU | - |
| Served Cells To Delete List | | 0..1 | | Complete list of deleted cells served by the gNB-DU | YES |
| >Served Cells To Delete Item | | 1.. <maxCellingNBDU> | | | EACH |
| >>Old NR CGI | M | | NR CGI 9.3.1.12 | | - |
| Cells Status List | 11> M | 12> 0..1 | 13> | 14> Complete list of active cells | YES |

FIG. 48

| IE/Group Name | Presence | Range | IE type and reference | Semantics Description | Criticality |
|---|---|---|---|---|---|
| > Cells Status Item | | 16> 0..<maxCellingNBDU> | 17> | 18> | EACH |
| >> NR CGI | M | 20> | 21> 9.3.1.12 | 22> | - |
| >>Service Status | M | 24> | 25> 9.3.1.68 | 26> | - |
| Dedicated SI Delivery Needed UE List | O | 28> 0..1 | 29> | 30> List of UEs unable to receive system information from broadcast | YES |
| > Dedicated SI Delivery Needed UE Item | | 32> 1..<maxnoofUEIDs> | 33> | 34> | EACH |
| >>gNB-CU UE F1AP ID | M | 36> | 37> 9.3.1.4 | 38> | - |
| >>NR CGI | M | 40> | 41> 9.3.1.12 | 42> | - |
| 43> gNB-DU ID | O | 45> | 46> 9.3.1.9 | 47> | YES |
| 48> gNB-DU TNL Association To Remove List | | 50> 0..1 | 51> | 52> | YES |
| >gNB-DU TNL Association To Remove Item IEs | | 54> 1..<maxnoofTNLAssociation> | 55> | 56> | EACH |
| >>TNL Association Transport Layer Address | M | 58> | 59> 1> CP Transport Layer Address 9.3.2.4 | 61> Transport Layer Address of the gNB-DU. | - |
| >>TNL Association Transport Layer Address gNB-CU | O | 63> | 64> 1> CP Transport Layer Address 9.3.2.4 | 66> Transport Layer Address of the gNB-CU | - |

FIG. 48 (Cont. 1)

| | IE/Group Name | Presence | Range | IE type and reference | Semantics Description | Criticality |
|---|---|---|---|---|---|---|
| 67> | Transport Layer Address Info | 68> O | 69> | 70> 9.3.2.5 | 71> | YES |
| 72> | Coverage Modification List | 73> | 74> 0 .. < maxnoofCellsinNG-RANnode > | 75> | 76> List of NR cells and SSB beams for which a coverage modification is required | EACH |
| 77> | > NR CGI | 78> M | 79> | 80> NR CGI 81> 9.3.1.12 | 82> NR Cell Global Identifier of the cell to be modified | - |
| 83> | > SSB Beam List | 84> | 85> 0 .. < maxnoofSSBBeam> | 86> | 87> | - |
| 88> | >> SSB Beam Index | 89> | 90> | 91> INTEGER (0..63) | 92> Identify an SSB area of an NR cell | - |
| 93> | > Replacing Info | 94> | 95> | 96> | 97> | - |
| 98> | >> Replacing NR Cells | 99> | 100> 0 .. < maxnoofCellsinNG-RANnode > | 101> | 102> | - |
| 103> | >>> NR CGI | 104> | 105> | 106> NR CGI 107> 9.3.1.12 | 108> NR Cell Global Identifier of a cell that may replace all or part of the coverage of the cell to be modified | - |
| 109> | >>> NR Cell Coverage State | 110> M | 111> | 112> INTEGER (0..15, ...) | 113> Value '0' indicates that the cell is inactive. Other values indicates that the cell is active and also indicates the coverage configuration of the concerned cell | - |
| 114> | >>> Replacing SSB Beams | 115> | 116> 0 .. < maxnoofSSBBeam> | 117> | 118> | - |

FIG. 48 (Cont. 2)

| IE/Group Name | Presence | Range | IE type and reference | Semantics Description | Criticality |
|---|---|---|---|---|---|
| 119> >>> SSB Beam Index | 120> | 121> | 122> INTEGER (0..63) | 123> Identify an SSB area of an NR cell | - |
| 124> >>> SSB Beam Coverage State | 125> M | 126> | 127> INTEGER (0..15, ....) | 128> Value '0' indicates that the SSB beam is inactive. Other values Indicates that the SSB beam is active and also indicates the coverage configuration of the concerned SSB beam | - |

FIG. 48 (Cont. 3)

| Range bound | Explanation |
|---|---|
| 129> maxCellingNBDU | 130> Maximum no. cells that can be served by a gNB-DU. Value is 512. |
| 131> maxnoofUEIDs | 132> Maximum no. of UEs that can be served by a gNB-DU. Value is 65536. |
| 133> maxnoofTNLAssociations | 134> Maximum numbers of TNL Associations between the gNB-CU and the gNB-DU. Value is 32. |

FIG. 49

| IE/Group Name | Presence | Range | IE type and reference | Semantics Description | Criticality | Assigned Criticality |
|---|---|---|---|---|---|---|
| 1> Message Type | 2> M | 3> | 4> 9.3.1.1 | 5> | YES | Reject |
| 6> Transaction ID | 7> M | 8> | 9> 9.3.1.23 | 10> | YES | Reject |
| Cells to be Activated List | | | | | YES | Reject |
| >Cells to be Activated List Item | 11> | 12> 0..1 | 13> | 14> List of cells to be activated or modified | EACH | Reject |
| | 15> M | 16> 1..<maxCellingNBDU> | 17> | 18> | | |
| >> NR CGI | 19> M | 20> | 21> 9.3.1.12 | 22> | - | |
| >> NR PCI | 23> O | 24> | 25> INTEGER (0..1007) | 26> Physical Cell ID | - | |
| >> gNB-CU System Information | 27> O | 28> | 29> 9.3.1.42 | 30> RRC container with system information owned by gNB-CU | YES | Reject |
| >>Available PLMN List | 31> O | 32> | 33> 9.3.1.65 | 34> | YES | Ignore |
| >>Extended Available PLMN List | 35> O | 36> | 37> 9.3.1.76 | 38> This is included if Available PLMN List IE is included and if more than 6 Available PLMNs is to be signalled. | YES | Ignore |
| >>IAB Info IAB-donor-CU | 39> O | 40> | 41> 9.3.1.105 | 42> IAB-related configuration sent by the IAB-donor-CU. | YES | Ignore |
| >>Available SNPN ID List | 43> O | 44> | 45> | Indicates the available SNPN ID list. 46> If this IE is included, the content of the Available PLMN List IE and Extended Available PLMN List IE if present in the Cells to be Activated List Item IE is ignored. | YES | Ignore |

FIG. 50

| IE/Group Name | Presence | Range | IE type and reference | Semantics Description | Criticality | Assigned Criticality |
|---|---|---|---|---|---|---|
| CCO Issue detection | 47> O | 48> | 49> ENUMERATED (capacity,coverage,imbalance ...) | 50> Indicates which type of CCO issue has been detected | YES | Ignore |
| Cells to be Deactivated List | 51> | 52> 0.1 | 53> | 54> List of cells to be deactivated | YES | Reject |
| >Cells to be Deactivated List Item | 55> | 56> 1..<maxCellingNBDU> | 57> | 58> | EACH | Reject |
| >> NR CGI | 59> M | 60> | 61> 9.3.1.12 | 62> | - | |
| gNB-CU TNL Association To Add List | 63> | 64> 0.1 | 65> | 66> | YES | Ignore |
| >gNB-CU TNL Association To Add Item IEs | 67> | 68> 1..<maxnoofTNLAssociations> | 69> | 70> | EACH | Ignore |
| >>TNL Association Transport Layer Information | 71> M | 72> | 73> CP Transport Layer Address 74> 9.3.2.4 | 75> Transport Layer Address of the gNB-CU. | - | |
| >>TNL Association Usage | 76> M | 77> | 78> ENUMERATED (ue, non-ue, both, ...) | 79> Indicates whether the TNL association is only used for UE-associated signalling, or non-UE-associated signalling, or both. For usage of this IE, refer to TS 38.472 [22]. | - | |
| gNB-CU TNL Association To Remove List | 80> | 81> 0.1 | 82> | 83> | YES | Ignore |

FIG. 50 (Cont. 1)

| IE/Group Name | Presence | Range | IE type and reference | Semantics Description | Criticality | Assigned Criticality |
|---|---|---|---|---|---|---|
| >gNB-CU TNL Association To Remove Item IEs | 84> | 85> 1..<maxnoofTN LAssociation> | 86> | 87> | EACH | Ignore |
| >>TNL Association Transport Layer Address | 88> M | 89> | 90> CP Transport Layer Address 91> 9.3.2.4 | 92> Transport Layer Address of the gNB-CU. | - | |
| >>TNL Association Transport Layer Address gNB-DU | 93> O | 94> | 95> CP Transport Layer Address 96> 9.3.2.4 | 97> Transport Layer Address of the gNB-DU. | YES | Reject |
| gNB-CU TNL Association To Update List | 98> | 99> 0..1 | 100> | 101> | YES | Ignore |
| >gNB-CU TNL Association To Update Item IEs | 102> | 103> 1..<maxnoofTN LAssociations> | 104> | 105> | EACH | Ignore |
| >>TNL Association Transport Layer Address | 106> M | 107> | 108> CP Transport Layer Address 109> 9.3.2.4 | 110> Transport Layer Address of the gNB-CU. | - | |
| >>TNL Association Usage | 111> O | 112> | 113> ENUMERATED (ue, non-ue, both, ...) | 114> Indicates whether the TNL association is only used for UE-associated signalling, or non-UE-associated signalling, or both. For usage of this IE, refer to TS 38.472 [22]. | - | |
| Cells to be barred List | 115> | 116> 0..1 | 117> | 118> List of cells to be barred. 119> | YES | Ignore |

FIG. 50 (Cont. 2)

| IE/Group Name | Presence | Range | IE type and reference | Semantics Description | Criticality | Assigned Criticatlity |
|---|---|---|---|---|---|---|
| >Cells to be barred List Item | 115> | 116> 0..1 | 117> | 118> List of cells to be barred.<br>119> | YES | Ignore |
| >>NR CGI | 124> M | 125> | 126> 9.3.1.12 | 127> | - | |
| >>Cell Barred | 128> M | 129> | 130> ENUMERATED (barred, not-barred, ...) | 131> | - | |
| >>IAB Barred | 132> O | 133> | 134> ENUMERATED (barred, not-barred, ...) | 135> | - | |
| Protected E-UTRA Resources List | 136> | 137> 0..1 | 138> | 139> List of Protected E-UTRA Resources. | YES | Reject |
| >Protected E-UTRA Resources List Item | 140> | 141> 1..<maxCellineNB> | 142> | 143> | EACH | Reject |
| >>Spectrum Sharing Group ID | 144> M | 145> | 146> INTEGER (1..maxCellineNB) | 147> Indicates the E-UTRA cells involved in resource coordination with the NR cells affiliated with the same Spectrum Sharing Group ID. | - | |
| >> E-UTRA Cells List | 148> | 149> 1 | 150> | 151> List of applicable E-UTRA cells. | - | |
| >>> E-UTRA Cells List Item | 152> | 153> 1..<maxCellineNB> | 154> | 155> | - | |
| >>>>EUTRA Cell ID | 156> M | 157> | 158> BIT STRING (SIZE(28)) | 159> Indicates the E-UTRAN Cell Global Identifier as defined in subclause 9.2.14 in TS 36.423 [9]. | - | |

FIG. 50 (Cont. 3)

| IE/Group Name | Presence | Range | IE type and reference | Semantics Description | Criticality | Assigned Criticatlity |
|---|---|---|---|---|---|---|
| >>>>Served E-UTRA Cell Information | 160> M | 161> | 162> 9.3.1.64 | 163> | - | |
| 164> Neighbour Cell Information List | 165> | 166> 0..1 | 167> | 168> | YES | Ignore |
| >Neighbour Cell Information List Item | 169> | 170> 1.. <maxCellingNBDU> | 171> | 172> | EACH | Ignore |
| >>NR CGI | 173> M | 174> | 175> 9.3.1.12 | 176> | - | |
| >>Intended TDD DL-UL Configuration | 177> O | 178> | 183> 9.3.2.5 | 180> | - | |
| Transport Layer Address Info | 181> O | 182> | 142> | 184> | YES | Ignore |
| >185 Uplink BH Non-UP Traffic Mapping | 186> O | 187> | 188> 9.3.1.10 3 | 189> | YES | Reject |

FIG. 50 (Cont. 4)

| Range bound | Explanation |
|---|---|
| maxCellingNBDU | Maximum nunmerbs of cells that can be served by a gNB-DU. Value is 512. |
| maxnoofTNLAssociations | Maximum numbers of TNL Associations between the gNB-CU and the gNB-DU. Value is 32. |
| maxCellineNB | Maximum no. cells that can be served by an eNB. Value is 256. |

FIG. 51

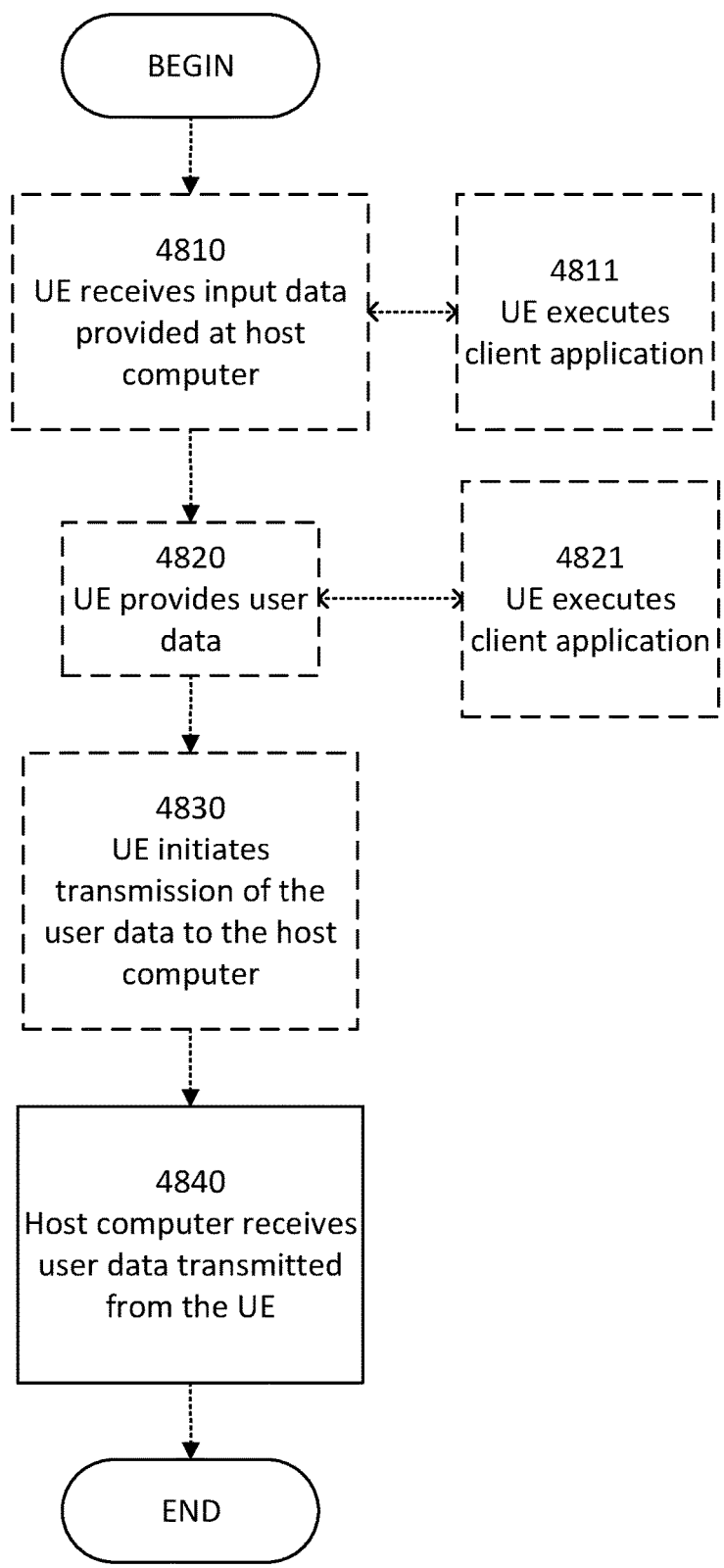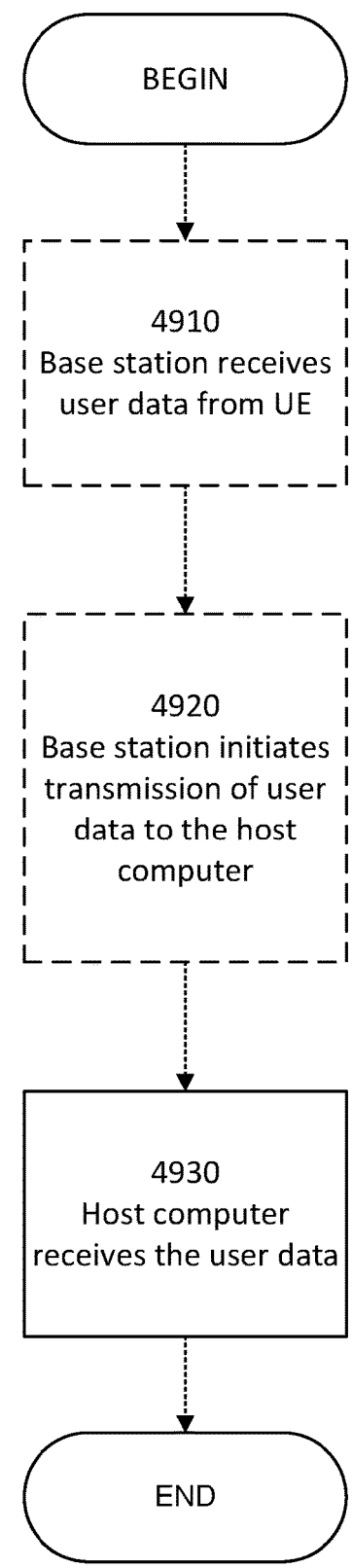
FIG. 59
FIG. 60

REQUESTING A CONFIGURATION CHANGE FOR A RADIO ACCESS NETWORK NODE

CROSS REFERENCE TO RELATED APPLICATIONS

This application is a 35 U.S.C. § 371 national stage application of PCT International Application No. PCT/SE2021/050773 filed on Aug. 5, 2021, which in turn claims domestic priority to U.S. Provisional Patent Application No. 63/062,169, filed on Aug. 6, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

The current 5G RAN (NG-RAN) architecture is illustrated in FIG. 23. The NG architecture can be further described as follows. The NG-RAN consists of a set of gNBs connected to the 5GC through the NG. An gNB can support FDD mode, TDD mode or dual mode operation. gNBs can be interconnected through the Xn interface. A gNB may consist of a gNB-CU and gNB-DUs. A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

A gNB may also be connected to an LTE eNB via the X2 interface. Another architectural option is that where an LTE eNB connected to the Evolved Packet Core network is connected over the X2 interface with a so called nr-gNB. The latter is a gNB not connected directly to a CN and connected via X2 to an eNB for the sole purpose of performing dual connectivity.

The architecture in FIG. 23 can be expanded by splitting the gNB-CU into two entities. One gNB-CU-UP, which serves the user plane and hosts the PDCP protocol and one gNB-CU-CP, which serves the control plane and hosts the PDCP and RRC protocol. For completeness it should be said that a gNB-DU hosts the RLC/MAC/PHY protocols.

SUMMARY

According to some embodiments of inventive concepts, a method of operating a first network node in a network including a second network node is provided. A configuration update request message is transmitted to the second network node. The configuration update request message includes an indication of a requested configuration change for the second network node. A configuration update message is received from the second network node. The configuration update message includes an indication of a configuration update selected by the second network node.

According to some other embodiments of inventive concepts, a method of operating a second network node in a network including a first network node is provided. A configuration update request message is received from the first network node. The configuration update request message includes an indication of a requested configuration change for the second network node. A configuration update to be applied by the second network node is selected responsive to receiving the configuration update request message. A configuration update message is transmitted to the first network node. The configuration update message includes an indication of the configuration update selected by the second network node.

According to some embodiments, by providing communication of indications of requested configurations and/or configuration updates between network nodes, resolution of capacity and/or coverage issues may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 32 is a block diagram illustrating a wireless device UE according to some embodiments of inventive concepts;

FIG. 33 is a block diagram illustrating a radio access network RAN node (e.g., a base station eNB/gNB) according to some embodiments of inventive concepts;

FIG. 34 is a block diagram illustrating a core network CN node (e.g., an AMF node, an SMF node, etc.) according to some embodiments of inventive concepts;

FIG. 37 is a table illustrating an example of inter-node communication interfaces according to some embodiments of inventive concepts;

FIG. 38 is a table illustrating an example of Class 2 Elementary Procedures according to some embodiments of inventive concepts;

FIG. 39 is a table illustrating an example of IEs of a EN-DC CONFIGURATION UPDATE REQUEST message or a NG-RAN NODE CONFIGURATION UPDATE REQUEST message according to some embodiments of inventive concepts;

FIGS. 40-42 are tables illustrating examples of information associated with a EN-DC CONFIGURATION UPDATE message according to some embodiments of inventive concepts;

FIG. 43 is a table illustrating an example of a NR Neighbor Information IE according to some embodiments of inventive concepts;

FIG. 44 is a table illustrating an example of modified Class 2 Elementary Procedures according to some embodiments of inventive concepts;

FIGS. 45-47 are tables illustrating examples of information associated with a NG-RAN NODE CONFIGURATION UPDATE message according to some embodiments of inventive concepts;

FIGS. 48-49 are tables illustrating examples of information associated with a GNB-DU CONFIGURATION UPDATE message according to some embodiments of inventive concepts;

FIGS. 50-51 are tables illustrating examples of information associated with a GNB-CU CONFIGURATION UPDATE message according to some embodiments of inventive concepts;

FIG. 59 is a block diagram of methods implemented in a communication system including a host computer, a base station and a user equipment in accordance with some embodiments; and FIG. 60 is a block diagram of methods implemented in a communication system including a host computer, a base station and a user equipment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Configuration Update is discussed below. XnAP, X2AP, and F1AP procedures are discussed so that a first network node can provide a second network node with information to be used by the second network node for Coverage and Capacity Optimization, CCO, that is, to address (and possibly solve) a capacity and/or a coverage issue ("CCI").

eNB Configuration Update is discussed below. The purpose of the eNB Configuration Update procedure is to update application level configuration data needed for two eNBs to interoperate correctly over the X2 interface.

Figure 24:
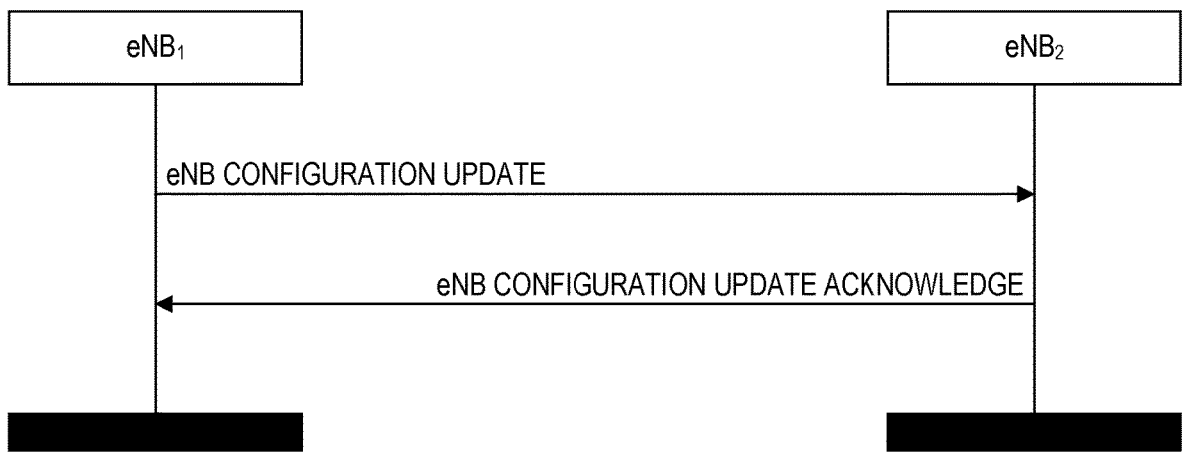
FIGS. 24-25 are message diagrams illustrating successful and unsuccessful eNB configuration updates, respectively.

The procedure uses non UE-associated signaling. Successful operation of the eNB configuration update procedure is illustrated in the message diagram of FIG. 24. If the Coverage Modification List IE is present, eNB2 may use the information in the Cell Coverage State IE to identify the cell deployment configuration enabled by eNB1 and for configuring the mobility towards the cell(s) indicated by the ECGI IE. If the Cell Deployment Status Indicator IE is present in the Coverage Modification List IE, the eNB2 shall consider the cell deployment configuration of the cell to be modified as the next planned configuration and shall remove any planned configuration stored for this cell. If the Cell Deployment Status Indicator IE is present and the Cell Replacing Info IE contains non-empty cell list, the eNB2 may use this list to avoid connection or re-establishment failures during the reconfiguration, e.g. consider the cells in the list as possible alternative handover targets. If the Cell Deployment Status Indicator IE is not present, the eNB2 shall consider the cell deployment configuration of cell to be modified as activated and replace any previous configuration for the cells indicated in the Coverage Modification List IE.

Figure 25:
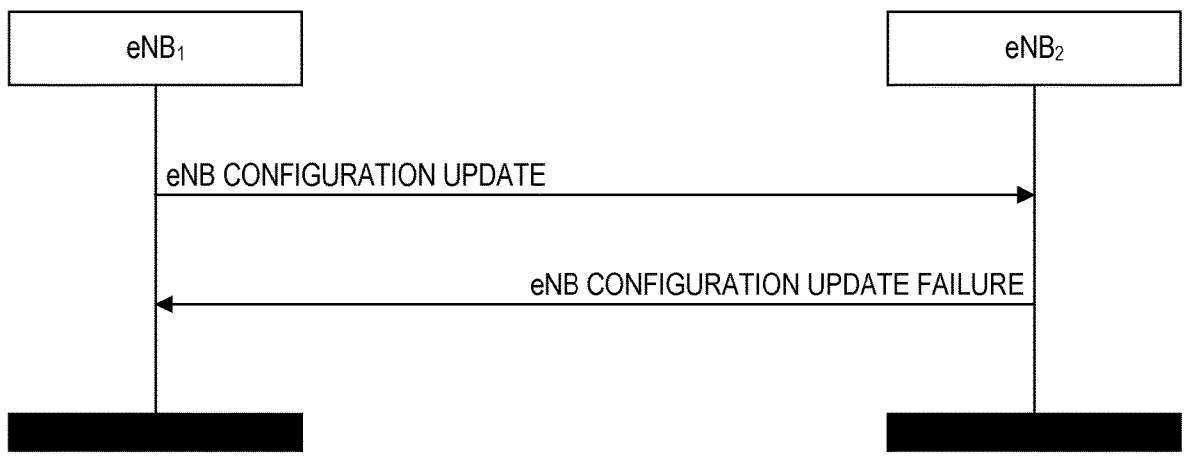

Unsuccessful operation of the eNB configuration update procedure is illustrated in the message diagram of FIG. 25. The ENB CONFIGURATION UPDATE message is sent by an eNB to a peer eNB to transfer updated information for a TNL association.

EN-DC Configuration Update is discussed below. The purpose of the EN-DC Configuration Update procedure is to update application level configuration data needed for eNB and en-gNB to interoperate correctly over the X2 interface.

Figure 26:
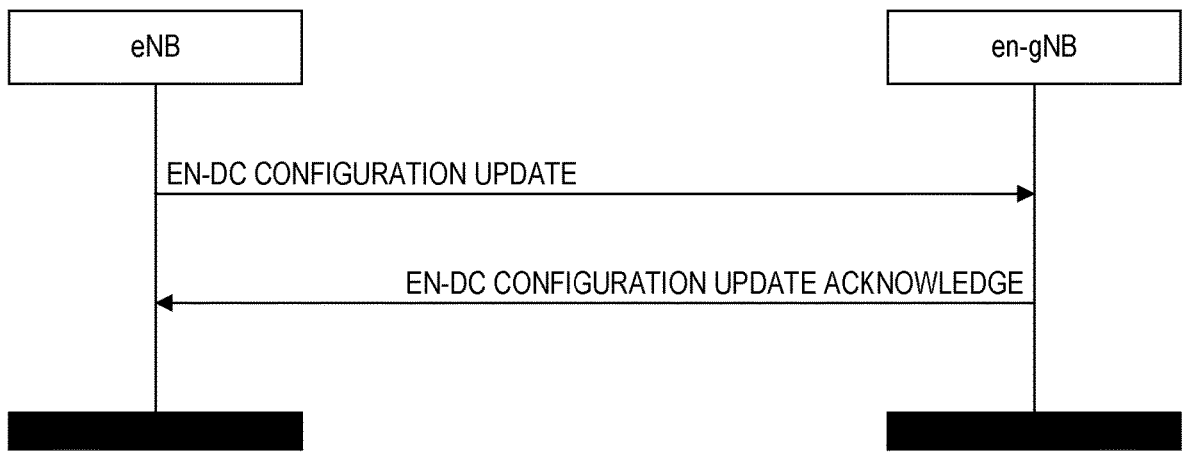
FIG. 26 is a message diagram illustrating a successful eNB initiated EN-DC configuration update.
Figure 27:
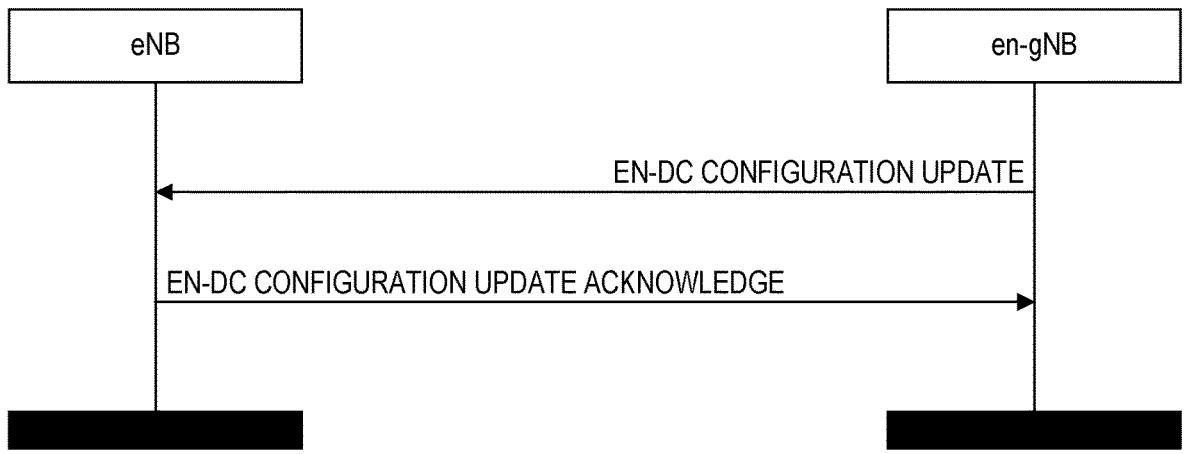
FIG. 27 is a message diagram illustrating a successful en-gNB initiated EN-DC configuration update.

The procedure uses non UE-associated signaling. Successful operation of the EN-DC configuration update procedure is illustrated in the message diagrams of FIGS. 26-27. FIG. 26 illustrates successful operation of eNB initiated EN-DC configuration update, and FIG. 27 illustrates successful operation of en-gNB initiated EN-DC configuration update.

Figure 28:
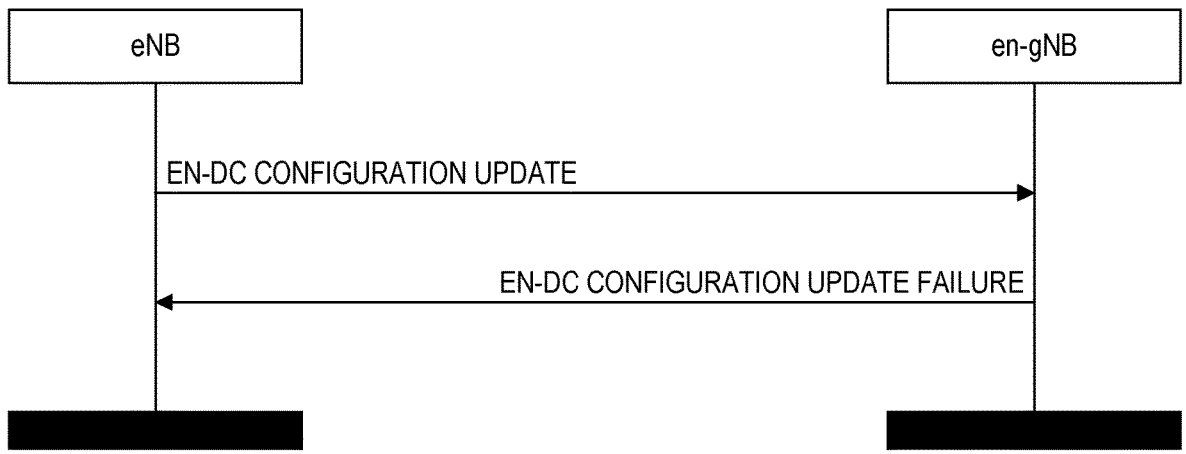
FIG. 28 is a message diagram illustrating an unsuccessful eNB initiated EN-DC configuration update.
Figure 29:
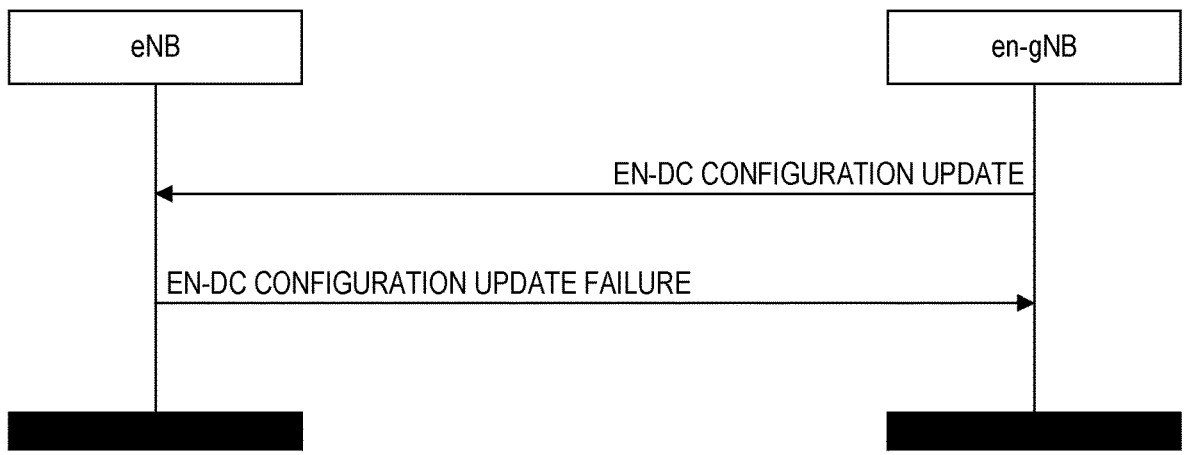
FIG. 29 is a message diagram illustrating an unsuccessful en-gNB initiated EN-DC configuration update.

Unsuccessful operation of the EN-DC configuration update procedure is illustrated in the message diagrams of FIGS. 28-29. FIG. 28 illustrates unsuccessful operation of eNB initiated EN-DC configuration update, and FIG. 29 illustrates unsuccessful operation of en-gNB initiated EN-DC configuration update.

An X2AP ENB configuration update is discussed below. X2AP ENB Configuration Update (also referred to as an "ENB CONFIGURATION UPDATE" message) includes a "Coverage Modification List" for a list of E-UTRA cells with modified coverage, including an index "Cell Coverage State" to indicate the coverage configuration of the concerned cell, and optionally a "Replacing Cells" IE to identify the cells that may replace An XnAP NG-RAN node Configuration Update is discussed below. For a gNB, a "NG-RAN NODE CONFIGURATION UPDATE" message includes an updated configuration data for NR cells served by the node sending the message ("Served Cells To Update NR" IE) and "Cell Assistance Information NR." For a ng-eNB, the "NG-RAN NODE CONFIGURATION UPDATE" includes updated configuration data for E-UTRA cells served by the node sending the message ("Served Cells to Update E-UTRA" IE) and "Cell Assistance Information NR."

For a gNB, a "NG-RAN NODE CONFIGURATION UPDATE ACKNOWLEDGE" message includes: 1) configuration data for NR cells served by the node sending the message ("Served Cell Information NR" IE within "Served NR Cells" IE); 2) configuration data for NR neighbor of the NR cells served by the node sending the message ("Neighbor Information NR" IE within "Served NR Cells" IE); and 3) configuration data for E-UTRA neighbour of the NR cells served by the node sending the message ("Neighbour Information E-UTRA" IE within "Served NR Cells" IE).

The EN-DC configuration update message is sent by an initiating node to a peer neighboring node, both nodes able to interact for EN-DC, to transfer updated information for a TNL association.

Figure 30:
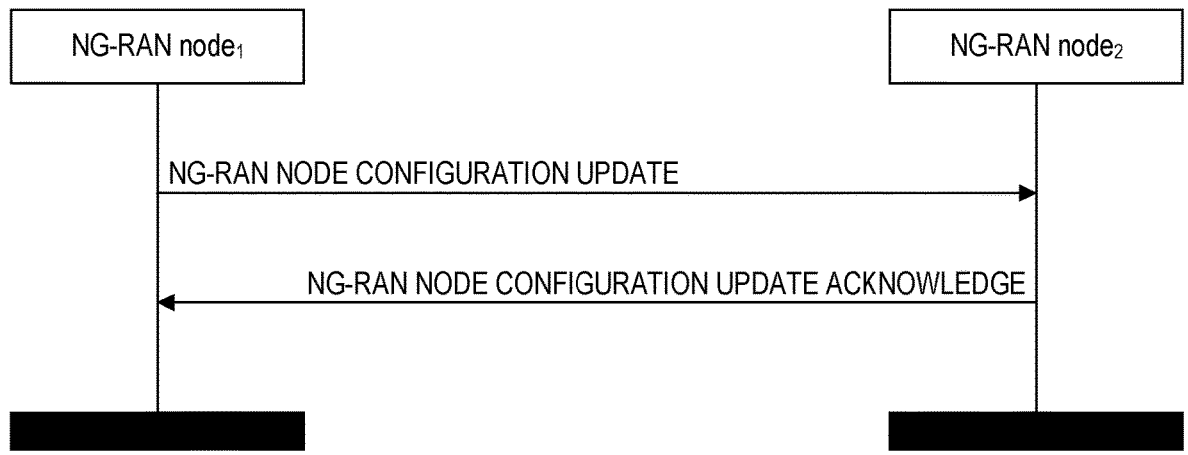
FIGS. 30-31 are message diagrams illustrating successful and unsuccessful NG-RAN node configuration updates, respectively.
Figure 31:
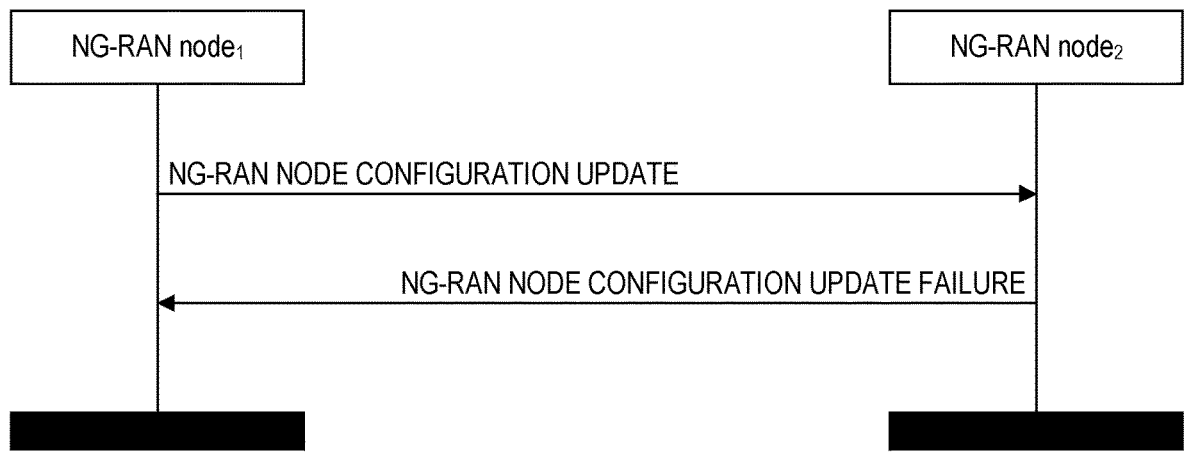

The NG-RAN node Configuration Update is discussed below. The purpose of the NG-RAN node Configuration Update procedure is to update application level configuration data needed for two NG-RAN nodes to interoperate correctly over the Xn-C interface. The procedure uses non UE-associated signaling. Successful operation of the NG-RAN node configuration update is illustrated in the message diagram of FIG. 30. Unsuccessful operation of the NG-RAN node configuration update is illustrated in the message diagram of FIG. 31.

The NG-RAN NODE CONFIGURATION UPDATE message is sent by a NG-RAN node to a neighboring NG-RAN node to transfer updated information for an Xn-C interface instance.

Reference signals in NR are discussed below. Two types of reference signals are defined for NR, SSB and CSI-RS. Some of their characteristics are reported below from the 3GPP TS 38.331.

SSB is discussed below. The IE SSB-Index identifies an SS-Block within an SS-Burst. See TS 38.213, clause 4.1. The IE SSB-MTC is used to configure measurement timing configurations, i.e., timing occasions at which the UE measures SSBs. The IE SSB-PositionQCL-Relationship is used to indicate the QCL relationship between SSB positions on the frequency indicated by ssbFrequency (see TS 38.213, clause 4.1). Value n1 corresponds to 1, value n2 corresponds to 2 and so on. The IE SSB-ToMeasure is used to configure a pattern of SSBs.

CSI-RS is discussed below. The IE NZP-CSI-RS-Resource is used to configure Non-Zero-Power (NZP) CSI-RS transmitted in the cell where the IE is included, which the UE may be configured to measure on (see TS 38.214, clause 5.2.2.3.1). A change of configuration between periodic, semi-persistent or aperiodic for an NZP-CSI-RS-Resource is not supported without a release and add. The IE NZP-CSI-RS-ResourceId is used to identify one NZP-CSI-RS-Resource. The IE NZP-CSI-RS-ResourceSet is a set of Non-Zero-Power (NZP) CSI-RS resources (their IDs) and set-specific parameters. The IE NZP-CSI-RS-ResourceSetId is used to identify one NZP-CSI-RS-ResourceSet.

Current standards, however, may not adequately address capacity and/or coverage issues, for example, in multi-connectivity and/or split architecture scenarios.

FIG. 32 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 300 may be provided, for example, as discussed below with respect to wireless device 4110 of FIG. 52.) As shown, communication device UE may include an antenna 307 (e.g., corresponding to antenna 4111 of FIG. 52), and transceiver circuitry 301 (also referred to as a transceiver, e.g., corresponding to interface 4114 of FIG. 52) including a transmitter and a receiver configured to provide uplink and downlink radio communications with a base station(s) (e.g., corresponding to network node 4160 of FIG. 52, also referred to as a RAN node) of a radio access network. Communication device UE may also include processing circuitry 303 (also referred to as a processor, e.g., corresponding to processing circuitry 4120 of FIG. 52) coupled to the transceiver circuitry, and memory circuitry 305 (also referred to as memory, e.g., corresponding to device readable medium 4130 of FIG. 52) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

FIG. 33 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 52.) As shown, the RAN node may include transceiver circuitry 401 (also referred to as a transceiver, e.g., corresponding to portions of interface 4190 of FIG. 52) including a transmitter and a receiver configured to provide uplink and downlink radio communications with mobile terminals. The RAN node may include network interface circuitry 407 (also referred to as a network interface, e.g., corresponding to portions of interface 4190 of FIG. 52) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 52) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

FIG. 34 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

The XnAP and X2AP procedures defined in 3GPP technical
specifications for LTE and NG-RAN systems allow a first RAN node to provide a second RAN node with information about changes in its configuration. In LTE, an eNB can use such procedure to notify a neighbor gNB about changes in coverage and capacity in one or more of its serving cells.

The current solution lacks support for the resolution of capacity and coverage issues in case of multi-connectivity (such as EN-DC or NR-NR) or split architecture.

Furthermore, the current approaches may lack support to indicate that a detected capacity and coverage issues are not resolved neither support alternative ways to solve it, as described in the invention.

According to some embodiments, a procedure executed by a first RAN node may be provided to improve/optimize the coverage and capacity of serving radio cell or reference signal (RS) (such as SSB beams or CSI-RS beams) of the serving radio cell. The procedure may include: transmitting a first indication to a second RAN node. The first indication can include a RAN NODE CONFIGURATION UPDATE REQUEST message. In some examples, the message, operation, or procedure may be named differently. The purpose of the message is that of generating a triggering condition for the RAN Node Configuration Update procedure. Namely, this message may include information such as an indication of an encountered problem, as well as measurements relative to the issue encountered and signaled within the message, which trigger the receiving node to initiate a node configuration update. Such node configuration update in turn triggers inter node signaling to inform neighboring nodes of the configuration changes applied or to be applied.

The procedure can further include receiving a second indication from the second RAN node. The second indication includes a RAN NODE CONFIGURATION UPDATE associated to at least one serving cell or to at least a reference signal (RS) beam coverage area of the second RAN node.

The term "RAN node" or "network node" can be used interchangeably herein.

Embodiments for the first RAN node may further include transmitting a third indication to the second RAN node. The third indication can include a RAN NODE CONFIGURATION UPDATE ACKNOWLEDGE. The first indication can further include: an indication of the cell identity of the second RAN node which could be concerned with a capacity issue and/or a coverage issue; an indication of the cell identity of the first RAN node which is concerned with a capacity issue and/or a coverage issue; an indication of a RS beam identity of the second RAN node which could be concerned with a capacity issue and/or a coverage issue (the RS beam could further be associated to a serving cell identity, e.g. indicating the SSB index alone would not be enough!); an indication of a RS beam identity of the first RAN node which could be concerned in a capacity issue and/or a coverage issue (the RS beam could further be associated to a serving cell identity, e.g. indicating the SSB index alone would not be enough!); an indication of the type of the capacity issue and/or the coverage issue detected by the first RAN node, such as capacity issue (such as high demand of services, or a high interference caused by large number of users at cell edge), coverage issue (such as a coverage hole, an imbalance between uplink and downlink coverage); an indication of a UE identity which could be concerned with the capacity issue and/or the coverage issue; and/or one or more UE measurement reports associated to a serving cell of the first RAN node or a RS beam of a serving cell of the first RAN node for which a capacity issue and/or a coverage issue is detected by the first network node.

The first RAN node can be one of: an eNB, an NG-RAN node, an en-gNB, and a gNB-CU. The second RAN node can be one of: an eNB, an NG-RAN node, and a gNB-DU. The first, second, or third indication is transmitted over one inter-node communication interface such as the 3GPP X2 interface, 3GPP Xn interface, 3GPP F1 interface, or equivalent interfaces, for example, as illustrated in FIG. 37.

In some embodiments, operations executed by a second RAN node may be provided to improve/optimize the coverage area of reference signal (RS) beams. The operations can include receiving a first indication from a first RAN node. The first indication can include a RAN NODE CONFIGURATION UPDATE REQUEST message. The operations can further include determining a new RAN NODE CONFIGURATION UPDATE for at least a serving cell of the second RAN node or to at least a RS beam coverage area of a serving cell of the second RAN node based on the first indication. The operations can further include transmitting a second indication to the first RAN node. The second indication can include a RAN NODE CONFIGURATION UPDATE associated to the at least one serving cell or to at least a RS beam coverage area of the second RAN node.

In additional or alternative embodiments, the first RAN node may receive a third indication from the first RAN node. The third indication comprising a RAN NODE CONFIGURATION UPDATE ACKNOWLEDGE.

In additional or alternative embodiments, a different procedure structure may be used in which a new procedure is defined instead of relying on enhancements of the RAN Node Configuration Update procedure. In some examples, the new procedure may include a first indication from the first RAN node to the second RAN node, including content similar to what has been described for the RAN Node Configuration Update Request. This message may be named CCO Change Request. In additional or alternative examples, the second indication can be sent from the second RAN node to the first RAN node, including information similar to what described in this disclosure for the RAN Node Configuration Update. Such a message may be named a CCO Change Acknowledge.

In additional or alternative embodiments, the second RAN node may reply to the first RAN node, after receiving the CCO Change Request, with a message that lists the CCO changes applied by the second RAN node and for which it is expected the first RAN node to issue an acknowledgement of correctly received CCO change configuration. In such an embodiment the message sent by the second RAN node may be named CCO Change. Upon reception of the CCO Change the first RAN node may reply with a CCO Change Acknowledge confirming correct reception and adoption of the changes applied by the second RAN node.

In additional or alternative embodiments, a first RAN node may be enabled to trigger and coordinate the resolution of a coverage or capacity issue with a second (neighbor) RAN node. This may be particularly beneficial when the first RAN node is unable to resolve the issue by itself. In this case, the proposed solution enables efficient resolution of the coverage or capacity issue by means of inter-RAN node signaling which can pinpoint the serving cells or the associated reference signals (such as SSB beams or CSI-RS beams) interested by the capacity or coverage issue, thereby allowing a precise and efficient optimization of coverage and capacity.

Operations executed by a first network node according to some embodiments are discussed below.

In some embodiments, operations are executed by a first network node to improve/optimize the coverage and capacity of a serving radio cell or reference signal (RS) beams (such as e.g. SSB beams or CSI-RS beams) defined in the serving radio cell. The operations can include transmitting a first indication to a second network node. The first indication can include a RAN NODE CONFIGURATION UPDATE REQUEST like message (e.g. "NG-RAN NODE CONFIGURATION UPDATE REQUEST" message). The operations can further include receiving a second indication from the second network node. The second indication can include a RAN NODE CONFIGURATION UPDATE like message (e.g. "NG-RAN NODE CONFIGURATION UPDATE" message) associated to at least one serving cell or to at least a reference signal (RS) beam coverage area of the second network node.

In additional or alternative embodiments, the first network node may transmit a third indication to the second network node. The third indication can include a RAN NODE CONFIGURATION UPDATE ACKNOWLEDGE like message (e.g. "NG-RAN NODE CONFIGURATION UPDATE ACKNOWLEDGE" message).

Figure 1:
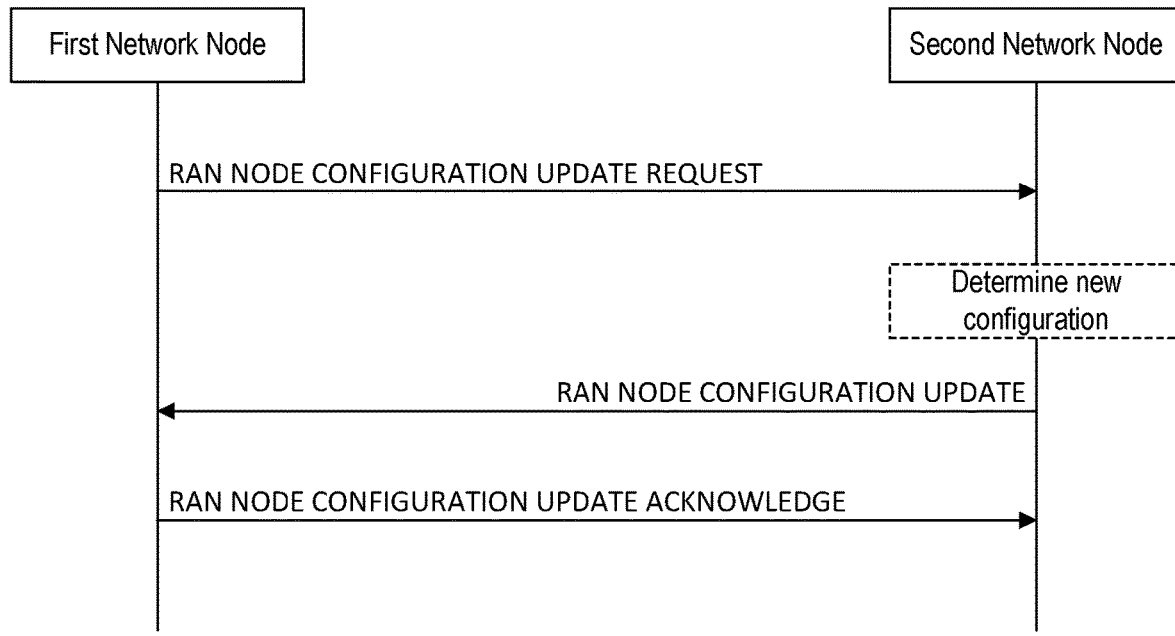
FIGS. 1-3 are message diagrams illustrating inter RAN node signaling according to some embodiments of inventive concepts.

FIG. 1 illustrates an inter RAN node signaling according to some embodiments. In some embodiments, the first and second network nodes may not rely on configuration update procedures but rather adopt CCO dedicated procedures. The reason why this may be an appropriate design is that the node configuration update procedures, existing today on the Xn, X2, F1 interfaces, are meant to indicate a change of configuration for a given node which is potentially independent from any triggering condition signaled by an external node.

While node configuration update procedures may be adapted to be triggered when an external node signals for example the detection of a specific event or specific information that when analyzed trigger a configuration action in the receiving node, a possible design may be that of leaving node configuration update procedure unaltered an instead defining CCO specific procedures. In this example, the procedure defined herein may be as illustrated in FIG. 2.

Figure 2:
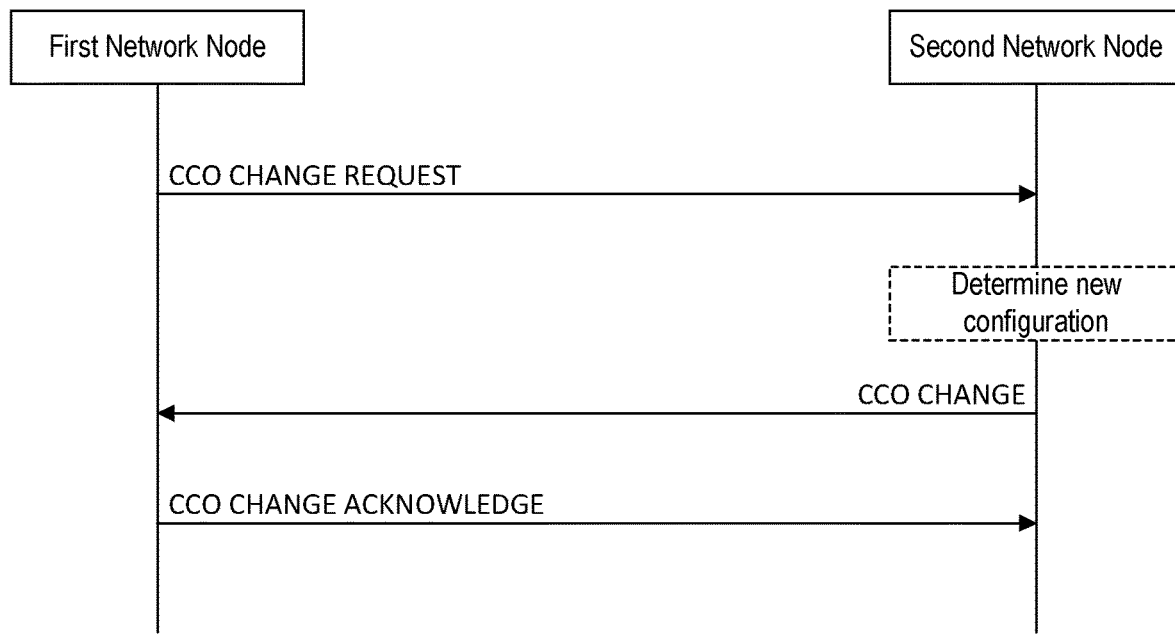

FIG. 2 illustrates an alternative inter-RAN node signaling according to some embodiments. In FIG. 2 the CCO Change ACKNOWLEDGE may not be present. If this message is not present, it is assumed that any CCO changes applied to the configuration of the second RAN Node and signaled to the first RAN Node are accepted by the first RAN node.

In some examples, the information included in the CCO CHANGE REQUEST and the behavior of the node receiving the message are equivalent to the information included in the RAN NODE CONFIGURATION UPDATE REQUEST message in this disclosure. In additional or alternative examples, the information included in the CCO CHANGE and the behavior of the node receiving the message are equivalent to the information included in the RAN NODE CONFIGURATION UPDATE message in this disclosure. In additional or alternative examples, the information included in the CCO CHANGE ACKNOWLEDGE and the behavior of the node receiving the message are equivalent to the information included in the RAN NODE CONFIGURATION UPDATE ACKNOWLEDGE message in this disclosure.

Embodiments related to content of a first indication are discussed below. In some embodiments, the RAN NODE CONFIGURATION UPDATE REQUEST message transmitted with the first indication includes one or more of the following. In some examples, the first indication includes an indication of a capacity and/or coverage issue (sometimes referred to herein as a CCI) detected by the first network node associated to a serving cell and/or RS beams of the first network node or to a serving cell and/or RS beam of the second network node, such as: an indication of a capacity issue involving one or more served and/or neighbouring cells; an indication of coverage issue (e.g., coverage hole) involving one or more served and/or neighbouring cells; an indication of cell/beam edge movement due to cell border interference; an indication of cell/beam edge movement due to coverage optimization; and an indication of uplink/downlink coverage disparity involving one or more served and/or neighbouring cells. In additional or alternative examples, the first indication includes an identity of at least a serving cell of the first network node which is concerned with a capacity issue and/or a coverage issue. In additional or alternative examples, the first indication includes the identity of at least a serving cell of the second network node which is concerned with a capacity issue and/or a coverage issue. In additional or alternative examples, the first indication includes the identity of at least a RS beam of a serving cell of the first network node which is concerned with a capacity issue and/or a coverage issue. The identity of the RS beams could further be associated to the identity of a serving cell of the first network node. In additional or alternative examples, the first indication includes the identity of at least a RS beam of a serving cell of the second network node which is concerned with a capacity issue and/or a coverage issue. The identity of the RS beams could further be associated to the identity of a serving cell of the second network node. In additional or alternative examples, the first indication includes an indication of a recommended configuration update for a serving cell or for RS beams of a serving cell of the second network node to resolve the issue, such as: contract the coverage area of the serving cell and/or the RS beam; expand the coverage area of the serving cell and/or RS beam; merge the coverage area of two or more serving cells or RS beams; and split the coverage area of a serving cell and/or RS beam. In additional or alternative examples, the first indication includes the identity of at least one UE or UE group that is concerned with the capacity issue and/or the coverage issue. In additional or alternative examples, the first indication includes one or more UE measurement reports associated to a serving cell of the first network node or a RS beam of a serving cell of the first network node for which a capacity issue and/or a coverage issue is detected by the first network node. In additional or alternative examples, the first indication includes one or more UE measurement reports associated to a serving cell of the second network node or a RS beam of a serving cell of the second network node for which a capacity issue and/or a coverage issue is detected by the first network node In some embodiments, the request message could indicate a mandatory action for the second network node or an optional action for the second network node.

Figure 3:
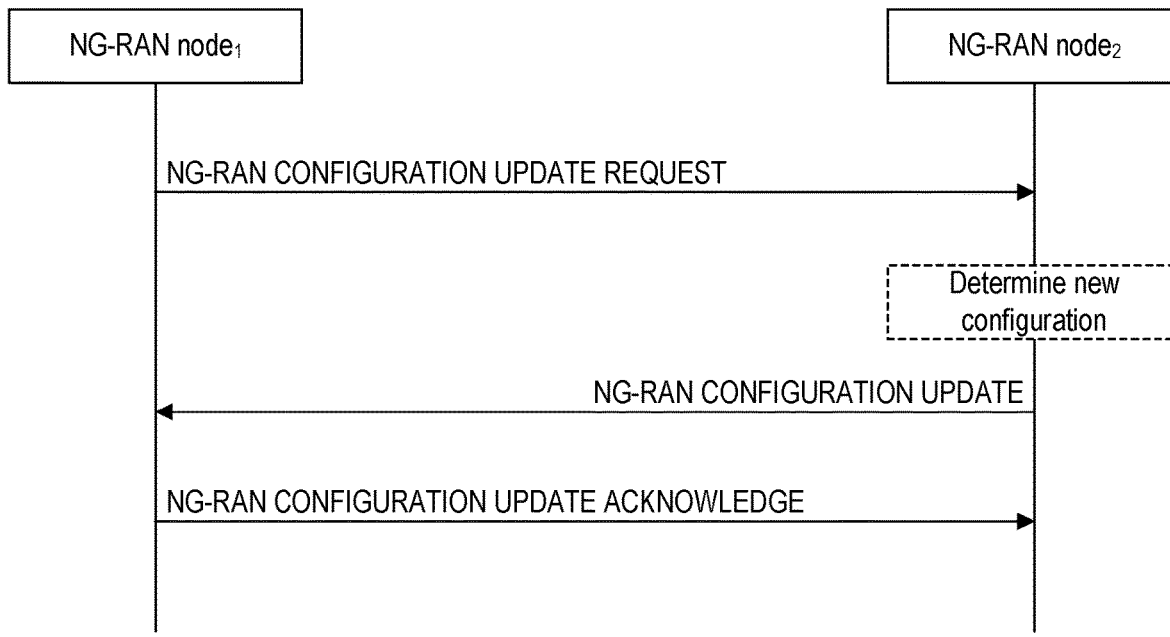

Embodiments for NG-RAN or LTE architectures are discussed below. In some embodiments, the first and second network node are RAN nodes of the same radio access network technology, such as two NG-RAN nodes (e.g., two gNBs) of a 3GGP NG-RAN system connected via a Xn interface; and two LTE RAN nodes (e.g., two eNBs) of a 3GGP NG-RAN system connected via a X2 interface. In some examples, the embodiments apply to other RAN technologies. FIG. 3 illustrates such embodiments for two NG-RAN nodes of a 3GPP NG-RAN system.

Figure 4:
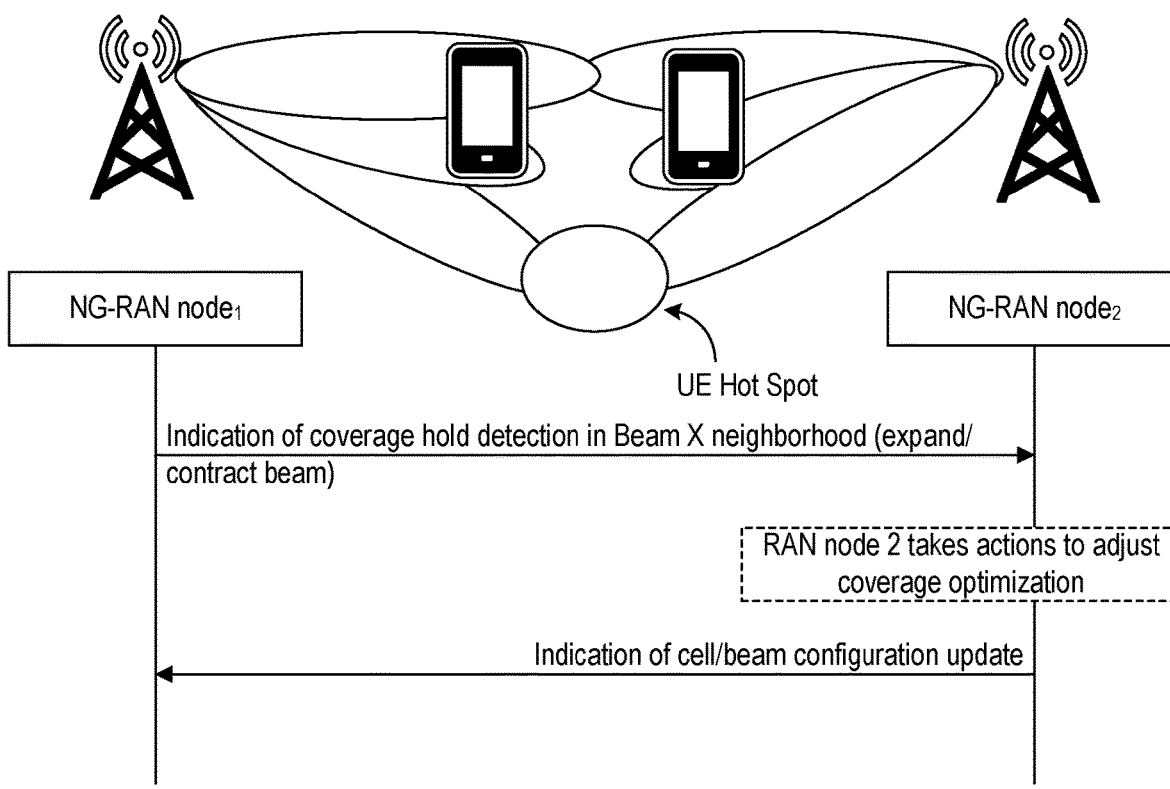
FIG. 4 is a diagram illustrating an indication of a coverage hole according to some embodiments of inventive concepts.

In one example, illustrated in FIG. 4, the NG-RAN Node1 indicates to the NG-RAN Node$_2$ a coverage hole detection in the neighborhood of one or more RS beams of a serving cell. The indicated RS beams could be associated to a serving cell of the NG-RAN Node1 itself and/or associated to a serving cell of the NG-RAN Node2. In one possible implementation of the embodiment, the RAN NODE CONFIGURATION UPDATE REQUEST could therefore comprise the identity of the concerned serving cell and RS beam of the NG-RAN Node1 and/or of the NG-RAN Node$_2$. Additionally, the RAN NODE CONFIGURATION UPDATE REQUEST the type of capacity issue and/or coverage issue (e.g., coverage hole), a recommended action to resolve the problem (e.g., an indication to whether to contract/expand the coverage area of a RS beam, or an indication of whether to split/merge RS beams).

The second indication transmitted by the NG-RAN Node$_2$ could therefore comprise a RAN NODE CONFIGURATION UPDATE indicating a configuration update for at least a serving cell or for at least a RS beam of a serving cell of the NG-RAN Node$_2$ resolving the capacity issue and/or the coverage issue.

FIG. 4 illustrates an example wherein the NG-RAN Node1 indicates a coverage hole to the NG-RAN Node$_2$ in the neighborhood of one or more RS beams. The RS beams indicated by the NG-RAN Node$_1$ may belong to the NG-RAN Node$_1$ itself and/or to the NG-RAN Node$_2$.

Figure 5:
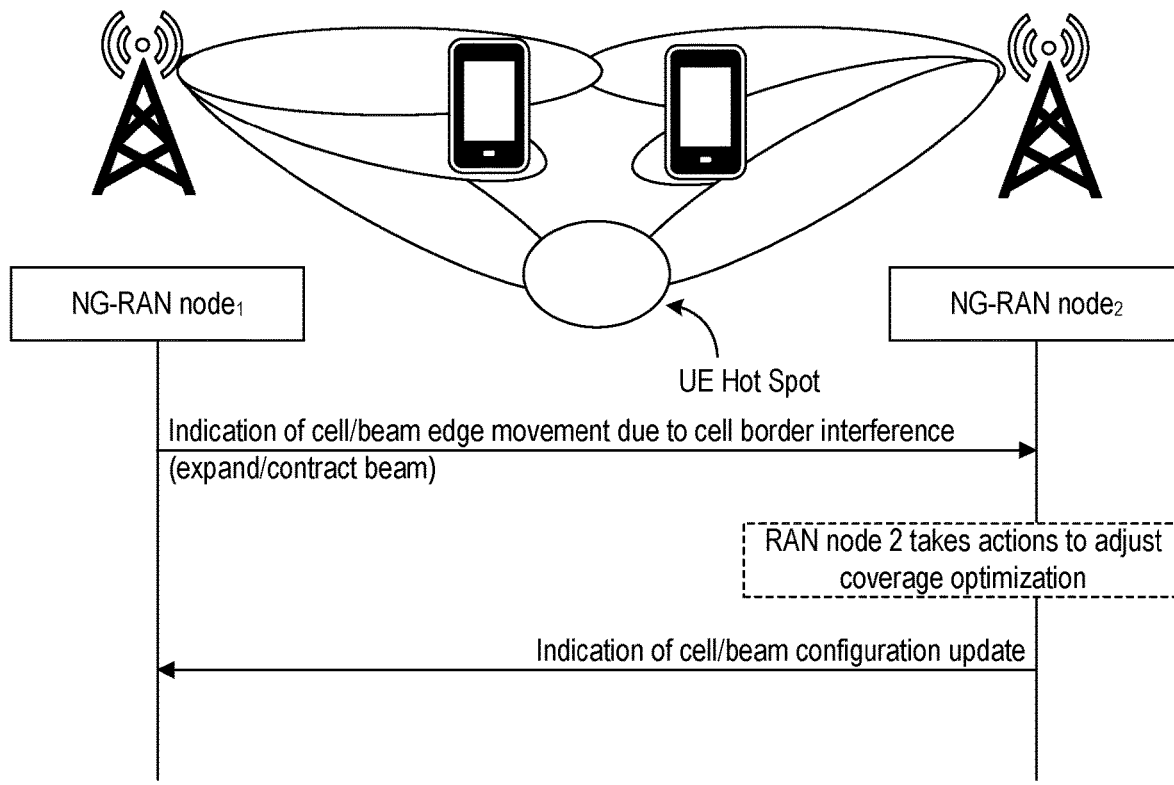
FIG. 5 is a diagram illustrating an indication of a cell/beam edge movement according to some embodiments of inventive concepts.

In a different example, yet with a similar RAN architecture scenario, illustrated in FIG. 5, the NG-RAN Node1 indicates to the to the NG-RAN Node2 an edge movement associated to a cell or RS beam of the NG-RAN Node1 due to cell border interference. In this case, the RAN NODE CONFIGURATION UPDATE REQUEST transmitted within the first indication would indicate a different type of capacity issue and/or coverage issue (e.g., a flag denoting an edge movement due to cell border interference) as well as all information elements necessary to identify the serving cell or RS beams of the NG-RAN Node2 concerned with the capacity issue and/or the coverage issue.

FIG. 5 illustrates an example wherein the NG-RAN Node1 indicates a cell/beam edge movement to the NG-RAN Node2 due to cell border interference.

Embodiments for NG-RAN split architecture are discussed below. In one example, illustrated in FIG. 6, the first network node is a gNB central unit (gNB-CU) of a NG-RAN node, while the second network node is a gNB distributed unit (gNB-DU) of a NG-RAN node. In this case, the gNB-CU is the RRC anchor point for user devices, which transmit RRC measurements reports to the gNB-CU. Based measurements reports from user devices, such as RRC reports, the gNB-CU can detect potential coverage or capacity issues for serving cells of underlying gNB-DUs with which the gNB-CU shares a communication interface (e.g. a F1 interface).

In this example, the gNB-CU detects a capacity issue and/or a coverage issue associated to the gNB-DU. The identification of the capacity and/or coverage issues may happen in various forms. Non limiting examples are provided here for NR case: 1) The first network node is a gNB-CU-CP, the second network node is a gNB-DU and the gNB-CU-CP detects the capacity issue and/or the coverage issue autonomously; and 2) The first network node is a gNB-CU-CP, the second network node is a gNB-DU and the gNB-CU-CP receives a signals from the gNB-DU indicating the detection of the capacity issues and/or the coverage issues.

The first network node is a first gNB-CU-CP, the second network node is a gNB-DU and the first gNB-CU-CP receives a signal from a third network node, such as a second gNB-CU-CP indicating the detection of the capacity issues and/or the coverage issues.

In addition, in this case the first network node (i.e., the gNB-CU) could identify a capacity issue and/or a coverage issue associated to a cell and/or RS beams (e.g., SSB beams or CSI-RS beams) of the second node (gNB-DU) e.g. such as one of: an indication of a capacity issue; an indication of coverage issue (e.g., coverage hole); an indication of cell/beam edge movement due to cell border interference; and an indication of uplink/downlink coverage disparity.

Figure 6:
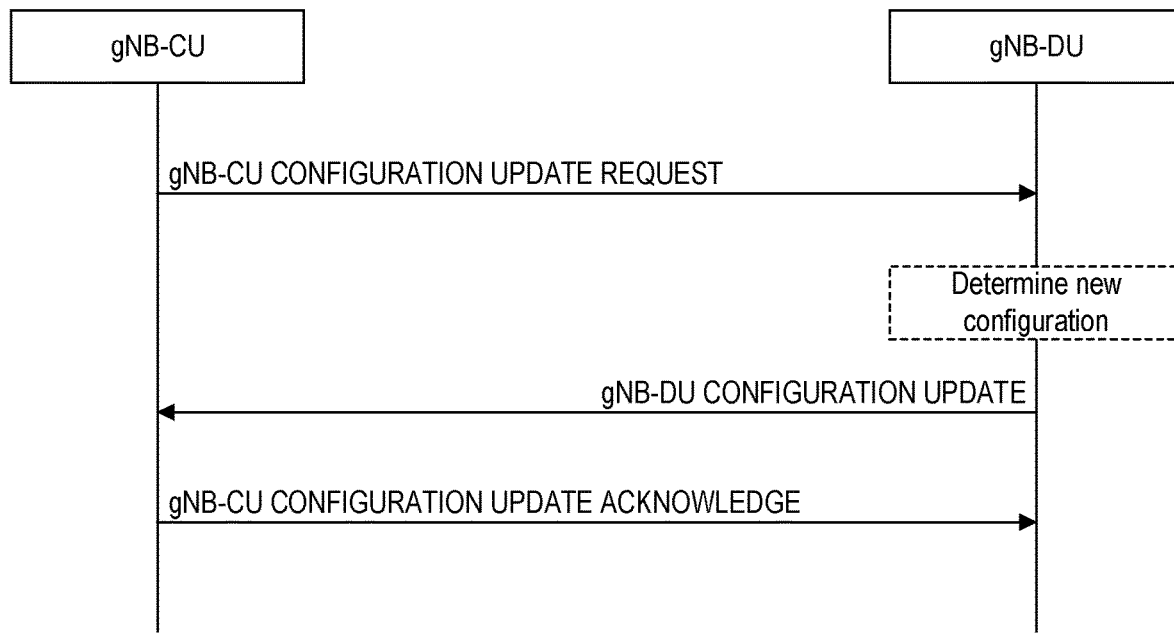
FIG. 6 is a message diagram illustrating signaling between nodes in a split node architecture according to some embodiments of inventive concepts.

FIG. 6 provides Illustration of embodiments wherein the first and second network node belong to a NG-RAN node with split architecture. In this example, the first network node is a gNB-CU and the second network node is a gNB-DU. The gNB-CU detects a coverage or capacity issue with a serving cell or a RS beam of a serving cell of the gNB-DU, while the gNB-DU resolves the issue.

Figure 7:
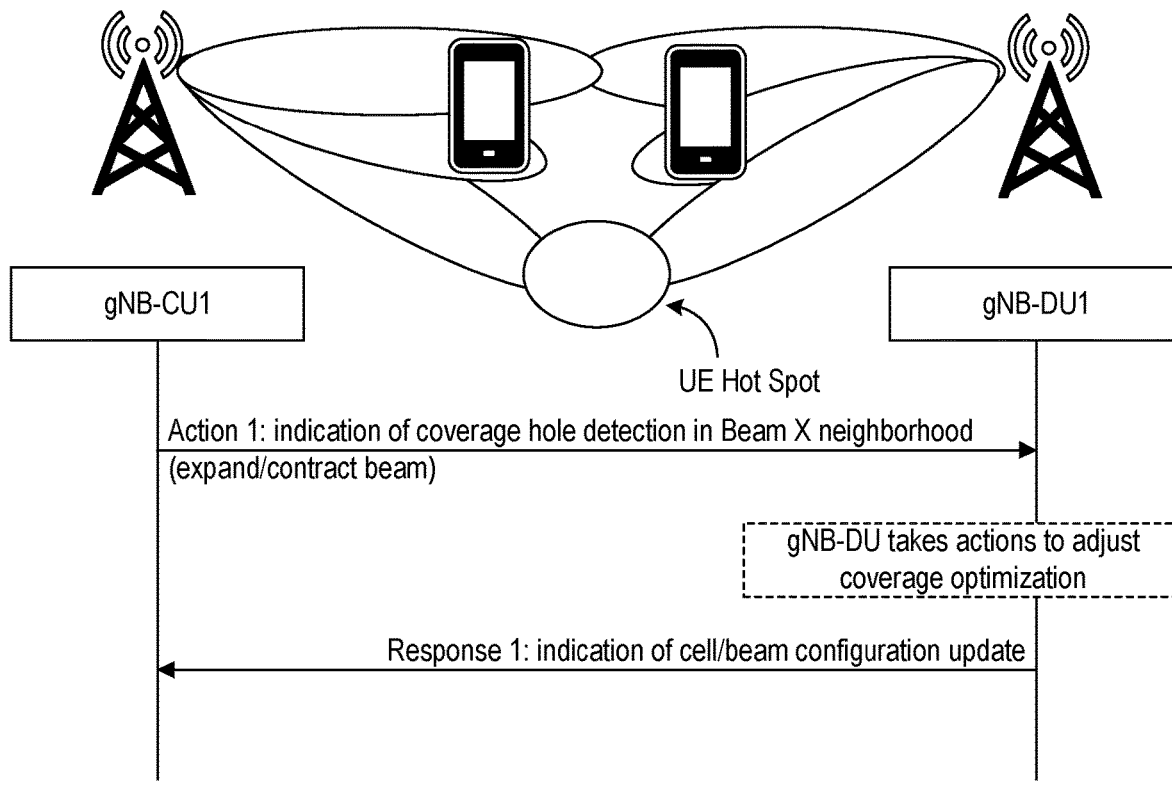
FIG. 7 is a diagram illustrating an indication of a coverage hole in a split architecture according to some embodiments of inventive concepts.

In one example, illustrated in FIGS. 6-7, the first network node (a gNB-CU) indicates to the second network node (a gNB-DU) a coverage hole in the neighborhood of one or more RS beams of the second network node. In one possible implementation of the embodiment, the first indication comprises a gNB-CU CONFIGURATION UPDATE, indicating a possible capacity issue and/or coverage issue to the gNB-DU, including, for instance one or more information elements in the group of: the identity of the concerned serving cell and RS beam of the gNB-CU; the type of capacity issue and/or coverage issue (e.g., coverage hole); and a recommended action to resolve the problem (e.g., an indication to whether to contract/expand the coverage area of a RS beam, or an indication of whether to split/merge RS beams).

The second indication transmitted by the second network node (i.e., the gNB-DU) may include a gNB-DU NODE CONFIGURATION UPDATE indicating a configuration update for at least a serving cell or for at least a RS beam of a serving cell of the gNB-DU concerned with the capacity issue and/or the coverage issue, so as to resolve the capacity issue and/or the coverage issue. The second indication transmitted by the second network node could therefore comprise a RAN NODE CONFIGURATION UPDATE indicating a configuration update for at least a serving cell or for at least a RS beam of a serving cell of the second network node resolving the capacity issue and/or the coverage issue.

FIG. 7 illustrates an example wherein the first and second network node belong to a NG-RAN node with split architecture. In this example, the first network node is a gNB-CU and the second network node is a gNB-DU, wherein the gNB-CU indicates a coverage hole to the gNB-DU in the neighborhood of a RS beam of the gNB-DU.

Figure 8:
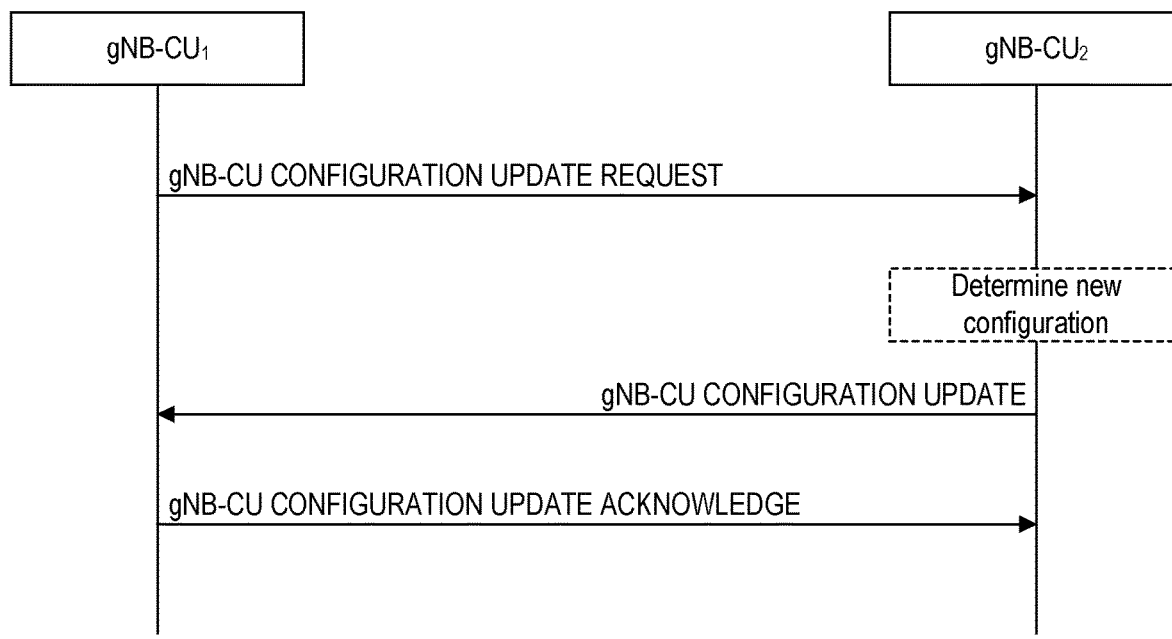
FIG. 8 is a message diagram illustrating signaling between gNB-CU nodes according to some embodiments of inventive concepts.

Additional scenarios for RAN split architecture are discussed below. In some embodiments, the first and the second network node are both gNB-CU nodes of a NG-RAN system with split architecture, as illustrated in FIG. 8. In this case, the two nodes may communicate via a Xn interface.

FIG. 8 provides Illustration of the method applied to the case wherein the first and second network node are two gNB-CU nodes of a NG-RAN system with split architecture.

In one embodiment, the first network node (the gNB-CU$_1$) indicates to the second network node (a gNB-CU$_2$) the detection of a capacity issue and/or a coverage issue associated to one or more in the group of: the identity of a serving cell or the identity of a RS beam within a serving cell of the first network node concerned with a capacity issue and/or a coverage issue; the identity of a serving cell or the identity of a RS beam within a serving cell of the first network node concerned with a capacity issue and/or a coverage issue; the type of capacity issue and/or coverage issue detected (as exemplified in previous embodiments); and a recommended action to resolve the capacity issue and/or the coverage issue (as exemplified in previous embodiments).

In one possible implementation of the embodiment, the first indication comprises a gNB-CU CONFIGURATION UPDATE REQUEST could therefore comprise the identity of the concerned serving cell and RS beam of the NG-RAN Node1 and/or of the NG-RAN Node2. Additionally, the gNB-CU CONFIGURATION UPDATE REQUEST the type of capacity issue and/or coverage issue (e.g., coverage hole), a recommended action to resolve the problem (e.g., an indication to whether to contract/expand the coverage area of a RS beam, or an indication of whether to split/merge RS beams). The second indication transmitted by the gNB-CU2 node may therefore comprise a gNB-CU CONFIGURATION UPDATE indicating a configuration update for at least a serving cell or for at least a RS beam of a serving cell of the NG- gNB-CU2 resolving the capacity issue and/or the coverage issue.

Figure 9:
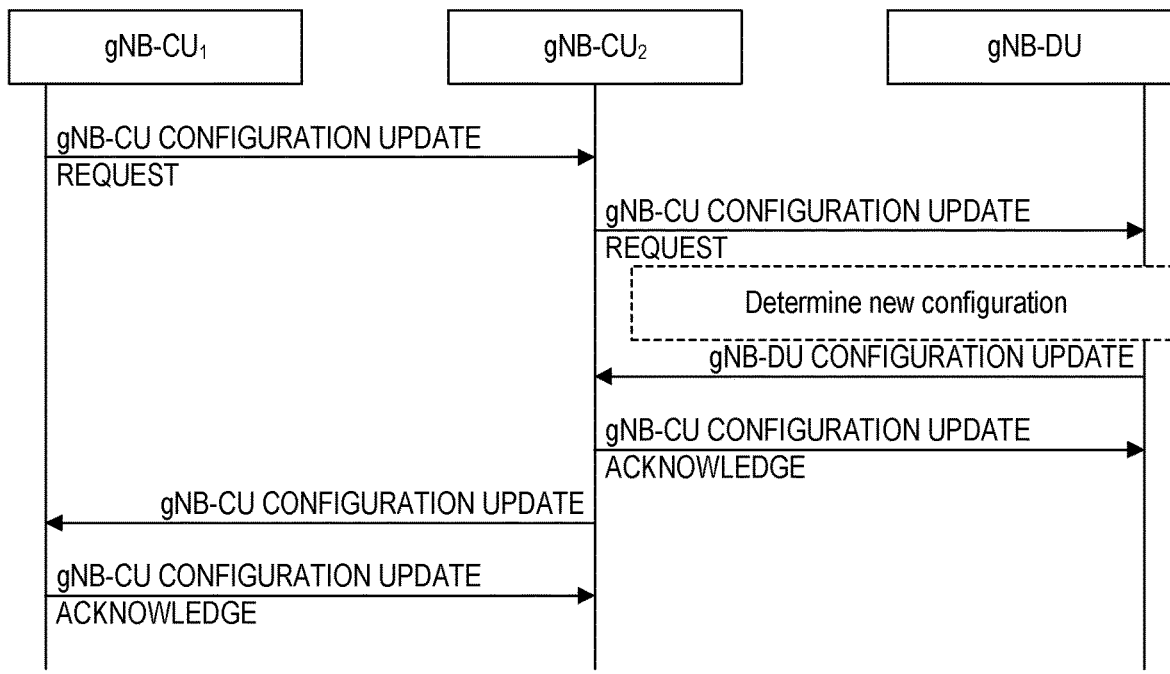
FIG. 9 is a message diagram illustrating signaling between first and second gNB-CUs and between the second gNB-CU and a gNB-DU according to some embodiments of inventive concepts.

In some embodiments, operations may be executed multiple times in cascade to resolve capacity issues and/or coverage issues with multiple RAN nodes. FIG. 9 shows an example wherein the operations are applied twice in cascade in an NG-RAN split architecture: Firstly between a gNB-CU of a first NG-RAN node with split architecture (i.e., gNB-$CU_1$) and a gNB-CU of a second NG-RAN node with split architecture (i.e., gNB-$CU_2$); then between the gNB-CU and the associated gNB-DU of the second RAN node concerned with a capacity issue and/or a coverage issue. In an alternative embodiment, not illustrated in FIG. 9, the second RAN node may trigger preexisting RAN NODE CONFIGURATION PROCEDURES based on the RAN NODE CONFIGURATION UPDATE REQUEST received from the gNB-$CU_1$, such as: a 3GPP gNB-CU CONFIGURATION UPDATE procedure between the gNB-$CU_2$ and the concerned gNB-DU; and a 3GPP gNB-DU CONFIGURATION UPDATE procedure between the gNB-DU and the corresponding gNB-$CU_2$.

FIG. 9 provides Illustration of an example wherein the method is applied twice in cascade in a RAN split architecture: the first time between a gNB-CU of a first NG-RAN node with split architecture (i.e., gNB-$CU_1$) and a gNB-CU of a second NG-RAN node with split architecture (i.e., gNB-$CU_2$); the second time between the gNB-CU and the associated gNB-DU of the second RAN node concerned with a capacity issue and/or a coverage issue. In the example of FIG. 9, a first gNB-CU (i.e., the gNB-$CU_1$) transmits the first indication to a second gNB-CU (i.e., the gNB-$CU_2$), indicating a capacity issue and/or a coverage issue with at least a serving cell or a RS beam of the gNB-$CU_1$ or of the gNB-$CU_2$. In this case the first indication could comprise a gNB-CU CONFIGURATION UPDATE REQUEST and could be transmitted over the Xn interface.

In this example, the gNB-$CU_2$ executes the operations again by sending another first indication to gNB-DU concerned with the capacity issue and/or the coverage issue detected by the gNB-$CU_1$. In this case the new first indication could comprise another gNB-CU CONFIGURATION UPDATE REQUEST, and could be transmitted over the F1 interface indication to the concerned gNB-DU the existence of a capacity issue and/or a coverage issue, as in embodiments described herein.

In this example, the concerned gNB-DU could then take an action to resolve the capacity issue and/or the coverage issue indicated by the gNB-$CU_2$ and transmit a second indication to the gNB-$CU_2$ indicating, for instance, a new RAN node configuration for the cell or RS beams that have been updated to resolve the capacity issue and/or the coverage issue. In this case the second indication may comprise a gNB-DU CONFIGURATION UPDATE and could be transmitted over the F1 interface.

In this example, the gNB-$CU_2$ can then transmit a third indication to the gNB-DU to acknowledge the new configuration received from the gNB-CU. In this case, third indication could comprise a gNB-CU CONFIGURATION UPDATE ACKNOWLEDGE and could be transmitted over the F1 interface.

In this example, the gNB-$CU_2$ can transmit another second indication to the gNB-$CU_1$, indicating, for instance, the new RAN node configuration for the cell or RS beams that have been updated to resolve the capacity issue and/or the coverage issue. In this case, additional second indication could comprise a gNB-DU CONFIGURATION UPDATE and could be transmitted over the Xn interface.

In this example, the gNB-$CU_1$ can transmit another third indication to the gNB-$CU_2$ to acknowledge the new configuration received from the gNB-$CU_2$. In this case, third indication could comprise a gNB-CU CONFIGURATION UPDATE ACKNOWLEDGE and could be transmitted over the Xn interface.

Figure 10:
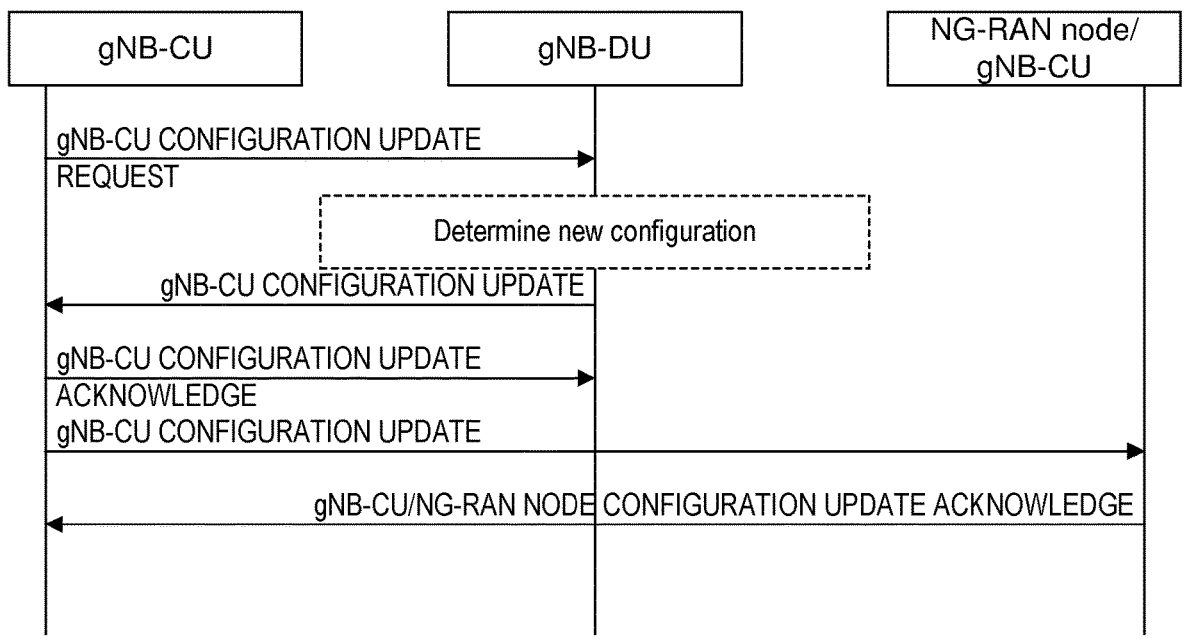
FIG. 10 is a message diagram illustrating signaling between a first gNB-CU and a gNB-DU and between the first gNB-CU and a second gNB-CU according to some embodiments of inventive concepts.

In another example, illustrated in FIG. 10, a procedure is applied between a first network node and a second network node and the first network node, upon receiving a second indication comprising a RAN node configuration update for a serving cell or RS beam of the second network node, further transmits the received information to a third network node. This example illustrates the case wherein the first network node is a gNB-CU, the second network node is a gNB-DU connected to the gNB-CU with a F1 interface or similar, whereas the third network node could be NG-RAN node, an eNB, a gNB-CU etc. Upon receiving a second indication from the gNB-DU, the gNB-CU further forwards all or part of the information received with the second indication to another RAN node, for instance in terms of a gNB-CU CONFIGURATION UPDATE.

FIG. 10 illustrates an example wherein the first network node is a gNB-CU, the second network node is a gNB-DU connected to the gNB-CU with a F1 interface or similar, and the gNB-CU further forwards all or part of the information received from the gNB_DU to a third network node, such as an NG-RAN node, an eNB, a gNB-CU etc.

Embodiments for inter-RAT architecture are discussed below. In some embodiments, the first network node and the second network node are RAN nodes of different radio access network technologies, such as: an NG-RAN node of a 3GGP NG-RAN system; an eNB node of a 3GPP LTE system; and a RAN node operating on unlicensed spectrum, such as a WiFi access point.

Figure 11A:
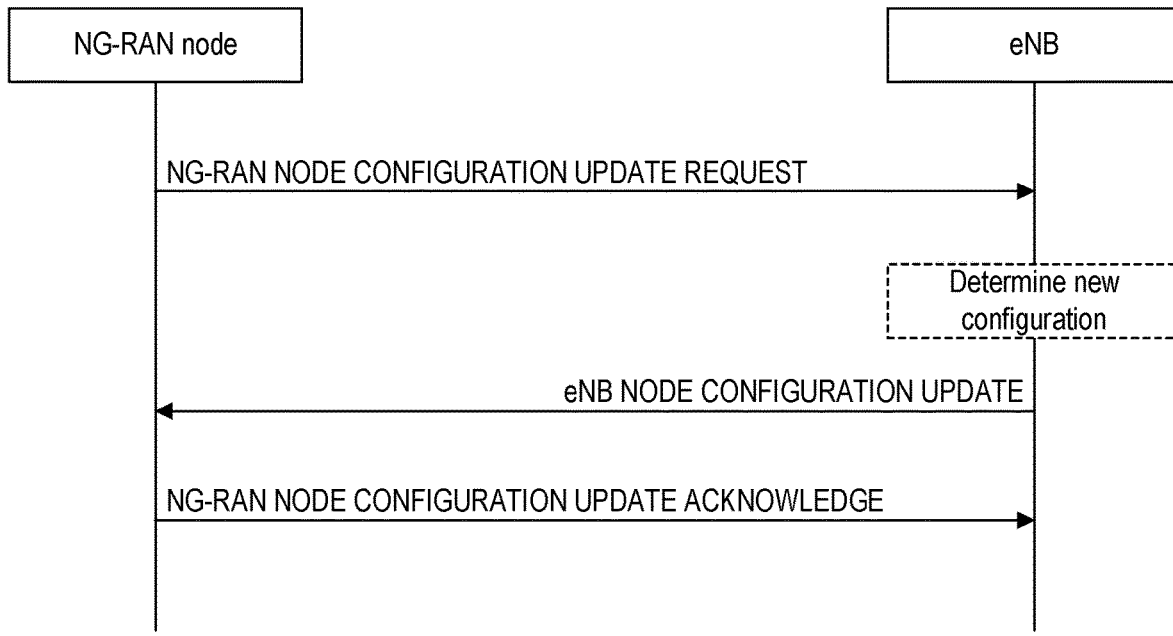
FIGS. 11A-B are message diagrams illustrating signaling between an NG-RAN node and an eNB according to some embodiments of inventive concepts.
Figure 11B:
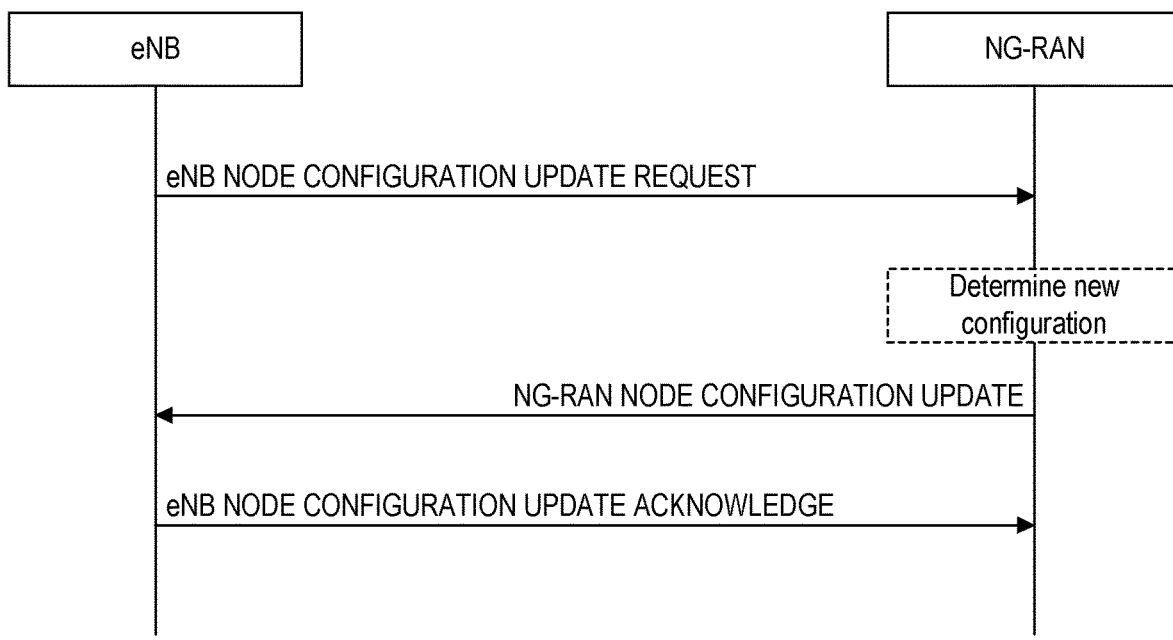

FIGS. 11A-B illustrate two examples of inter-RAT application of the method. In both examples, the method is applied between a 3GPP NG-RAN node and a 3GPP LTE node. In FIG. 11A, the first network node is a NG-RAN node and the second network node is an LTE node, such as an eNB. In FIG. 11B the first network node is a 3GPP LTE eNB and the second network node is an NG-RAN node. In both examples, the first and second network node could communicate over an X2 interface.

FIGS. 11A-B show examples of inter-RAT application of the method. In both examples, the method is applied between a 3GPP NG-RAN node and a 3GPP LTE node. In FIG. 11A, the first network node is a NG-RAN node and the second network node is an LTE node, such as an eNB. Therefore, in this example an NG-RAN node could request of require a 3GPP LTE eNB to update the configuration for a serving radio cell so as to resolve a capacity issue and/or a coverage issue. In FIG. 11B the first network node is a 3GPP LTE eNB and the second network node is an NG-RAN node. In both examples, the first and second network node could communicate over an X2 interface. In this case, in this example a 3GPP LTE eNB could request of require a 3GPP NR node to update the configuration for a serving radio cell to resolve a capacity issue and/or a coverage issue. It is clear to the skilled reader that similar examples could be devised between any two nodes of different radio access technologies sharing a communication interface.

Figure 12:
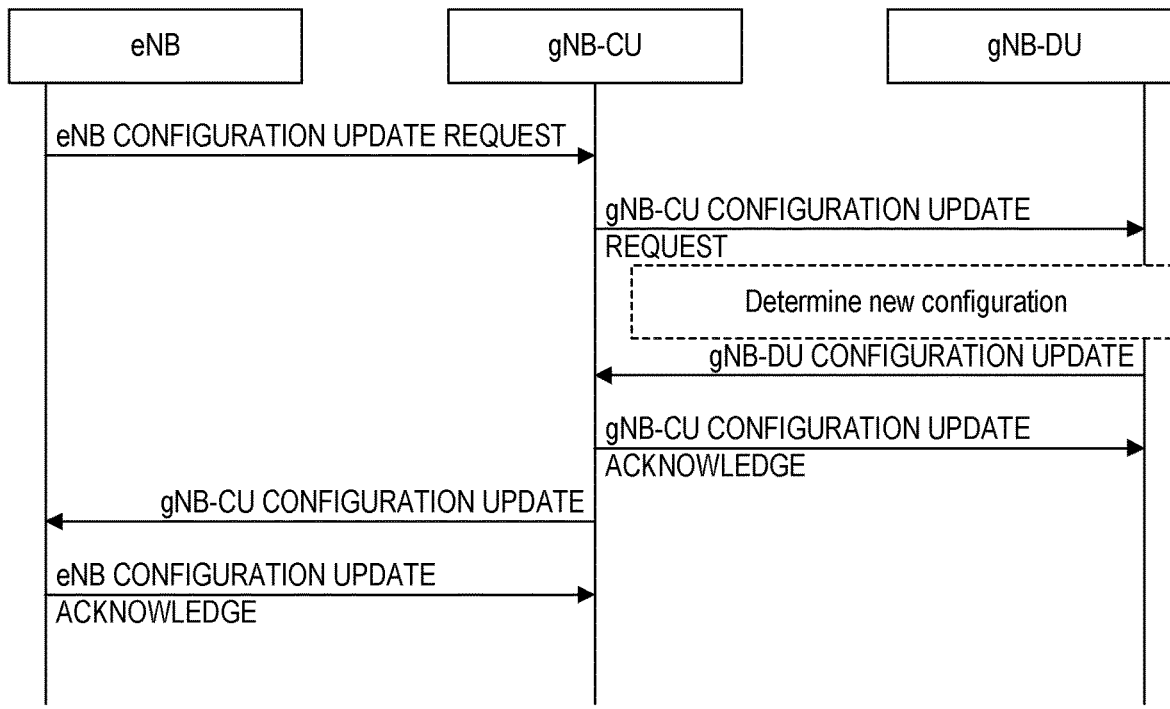
FIG. 12 is a message diagram illustrating signaling between an eNB and a gNB-CU and between the gNB-CU and a gNB-DU according to some embodiments of inventive concepts.

Additional scenarios with inter-RAN architectures are discussed below. Some embodiments herein can be combined to resolve coverage and capacity issues with multiple RAN nodes of different RATs. FIG. 12 shows an example in which a procedure is applied twice in cascade: the first time between a eNB ad a gNB-CU of a NG-RAN node with split architecture, the second time between the gNB-CU and the associated gNB-DU concerned with a capacity issue and/or a coverage issue. The example follows the same steps described for FIG. 9.

Figure 13:
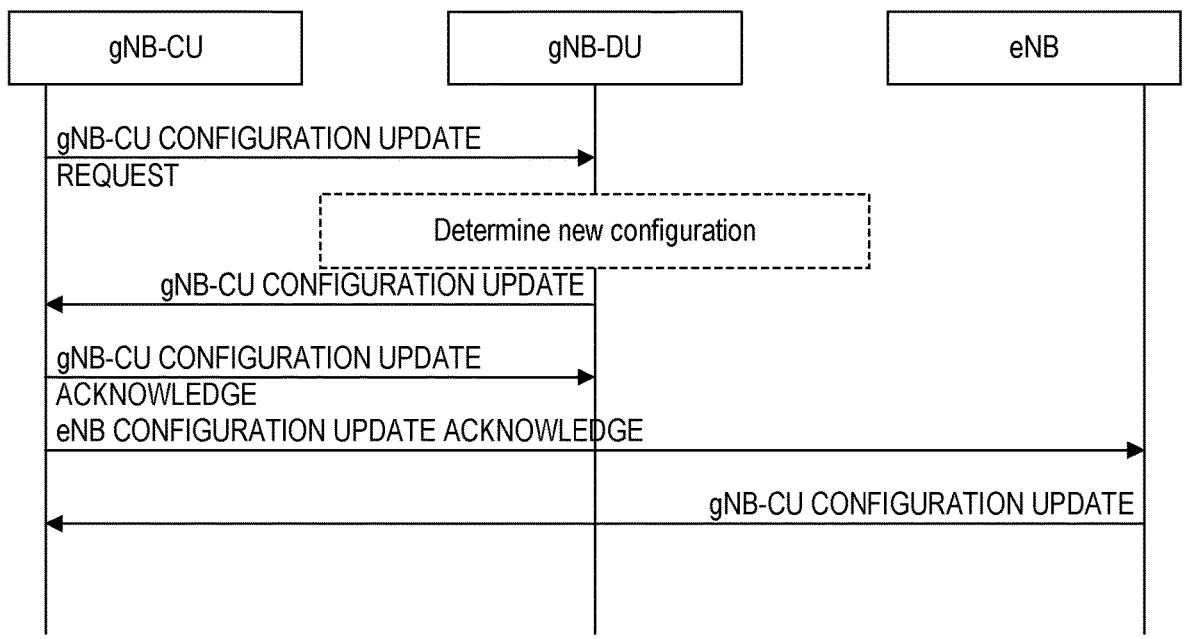
FIG. 13 is a message diagram illustrating signaling between a gNB-CU and a gNB-DU and between the gNB-CU and an eNB according to some embodiments of inventive concepts.

FIG. 12 illustrates an example wherein the method is applied twice in cascade: the first time between a eNB ad a gNB-CU of a NG-RAN node with split architecture, the second time between the gNB-CU and the associated gNB-DU concerned with a capacity issue and/or a coverage issue In another example, illustrated in FIG. 13, the first network node is a gNB-CU, the second network node is a gNB-DU connected to the gNB-CU with a F1 interface or similar. Upon receiving a second indication from the gNB-DU, the gNB-CU further forwards all or part of the information received with the second indication to another RAN node, for instance in terms of a gNB-CU CONFIGURATION UPDATE. This example is similar to the example previously illustrated in FIG. 10.

FIG. 13 illustrates an example wherein the first network node is a gNB-CU, the second network node is a gNB-DU connected to the gNB-CU with a F1 interface or similar, and the gNB-CU further forwards all or part of the information received from the gNB-DU to a third network node of another RAT, such an eNB.

Figure 14:
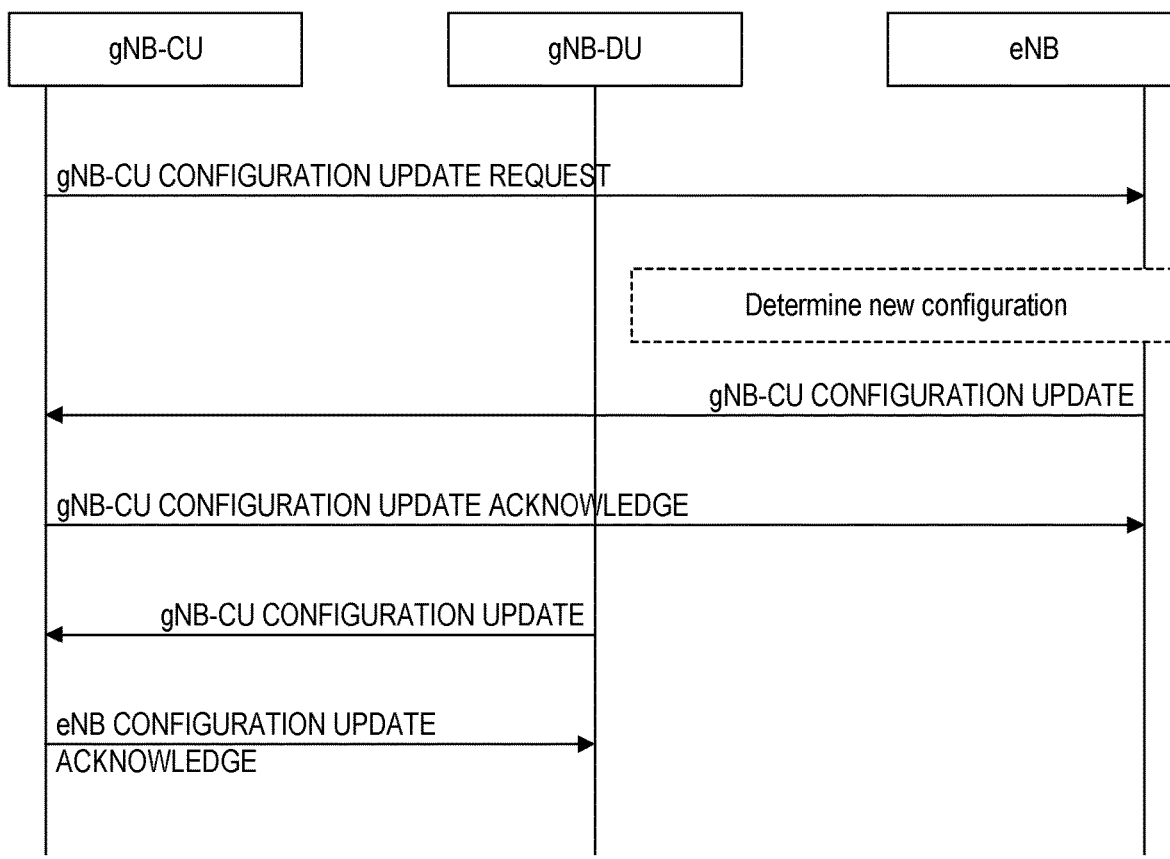
FIG. 14 is a message diagram illustrating signaling between a gNB-CU and an eNB and between the gNB-CU and a gNB-DU according to some embodiments of inventive concepts.

In another example, illustrated in FIG. 14, the first network node is a gNB-CU of a NG-RAN node with split architecture, whereas the second network node is a RAN node belonging to a different radio access technology, such as 3GPP LTE eNB. In this case, upon receiving a second indication from the eNB comprising a eNB CONFIGURATION UPDATE (e.g., over a X2 interface or similar), the gNB-CU forwards all or part of the information comprised in the eNB CONFIGURATION UPDTE to a gNB-DU within which shares a communication interface (such as a F1 interface or similar).

FIG. 14 illustrates an example wherein the first network node is a gNB-CU of a NG-RAN node with split architecture, whereas the second network node is a RAN node belonging to a different radio access technology, such as 3GPP LTE eNB. Upon receiving a second indication from the eNB comprising a eNB CONFIGURATION UPDATE (e.g., over a X2 interface or similar), the gNB-CU forwards all or part of the information comprised in the eNB CONFIGURATION UPDTE to a gNB-DU within which shares a communication interface (such as a F1 interface or similar).

Operations executed by a second network node are discussed below. According to some embodiments, operations may be executed by a second network node to improve/optimize the coverage area of reference signal (RS) beams. The operations can include receiving a first indication from a first network node. The first indication can include a RAN NODE CONFIGURATION UPDATE REQUEST message. The operations can further include determining a new RAN NODE CONFIGURATION UPDATE for at least a serving cell of the second network node or to at least a RS beam coverage area of a serving cell of the second network node based on the first indication. The operations can further include transmitting a second indication to the first network node. The second indication includes a RAN NODE CONFIGURATION UPDATE associated to the at least one serving cell or to at least a RS beam coverage area of the second network node.

The operations can further include receiving a third indication from the first network node. The third indication comprising a RAN NODE CONFIGURATION UPDATE ACKNOWLEDGE.

Based on the information included in the first indication, the second network node may determine a RAN NODE CONFIGURATION UPDATE for at least a serving cell of the second network node or to at least a RS beam coverage area of a serving cell which may: contract the coverage area of the serving cell and/or the RS beam; expand the coverage area of the serving cell and/or RS beam; merge the coverage area of two or more serving cells or RS beams; and split the coverage area of a serving cell and/or RS beam.

In some embodiments, the RAN NODE CONFIGURATION UPDATE transmitted within the second indication the second network may include a coverage modification list including: a list of cells and RS beams (such as SSB beams or CSI-RS beams) valid before the coverage modification; a list of cells and RS beams (such as SSB beams or CSI-RS beams) valid after the coverage modification; and a deployment status indicator to indicate if the cell related and SSB beam related coverage state are planned to be used at the next reconfiguration.

The list of cells and RS beams (such as SSB beams or CSI-RS beams) valid before the coverage modification can include: a NR Global Cell Identifier of the cell to be modified; a cell-related coverage state, coded as an index indicating if the cell is active in the new configuration and the configuration of the concerned cell; an identifier of the RS beams (such as SSB beams or CSI-RS beams). For SSB beams, the identifier may be the SS/PBCH block index; and an RS beam related coverage state (such as, for SSB beams or CSI-RS beams), coded as an index indicating if the RS beam is active in the new configuration and the configuration of the concerned RS beam.

The list of cells and RS beams (such as SSB beams or CSI-RS beams) valid after the coverage modification can include: a NR Global Cell Identifier of the cell to be modified; a cell-related coverage state, coded as an index indicating if the cell is active in the new configuration and the configuration of the concerned cell; an identifier of the RS beams (such as SSB beams or CSI-RS beams). For SSB beams, the identifier may be the SS/PBCH block index; a RS beam related coverage state (such as, for SSB beams or CSI-RS beams), coded as an index indicating if the RS beam is active in the new configuration and the configuration of the concerned RS beam; and a deployment status indicator to indicate if the cell related and SSB beam related coverage state are planned to be used at the next reconfiguration According to some embodiments, capacity issues and/or coverage issues may not be solved directly. In some examples, the operations may be applied iteratively to solve detected capacity and/or coverage issues by a node. A non-limiting example for the NR case is detailed here below. First, a first gNB-CU-CP1 can detect capacity and/or the coverage issues in one of the cells controlled by one of the gNB-DU of the same gNB. A configuration update can be sent from the gNB-CU-CP1 to the gNB-DU in a gNB-CU CONFIGURATION UPDATE message indicating the capacity issue and/or the coverage issue detection. The gNB-DU is not able to solve the issue and a gNB-CU CONFIGURATION UPDATE FAILURE is sent back to the gNB-CU-CP1. Next, the gNB-CU-CP1 may decide to try to solve the capacity issue and/or the coverage issue by contacting a second gNB-CU-CP2 controlling cells that are neighbors of the cells where capacity issues and/or the coverage issues have been detected.

An example of an implementation in an EN-DC scenario is discussed below. For EN-DC scenario, the EN-DC Configuration Update is extended to inform a neighbor RAN node upon the modification of the cell coverage. In some embodiments, an eNB sends the extended configuration update towards a gNB by including LTE related information concerning a modification of coverage for LTE cells served by the eNB sending the message. In additional or alternative embodiments, an additional information concerning the modification of coverage for LTE or NR cells served by a third RAN node, neighbor to the eNB sending the message.

In some embodiments, a gNB sends the extended configuration update towards an eNB by including NR related information concerning a modification of the NR cell coverage. In additional or alternative embodiments, additional information concerning the modification of coverage for LTE or NR cells served by a third RAN node, neighbor to the gNB sending the message.

An example of an approach for EN-DC is discussed below that extends/modifies the existing X2AP signaling. The table in FIG. 38 is modified from 3GPP TS 36.423.

Modified Sections of 3GPP TS 36.423 are provided below according to some embodiments of inventive concepts. As set forth below, some sections of 3GPP TS 36.423 may be modified/added.

In some embodiments, the purpose of the EN-DC Configuration Update procedure is to request to update application level configuration data needed for eNB and en-gNB to interoperate correctly over the X2 interface. The procedure uses non UE-associated signaling.

Figure 15:
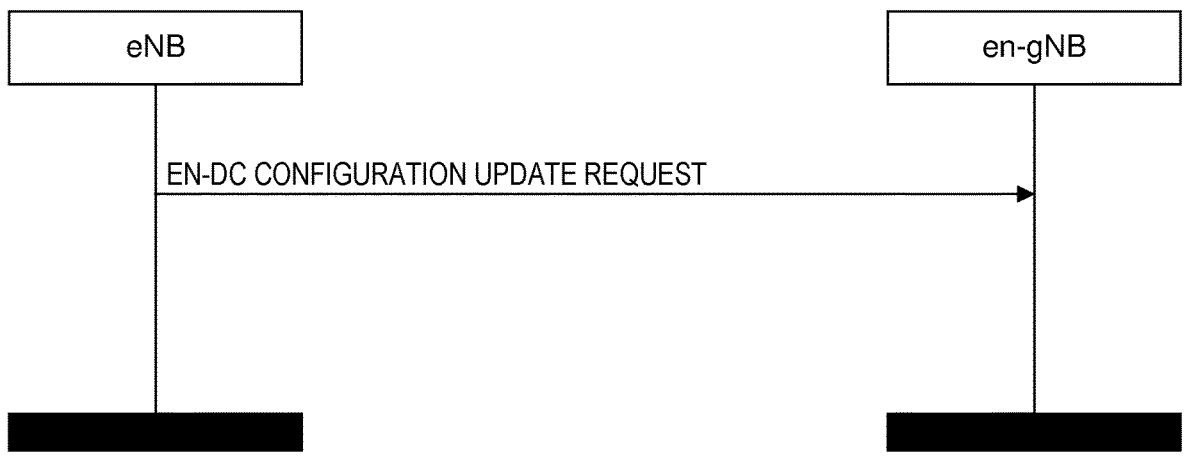
FIGS. 15-16 are message diagrams illustrating an EN-DC configuration update request messages according to some embodiments of inventive concepts.

FIG. 15 illustrates an example of an eNB initiated EN-DC Configuration Update request with successful operation.

Figure 16:
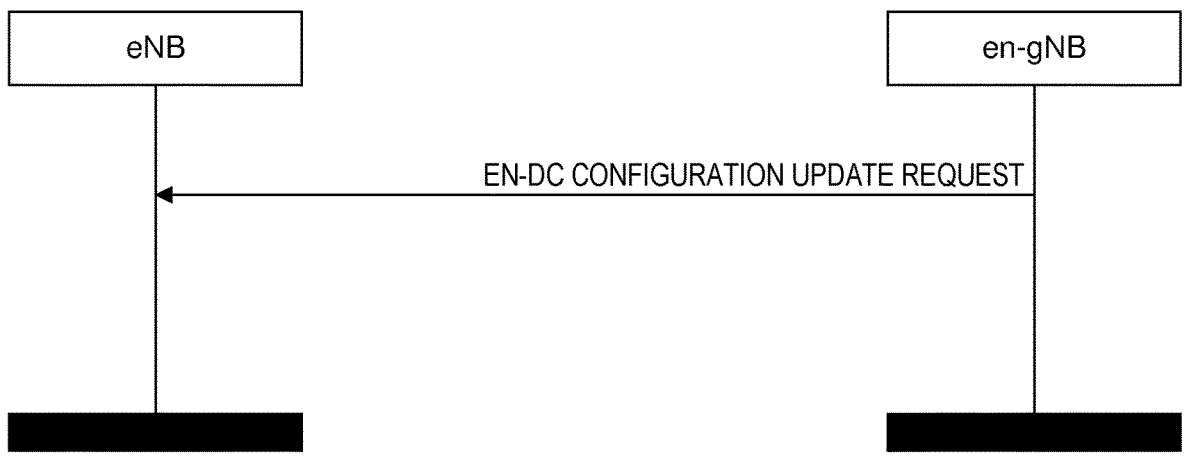

FIG. 16 illustrates an example of an en-gNB initiated EN-DC Configuration Update request with successful operation.

In some embodiments, an eNB can initiate the procedure by sending an EN-DC CONFIGURATION UPDATE REQUEST message to a peer en-gNB. If the CCO Issue detection IE is present, the en-gNB shall, if supported, use it to generate the EUTRA Coverage Modification List IE and include the list in the EN-DC CONFIGURATION UPDATE message.

In some embodiments, an en-gNB can initiate the procedure by sending an EN-DC CONFIGURATION UPDATE REQUEST message to an eNB. If the CCO Issue detection IE is present, the en-gNB shall, if supported, use it to generate the NG-RAN Coverage Modification List IE and include the list in the EN-DC CONFIGURATION UPDATE message.

In some embodiments, the EN-DC CONFIGURATION UPDATE REQUEST message can be sent by an initiating node to a peer neighboring node, both nodes are able to interact for EN-DC, to request an updated information for a TNL association. FIG. 41 illustrates an example of IEs in a EN-DC Configuration Update Request message.

In some embodiments, the purpose of the EN-DC Configuration Update procedure can be to update application level configuration data needed for eNB and en-gNB to interoperate correctly over the X2 interface. Update of application level configuration data also applies between eNB and en-gNB in case the SN (i.e. the en-gNB) does not broadcast system information other than for radio frame timing and SFN, as specified in the TS 37.340 [32]. How to use this information when this option is used is not explicitly specified. The procedure uses non UE-associated signaling.

Figure 17:
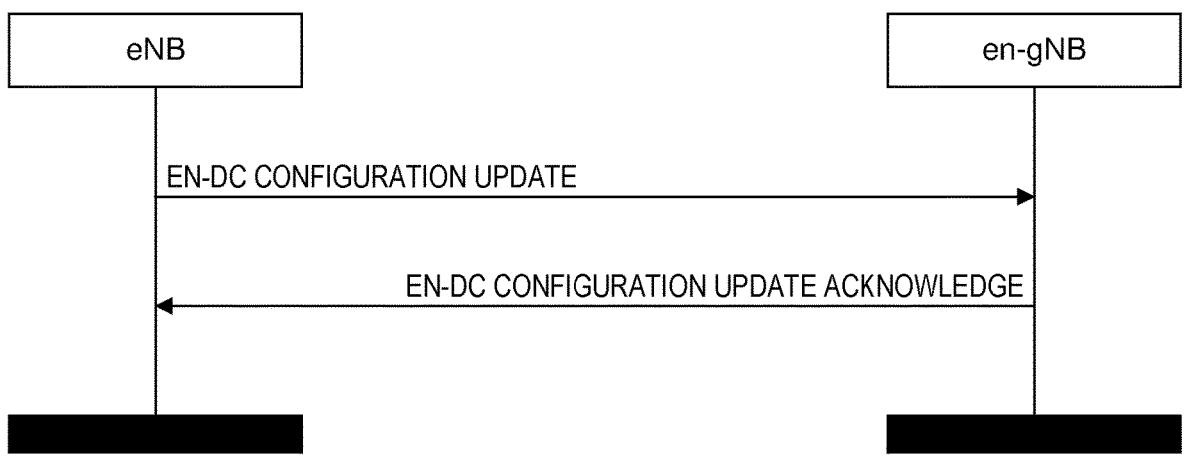
FIGS. 17-18 are message diagrams illustrating EN-DC configuration update messages according to some embodiments of inventive concepts.

FIG. 17 illustrates an example of an eNB Initiated EN-DC Configuration Update, successful operation.

Figure 18:
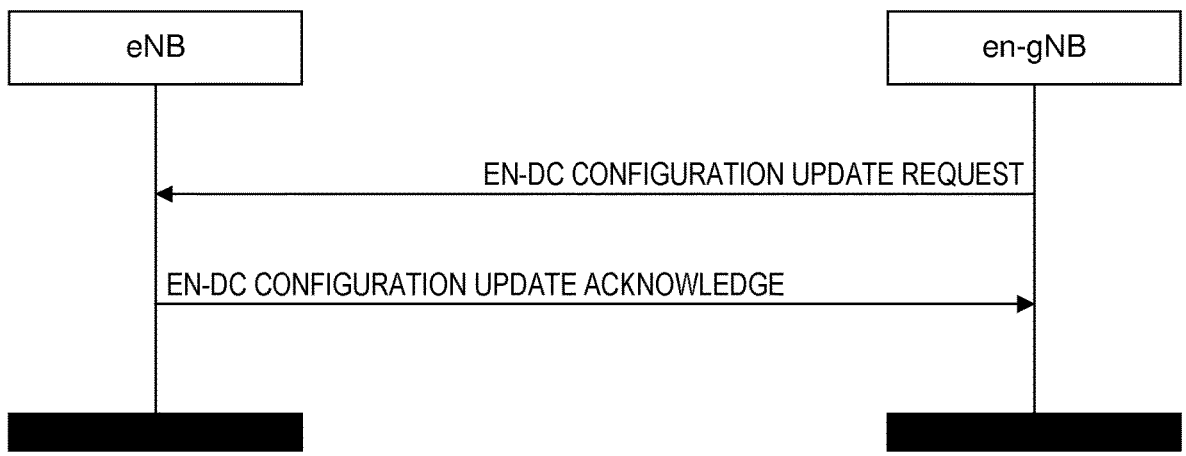

FIG. 18 illustrates an example of an en-gNB Initiated EN-DC Configuration Update, successful operation.

In some examples of network sharing with multiple cell ID broadcast with shared X2-C signaling transport, as specified in TS 36.300 [15], the EN-DC CONFIGURATION UPDATE message and the EN-DC CONFIGURATION UPDATE ACKNOWLEDGE message shall include the Interface Instance Indication IE to identify the corresponding interface instance.

In some embodiments, an eNB initiates the procedure by sending an EN-DC CONFIGURATION UPDATE message to a peer en-gNB.

In some embodiments, after successful update of requested information, en-gNB shall reply with the EN-DC CONFIGURATION UPDATE ACKNOWLEDGE message to inform the initiating eNB that the requested update of application data was performed successfully.

In some embodiments, if the Cell Assistance Information IE is present, the en-gNB shall, if supported, use it to generate the List of Served NR Cells IE and include the list in the EN-DC CONFIGURATION UPDATE ACKNOWLEDGE message. If the EN-DC CONFIGURATION UPDATE REQUEST message contains the Protected E-UTRA Resource Indication IE, the receiving en-gNB should take this into account for cell-level resource coordination with the eNB. The en-gNB shall consider the received Protected E-UTRA Resource Indication IE content valid until reception of a new update of the IE for the same eNB. The protected resource pattern indicated in the Protected E-UTRA Resource Indication IE is not valid in subframes indicated by the Reserved Subframes IE, as well as in the non-control region of the MBSFN subframes i.e. it is valid only in the control region therein. The size of the control region of MBSFN subframes is indicated in the Protected E-UTRA Resource Indication IE.

In some embodiments, the eNB may initiate a further EN-DC Configuration Update procedure only after a previous EN-DC Configuration Update procedure has been completed.

In some embodiments, if Supplementary Uplink is configured at the en-gNB, the en-gNB shall include in the EN-DC CONFIGURATION UPDATE ACKNOWLEDGE message the SUL Information IE and the Supported SUL band List IE for each cell added in the Served NR Cells To Add IE and in the Served NR Cells To Modify IE.

In some embodiments, if the EN-DC CONFIGURATION UPDATE message contains the TNL Transport Layer Address info IE, the receiving en-gNB shall, if supported, take this into account for IPSEC tunnel establishment.

In some embodiments, if the EN-DC CONFIGURATION UPDATE ACKNOWLEDGE message contains the TNL Transport Layer Address info IE, the receiving eNB shall, if supported, take this into account for IPSEC tunnel establishment.

In some embodiments, if the NR Cell PRACH Configuration IE is included in the Served NR Cell Information IE contained in the EN-DC CONFIGURATION UPDATE ACKNOWLEDGE message, the eNB may update the information.

In some embodiments, if the CSI-RS Transmission Indication IE is contained in the EN-DC CONFIGURATION UPDATE message, en-gNB may use this information for neighbor NR cell's CSI-RS measurement.

In some embodiments, if the EUTRA Coverage Modification List IE is present, en-gNB may use the information in the EUTRA Cell Coverage State IE to identify the cell deployment configuration enabled by eNB and for configuring the mobility towards the cell(s) indicated by the ECGI IE, as described in TS 36.300 [15].

In some embodiments, if the EUTRA Cell Deployment Status Indicator IE is present in the EUTRA Coverage Modification List IE, the en-gNB shall consider the cell deployment configuration of the cell to be modified as the next planned configuration and shall remove any planned configuration stored for this cell.

In some embodiments, if the EUTRA Cell Deployment Status Indicator IE is present and the EUTRA Cell Replacing Info IE contains non-empty cell list, the en-gNB may use this list to avoid connection or re-establishment failures during the reconfiguration, e.g. consider the cells in the list as possible alternative handover targets.

In some embodiments, if the EUTRA Cell Deployment Status Indicator IE is not present, the en-gNB shall consider the cell deployment configuration of cell to be modified as activated and replace any previous configuration for the cells indicated in the EUTRA Coverage Modification List IE.

In some embodiments, an en-gNB initiates the procedure by sending an EN-DC CONFIGURATION UPDATE message to an eNB.

In some embodiments, if Supplementary Uplink is configured at the en-gNB, the en-gNB shall include in the EN-DC CONFIGURATION UPDATE message the SUL Information IE and the Supported SUL band List IE for each served cell added in the Served NR Cells To Add IE and in the Served NR Cells To Modify IE.

In some embodiments, if the Deactivation Indication IE is contained in the Served NR Cells To Modify IE, it indicates that the concerned NR cell was switched off to lower energy consumption, and is available for activation on request from the eNB, as described in TS 36.300 [15].

In some embodiments, if the NG-RAN Coverage Modification List IE is present, the eNB may use the information in the NR Cell Coverage State IE to identify the NR cell deployment configuration and for configuring the mobility towards the NR cell(s) indicated by the NR CGI IE, as described in TS 38.300 [47].

In some embodiments, if the NG-RAN Deployment Status Indicator IE is present in the NG-RAN Coverage Modification List IE, the eNB shall, if supported, consider the NR cell deployment configuration of the NR cells to be modified as the next planned configuration and shall remove any planned configuration stored for this cell.

In some embodiments, if the NG-RAN Deployment Status Indicator IE is present and the NG-RAN Replacing Info IE contains non-empty cell list, the eNB may use this list to avoid connection or re-establishment failures during the reconfiguration, e.g. consider the cells in the list as possible alternative handover targets.

In some embodiments, if the NG-RAN Deployment Status Indicator IE is not present, the eNB shall, if supported, consider the NR cell deployment configuration of NR cell to be modified as activated and replace any previous configuration for the NR cells indicated in the NG-RAN Coverage Modification List IE.

In some embodiments, after successful update of requested information, eNB shall reply with the EN-DC CONFIGURATION UPDATE ACKNOWLEDGE message to inform the initiating en-gNB that the requested update of application data was performed successfully. In case the eNB receives an EN-DC CONFIGURATION UPDATE without any IE except for Message Type IE it shall reply with EN-DC CONFIGURATION UPDATE ACKNOWLEDGE message without performing any updates to the existing configuration.

In some embodiments, upon reception of an EN-DC CONFIGURATION UPDATE message, eNB shall update the information for en-gNB as follows: Update of Served NR Cell Information; and Update of SCTP associations.

Update of Served NR Cell Information can include: if Served NR Cells To Add IE is contained in the EN-DC CONFIGURATION UPDATE message, eNB shall add cell information according to the information in the Served NR Cell Information IE; if Served NR Cells To Modify IE is contained in the EN-DC CONFIGURATION UPDATE message, eNB shall modify information of cell indicated by Old NR-CGI IE according to the information in the Served NR Cell Information IE; and if Served NR Cells To Delete IE is contained in the EN-DC CONFIGURATION UPDATE message, eNB shall delete information of cell indicated by Old NR-CGI IE.

The en-gNB may initiate a further EN-DC Configuration Update procedure only after a previous EN-DC Configuration Update procedure has been completed. If the EN-DC CONFIGURATION UPDATE message contains the TNL Transport Layer Address info IE, the receiving eNB shall, if supported, take this into account for IPSEC tunnel establishment. If the EN-DC CONFIGURATION UPDATE ACKNOWLEDGE message contains the TNL Transport Layer Address info IE, the receiving en-gNB shall, if supported, take this into account for IPSEC tunnel establishment. If the NR Cell PRACH Configuration IE is included in the Served NR Cell Information IE contained in the EN-DC CONFIGURATION UPDATE message, the eNB may update the information. If the CSI-RS Transmission Indication IE is contained in the EN-DC CONFIGURATION UPDATE message, eNB should take it into account when forwarding neighbor NR cell's CSI-RS configuration.

Update of SCTP associations can include, If the TNL Association to Add List IE is included in the EN-DC CONFIGURATION UPDATE message, the receiving eNB shall, if supported, use it to establish the TNL association(s) with the en-gNB. The eNB shall report to the en-gNB, in the EN-DC CONFIGURATION UPDATE ACKNOWLEDGE message, the successful establishment of the TNL association(s) with the en-gNB as follows: alist of successfully established TNL associations shall be included in the TNL Association Setup List IE; and alist of TNL associations that failed to be established shall be included in the TNL Association Failed to Setup List IE.

If the TNL Association to Remove List IE is included in the EN-DC CONFIGURATION UPDATE message, the receiving eNB shall, if supported, initiate removal of the TNL association(s) indicated by the received Transport Layer information towards the en-gNB. If the TNL Association to Update List IE is included in the EN-DC CONFIGURATION UPDATE message the receiving eNB shall, if supported, update the TNL association(s) indicated by the received Transport Layer information towards the en-gNB.

In some embodiments, a EN-DC CONFIGURATION UPDATE message can be sent by an initiating node to a peer neighboring node, both nodes able to interact for EN-DC, to transfer updated information for a TNL association. The table in FIGS. 40-42 illustrate an example of information associated with the EN-DC CONFIGURATION UPDATE message.

In some embodiments, NR Neighbor Information IE includes cell configuration information of NR cells that a neighbor node may need for the X2 AP interface. An example of implementation in an NR-DC scenario is illustrated in FIG. 43 and discussed below.

For the NR-DC scenario, the NG-RAN Node Configuration Update is extended to inform the neighbor node upon the modification of the cell coverage.

In some embodiments, a gNB sends the extended configuration update towards a gNB by including NR related information concerning a modification of the NR cell coverage. In additional or alternative embodiments, additional information concerning the modification of coverage for LTE or NR cells served by a third RAN node, neighbor to the gNB sending the message.

An example of an approach for NR-DC is provided below. The proposed approach extends the existing XnAP signaling.

The table of FIG. 44 is modified from 3GPP TS 38.423 v16.2.0. Modified Sections of 3GPP TS 38.423 are provided according to some embodiments of inventive concepts.

In some embodiments, a purpose of the NG-RAN node Configuration Update Request procedure is to request the update of application level configuration data needed for two NG-RAN nodes to interoperate correctly over the Xn-C interface. The procedure uses non UE-associated signaling.

Figure 19:
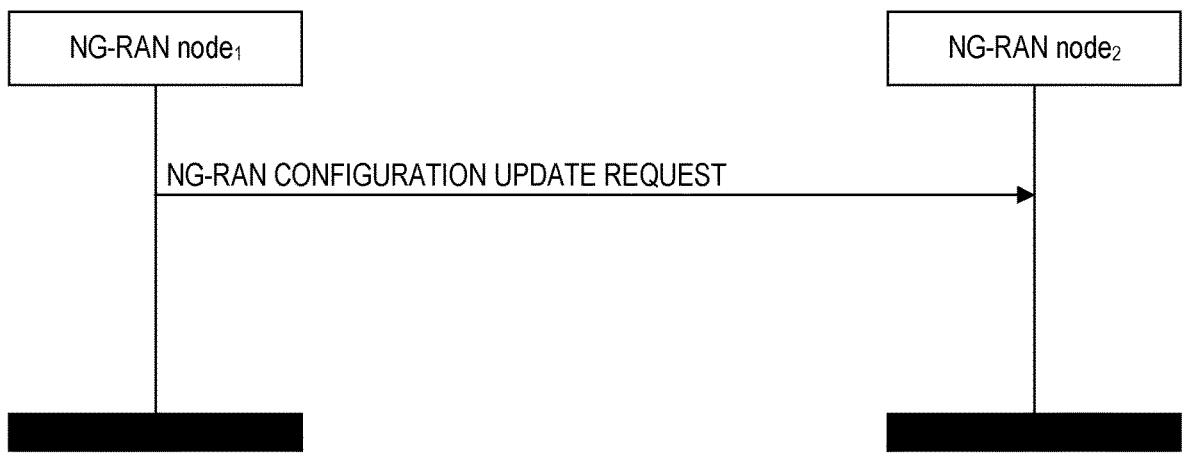
FIG. 19 is a message diagram illustrating an NG-RAN Configuration update request message according to some embodiments of inventive concepts.

FIG. 19 illustrates an example of a NG-RAN node Configuration Update Request, successful. The NG-RAN node$_1$ initiates the procedure by sending the NG-RAN NODE CONFIGURATION UPDATE REQUEST message to a peer NG-RAN node$_2$. In some examples, if the CCO Issue detection IE is present, the NG-RAN node$_2$ shall, if supported, use it to generate the NG-RAN Coverage Modification List IE and include it in the NG-RAN NODE CONFIGURATION UPDATE message.

In some embodiments, a NG-RAN NODE CONFIGURATION UPDATE REQUEST message is sent by a NG-RAN node to a neighboring NG-RAN node to request the update of application level configuration data. FIG. 39 illustrates an example of IEs of a a NG-RAN NODE CONFIGURATION UPDATE REQUEST message.

Figure 20:
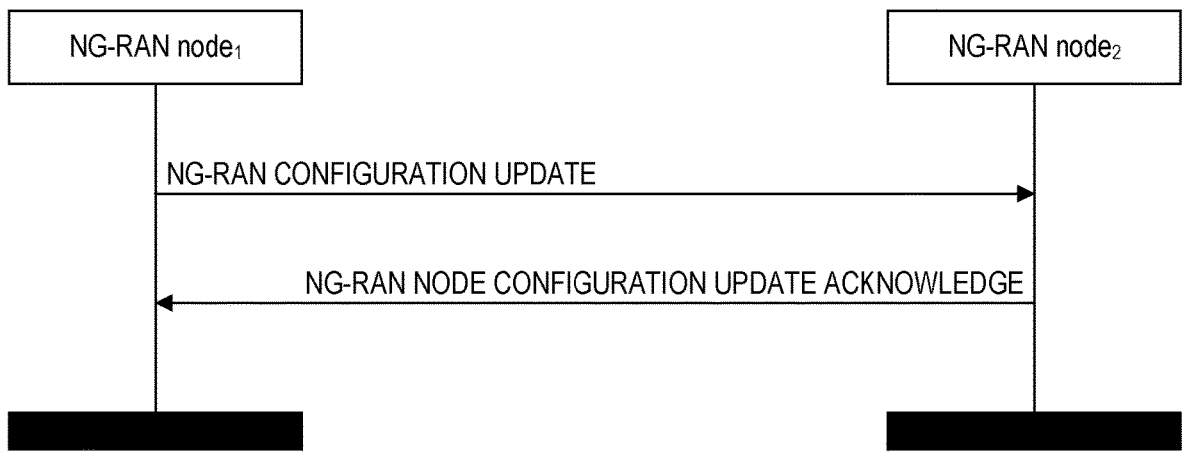
FIG. 20 is a message diagram illustrating an NG-RAN node configuration update message according to some embodiments of inventive concepts.

In some embodiments, the purpose of the NG-RAN node Configuration Update procedure is to update application level configuration data needed for two NG-RAN nodes to interoperate correctly over the Xn-C interface. The procedure uses non UE-associated signaling. FIG. 20 illustrates an example of a NG-RAN node Configuration Update, successful operation.

In some embodiments, the NG-RAN node$_1$ initiates the procedure by sending the NG-RAN NODE CONFIGURATION UPDATE message to a peer NG-RAN node$_2$. If Supplementary Uplink is configured at the NG-RAN node$_1$, the NG-RAN node$_1$ shall include in the NG-RAN NODE CONFIGURATION UPDATE message the SUL Information IE and the Supported SUL band List IE for each cell added in the Served NR Cells To Add IE and in the Served NR Cells To Modify IE.

In some examples, if Supplementary Uplink is configured at the NG-RAN node$_2$, the NG-RAN node$_2$ shall include in the NG-RAN NODE CONFIGURATION UPDATE ACKNOWLEDGE message the SUL Information IE and the Supported SUL band List IE for each cell added in the Served NR Cells IE if any. In additional or alternative examples, if the TA/ Support List IE is included in the NG-RAN NODE CONFIGURATION UPDATE message, the receiving node shall replace the previously provided TAI Support List IE by the received TAI Support List IE. In additional or alternative examples, if the Cell Assistance Information NR IE is present, the NG-RAN node$_2$ shall, if supported, use it to generate the Served NR Cells IE and include the list in the NG-RAN NODE CONFIGURATION UPDATE ACKNOWLEDGE message. In additional or alternative examples, if the Partial List Indicator NR IE is included in the NG-RAN NODE CONFIGURATION UPDATE ACKNOWLEDGE message and set to "partial" the NG-RAN node$_1$ shall, if supported, assume that the Served NR Cells IE in the NG-RAN NODE CONFIGURATION UPDATE ACKNOWLEDGE message includes a partial list of NR cells. In additional or alternative examples, if the Cell and Capacity Assistance Information NR IE is present in the NG-RAN NODE CONFIGURATION UPDATE ACKNOWLEDGE message from the candidate NG-RAN node$_2$, the NG-RAN node$_1$ shall, if supported, store the collected information to be used for future NG-RAN node interface management.

In some embodiments, upon reception of the NG-RAN NODE CONFIGURATION UPDATE message, NG-RAN node$_2$ shall update the information for NG-RAN node$_1$ as follows: if case of network sharing with multiple cell ID broadcast with shared Xn-C signaling transport, as specified in TS 38.300 [9], the NG-RAN NODE CONFIGURATION UPDATE message and the NG-RAN NODE CONFIGURATION UPDATE ACKNOWLEDGE message shall include the Interface Instance Indication IE to identify the corresponding interface instance.

The Update of Served Cell Information NR is discussed below. In some embodiments, if Served Cells NR To Add IE is contained in the NG-RAN NODE CONFIGURATION UPDATE message, NG-RAN node$_2$ shall add cell information according to the information in the Served Cell Information NR IE. In additional or alternative embodiments, if Served Cells NR To Modify IE is contained in the NG-RAN NODE CONFIGURATION UPDATE message, NG-RAN node$_2$ shall modify information of cell indicated by Old NR-CGI IE according to the information in the Served Cell Information NR IE. In additional or alternative embodiments, when either served cell information or neighbor information of an existing served cell in NG-RAN node$_1$ need to be updated, the whole list of neighboring cells, if any, shall be contained in the Neighbour Information NR IE. The NG-RAN node$_2$ shall overwrite the served cell information and the whole list of neighbor cell information for the affected served cell. In additional or alternative embodiments, if the Deactivation Indication IE is contained in the Served Cells NR To Modify IE, it indicates that the concerned cell was switched off to lower energy consumption. In additional or alternative embodiments, if Served Cells NR To Delete IE is contained in the NG-RAN NODE CONFIGURATION UPDATE message, NG-RAN node$_2$ shall delete information of cell indicated by Old NR-CGI IE. In additional or alternative embodiments, if the Intended TDD DL-UL Configuration NR IE is contained in the NG-RAN NODE CONFIGURATION UPDATE message, the NG-RAN node$_2$ should take this information into account for cross-link interference management with the NG-RAN node$_1$. The NG-RAN node$_2$ shall consider the received Intended TDD DL-UL Configuration NR IE content valid until reception of a new update of the IE for the same NG-RAN node$_2$.

The Update of Served Cell Information E-UTRA is discussed below. In some embodiments, if Served Cells E-UTRA To Add IE is contained in the NG-RAN NODE CONFIGURATION UPDATE message, NG-RAN node$_2$ shall add cell information according to the information in the Served Cell Information E-UTRA IE. In additional or alternative embodiments, if Served Cells E-UTRA To Modify IE is contained in the NG-RAN NODE CONFIGURATION UPDATE message, NG-RAN node$_2$ shall modify information of cell indicated by Old ECGI IE according to the information in the Served Cell Information E-UTRA IE. In additional or alternative embodiments, when either served cell information or neighbor information of an existing served cell in NG-RAN node$_1$ need to be updated, the whole list of neighboring cells, if any, shall be contained in the Neighbour Information E-UTRA IE. The NG-RAN node$_2$ shall overwrite the served cell information and the whole list of neighbor cell information for the affected served cell. In additional or alternative embodiments, if the Deactivation Indication IE is contained in the Served Cells E-UTRA To Modify IE, it indicates that the concerned cell was switched off to lower energy consumption. In additional or alternative embodiments, if the Served Cells E-UTRA To Delete IE is contained in the NG-RAN NODE CONFIGURATION UPDATE message, NG-RAN node$_2$ shall delete information of cell indicated by Old ECG/IE. In additional or alternative embodiments, if the Protected E-UTRA Resource Indication IE is included into the NG-RAN NODE CONFIGURATION UPDATE (inside the Served Cell Information E-UTRA IE), the receiving gNB should take this into account for cell-level resource coordination with the ng-eNB. The gNB shall consider the received Protected E-UTRA Resource Indication IE content valid until reception of a new update of the IE for the same ng-eNB. The protected resource pattern indicated in the Protected E-UTRA Resource Indication IE is not valid in subframes indicated by the Reserved Subframes IE (contained in E-UTRA-NR CELL RESOURCE COORDINATION REQUEST messages), as well as in the non-control region of the MBSFN subframes i.e. it is valid only in the control region therein. The size of the control region of MBSFN subframes is indicated in the Protected E-UTRA Resource Indication IE.

The Update of TNL addresses for SCTP associations is discussed below. In some embodiments, if the TNL Association to Add List IE is included in the NG-RAN NODE CONFIGURATION UPDATE message, the NG-RAN node$_2$ shall, if supported, use it to establish the TNL association(s) with the NG-RAN node$_1$. The NG-RAN node$_2$ shall report to the NG-RAN node$_1$, in the NG-RAN NODE CONFIGURATION UPDATE ACKNOWLEDGE message, the successful establishment of the TNL association(s) with the NG-RAN node$_1$ as follows: a list of successfully established TNL associations shall be included in the TNL Association Setup List IE; and a list of TNL associations that failed to be established shall be included in the TNL Association Failed to Setup List IE.

In additional or alternative embodiments, if the TNL Association to Remove List IE is included in the NG-RAN NODE CONFIGURATION UPDATE message the NG-RAN node$_2$ shall, if supported, initiate removal of the TNL association(s) indicated by the received Transport Layer information towards the NG-RAN node$_1$. In additional or alternative embodiments, if the TNL Association to Update List IE is included in the NG-RAN NODE CONFIGURATION UPDATE message the NG-RAN node$_2$ shall, if supported, update the TNL association(s) indicated by the received Transport Layer information towards the NG-RAN node$_1$.

The Update of AMF Region Information is discussed below. In some embodiments, if AMF Region Information To Add IE is contained in the NG-RAN NODE CONFIGURATION UPDATE message, the NG-RAN node$_2$ shall add the AMF Regions to its AMF Region List. In additional or alternative embodiments, if AMF Region Information To Delete IE is contained in the NG-RAN NODE CONFIGURATION UPDATE message, the NG-RAN node$_2$ shall remove the AMF Regions from its AMF Region List. In additional or alternative embodiments, if the TNL Configuration Info IE is contained in the NG-RAN NODE CONFIGURATION UPDATE message, the NG-RAN node$_2$ shall take this IE into account for IPSec establishment. In additional or alternative embodiments, if the TNL Configuration Info IE is contained in the NG-RAN NODE CONFIGURATION UPDATE ACKNOWLEDGE message, the NG-RAN node$_1$ shall take this IE into account for IPSec establishment.

In additional or alternative embodiments, if the NG-RAN Coverage Modification List IE is present, the gNB$_2$ may use the information in the NR Cell Coverage State IE to identify the NR cell deployment configuration and for configuring the mobility towards the NR cell(s) indicated by the NR CGI IE, as described in TS 38.300 [8]. If the NG-RAN Coverage Modification List IE is present, the gNB$_2$ may use the information in the SSB Coverage State IE to identify the SSB beam deployment configuration enabled by gNB$_1$.

In additional or alternative embodiments, if the NG-RAN Deployment Status Indicator IE is present in the NG-RAN Coverage Modification List IE, the gNB$_2$ shall, if supported, consider the NR cell deployment configuration of the NR cells to be modified as the next planned configuration and shall remove any planned configuration stored for this cell.

In additional or alternative embodiments, if the NG-RAN Deployment Status Indicator IE is present in the NG-RAN Coverage Modification List IE, the gNB$_2$ shall, if supported, consider the SSB beam deployment configuration of the SSB beams to be modified as the next SSB beam configuration in the cell.

In additional or alternative embodiments, if the NG-RAN Deployment Status Indicator IE is present and the Replacing NR Cells IE contains non-empty NR cell list, the gNB$_2$ may use this list to avoid connection or re-establishment failures during the reconfiguration, e.g. consider the NR cells in the list as possible alternative handover targets.

In additional or alternative embodiments, if the NG-RAN Deployment Status Indicator IE is not present, the gNB$_2$ shall, if supported, consider the NR cell deployment configuration of NR cell to be modified and the SSB beam deployment configuration of the SSB beam to be modified as activated and replace any previous configuration for the NR cells and for the SSB beams indicated in the NG-RAN Coverage Modification List IE.

In some embodiments, a NG-RAN NODE CONFIGURATION UPDATE message is sent by a NG-RAN node to a neighboring NG-RAN node to transfer updated information for an Xn-C interface instance. Information associated with a NG-RAN NODE CONFIGURATION UPDATE message is illustrated in the tables in in FIGS. 45-47.

An example of an implementation in F1AP is discussed below. This approach extends the existing F1AP signaling. Modified Sections of 3GPP TS 38.473 v16.2.0 are provided below according to some embodiments of inventive concepts. As set forth below, some sections of 3GPP TS 38.473 v16.2.0 may be modified/added.

In some embodiments, the purpose of the gNB-DU Configuration Update procedure is to update application level configuration data needed for the gNB-DU and the gNB-CU to interoperate correctly on the F1 interface. This procedure does not affect existing UE-related contexts, if any. The procedure uses non-UE associated signaling.

Figure 21:
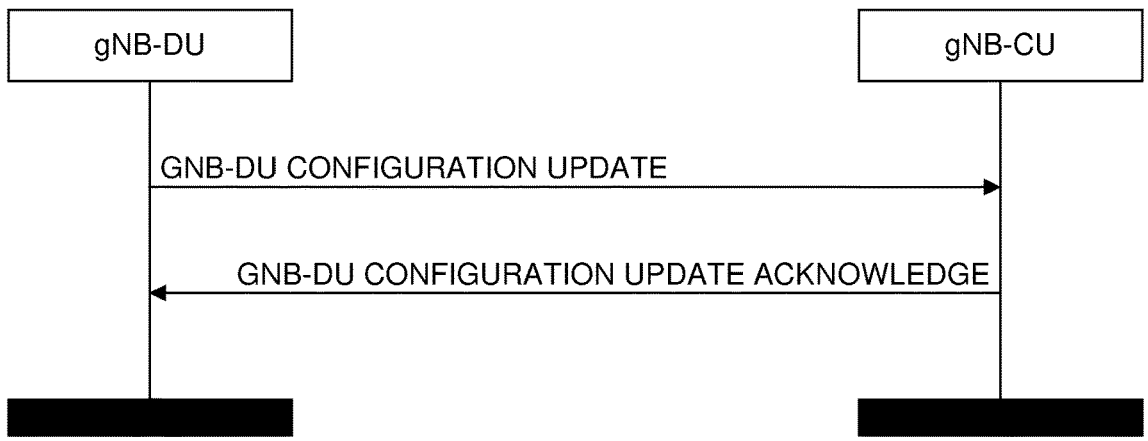
FIG. 21 is a message diagram illustrating a GNB-DU configuration update message according to some embodiments of inventive concepts.

FIG. 21 illustrates an example of a gNB-DU Configuration Update procedure: Successful Operation.

In some embodiments, the gNB-DU initiates the procedure by sending a GNB-DU CONFIGURATION UPDATE message to the gNB-CU including an appropriate set of updated configuration data that it has just taken into operational use. The gNB-CU responds with GNB-DU CONFIGURATION UPDATE ACKNOWLEDGE message to acknowledge that it successfully updated the configuration data. If an information element is not included in the GNB-DU CONFIGURATION UPDATE message, the gNB-CU shall interpret that the corresponding configuration data is not changed and shall continue to operate the F1-C interface with the existing related configuration data.

In some embodiments, the updated configuration data shall be stored in both nodes and used as long as there is an operational TNL association or until any further update is performed.

In some embodiments, if gNB-DU ID IE is contained in the GNB-DU CONFIGURATION UPDATE message for a newly established SCTP association, the gNB-CU will associate this association with the related gNB-DU.

In additional or alternative embodiments, if Served Cells To Add Item IE is contained in the GNB-DU CONFIGURATION UPDATE message, the gNB-CU shall add cell information according to the information in the Served Cell Information IE. For NG-RAN, the gNB-DU shall include the gNB-DU System Information IE.

In additional or alternative embodiments, if Served Cells To Modify Item IE is contained in the GNB-DU CONFIGURATION UPDATE message, the gNB-CU shall modify information of cell indicated by Old NR CGI IE according to the information in the Served Cell Information IE and overwrite the served cell information for the affected served cell. Further, if the gNB-DU System Information IE is present the gNB-CU shall store and replace any previous information received.

In additional or alternative embodiments, if Served Cells To Delete Item IE is contained in the GNB-DU CONFIGURATION UPDATE message, the gNB-CU shall delete information of cell indicated by Old NR CGI IE.

In additional or alternative embodiments, if Cells Status Item IE is contained in the GNB-DU CONFIGURATION UPDATE message, the gNB-CU shall update the information about the cells, as described in TS 38.401 [4]. If the Switching Off Ongoing IE is present in the Cells Status Item IE, contained in the GNB-DU CONFIGURATION UPDATE message, and the corresponding Service State IE is set to "Out-of-Service", the gNB-CU shall ignore the Switching Off Ongoing IE.

In additional or alternative embodiments, if Cells to be Activated List Item IE is contained in the GNB-DU CONFIGURATION UPDATE ACKNOWLEDGE message, the gNB-DU shall activate the cell indicated by NR CGI IE and reconfigure the physical cell identity for cells for which the NR PC/IE is included.

In additional or alternative embodiments, if Cells to be Activated List Item IE is contained in the GNB-DU CONFIGURATION UPDATE ACKNOWLEDGE message and the indicated cells are already activated, the gNB-DU shall update the cell information received in Cells to be Activated List Item IE.

In additional or alternative embodiments, if Cells to be Activated List Item IE is included in the GNB-DU CONFIGURATION UPDATE ACKNOWLEDGE message, and the information for the cell indicated by the NR CG/IE includes the IAB Info IAB-donor-CU IE, the gNB-DU shall, if supported, apply the IAB STC Info IE therein to the indicated cell.

In additional or alternative embodiments, if Cells to be Deactivated List Item IE is contained in the GNB-DU CONFIGURATION UPDATE ACKNOWLEDGE message, the gNB-DU shall deactivate all the cells with NR CGI listed in the IE.

In additional or alternative embodiments, if Dedicated SI Delivery Needed UE List IE is contained in the GNB-DU CONFIGURATION UPDATE message, the gNB-CU should take it into account when informing the UE of the updated system information via the dedicated RRC message.

In additional or alternative embodiments, for NG-RAN, the gNB-CU shall include the gNB-CU System Information IE in the GNB-DU CONFIGURATION UPDATE ACKNOWLEDGE message. The SIB type to Be Updated List IE shall contain the full list of SIBs to be broadcast. For NG-RAN, the gNB-DU may include the RAN Area Code IE in the GNB-DU CONFIGURATION UPDATE message. The gNB-CU shall store and replace any previously provided RAN Area Code IE by the received RAN Area Code IE.

In additional or alternative embodiments, if Available PLMN List IE, and optionally also Extended Available PLMN List IE, is contained in GNB-DU CONFIGURATION UPDATE ACKNOWLEDGE message, the gNB-DU shall overwrite the whole available PLMN list and update the corresponding system information.

In additional or alternative embodiments, if Available SNPN ID List IE is contained in GNB-DU CONFIGURATION UPDATE ACKNOWLEDGE message, the gNB-DU shall overwrite the whole available SNPN ID list and update the corresponding system information.

In additional or alternative embodiments, if in GNB-DU CONFIGURATION UPDATE message, the Cell Direction IE is present, the gNB-CU should use it to understand whether the cell is for UL or DL only. If in GNB-DU CONFIGURATION UPDATE message, the Cell Direction IE is omitted in the Served Cell Information IE it shall be interpreted as that the Cell Direction is Bi-directional.

In additional or alternative embodiments, if the GNB-DU CONFIGURATION UPDATE message includes gNB-DU TNL Association To Remove List IE, and the Endpoint IP address IE and the Port Number IE for both TNL endpoints of the TNL association(s) are included in the gNB-DU TNL Association To Remove List IE, the gNB-CU shall, if supported, consider that the TNL association(s) indicated by both received TNL endpoints will be removed by the gNB-DU. If the Endpoint IP address IE, or the Endpoint IP address IE and the Port Number IE for one or both of the TNL endpoints is included in the gNB-DU TNL Association To Remove List IE in GNB-DU CONFIGURATION UPDATE message, the gNB-CU shall, if supported, consider that the TNL association(s) indicated by the received endpoint IP address(es) will be removed by the gNB-DU.

In additional or alternative embodiments, if the Intended TDD DL-UL Configuration IE is present in the GNB-DU CONFIGURATION UPDATE message, the receiving gNB-CU shall use the received information for Cross Link Interference management and/or NR-DC power coordination. The gNB-CU may merge the Intended TDD DL-UL Configuration information received from two or more gNB-DUs. The gNB-CU shall consider the received Intended TDD DL-UL Configuration IE content valid until reception of an update of the IE for the same cell(s).

In additional or alternative embodiments, if the Aggressor gNB Set ID IE is included in the Served Cell Information IE in the GNB-DU CONFIGURATION UPDATE message, the gNB-CU shall, if supported, take it into account.

In additional or alternative embodiments, if the Victim gNB Set ID IE is included in the Served Cell Information IE in the GNB-DU CONFIGURATION UPDATE message, the gNB-CU shall, if supported, take it into account.

In additional or alternative embodiments, if the GNB-DU CONFIGURATION UPDATE message includes Transport Layer Address Info IE, the gNB-CU shall, if supported, take into account for IPSec tunnel establishment.

In additional or alternative embodiments, if the GNB-DU CONFIGURATION UPDATE ACKNOWLEDGE message includes Transport Layer Address Info IE, the gNB-DU shall, if supported, take into account for IPSec tunnel establishment.

In additional or alternative embodiments, if the GNB-DU CONFIGURATION UPDATE ACKNOWLEDGE message contains the Uplink BH Non-UP Traffic Mapping IE, the gNB-DU shall, if supported, consider the information therein for mapping of non-UP uplink traffic.

In additional or alternative embodiments, if the Coverage Modification List IE is contained in the GNB-CU CONFIGURATION UPDATE message and the indicated cells are already activated, the gNB-DU shall, if supported, replace the NR cell(s) indicated by the NR CG/IE with the NR cell(s) identified in the Replacing NR Cells IE. The gNB-DU may use the NR Cell Coverage State IE indicated within the Replacing NR Cells IE for the new cell configuration.

In additional or alternative embodiments, if the SSB Beam List IE is contained in the Coverage Modification List IE within the GNB-CU CONFIGURATION UPDATE message, the gNB-DU, shall, if supported, replace the SSB beams identified by the SSB Beam Index IE within the SSB Beam List IE, with the SSB beams identified in the Replacing SSB Beams IE. The gNB-DU may use the SSB Beam Cell Coverage State IE indicated within the Replacing SSB Beams for the new SSB beam configuration.

In some embodiments, a GNB-DU CONFIGURATION UPDATE message is sent by the gNB-DU to transfer updated information associated to an F1-C interface instance. If F1-C signalling transport is shared among several F1-C interface instance, this message may transfer updated information associated to several F1-C interface instances. The tables in FIGS. 48-49 illustrate an example of information associated with a GNB-DU CONFIGURATION UPDATE message.

In some embodiments, the purpose of the gNB-CU Configuration Update procedure is to update application level configuration data needed for the gNB-DU and gNB-CU to interoperate correctly on the F1 interface. This procedure does not affect existing UE-related contexts, if any. The procedure uses non-UE associated signaling.

Figure 22:
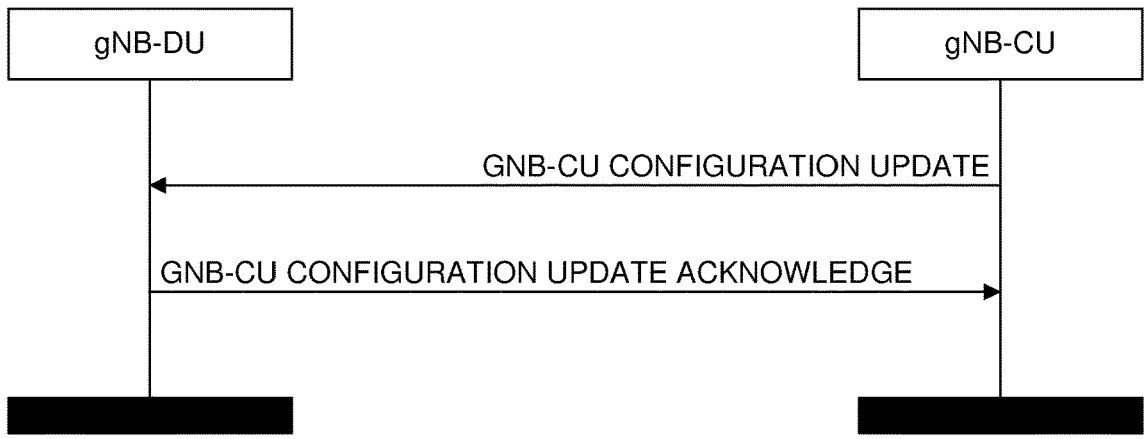
FIG. 22 is a message diagram illustrating a GNB-CU configuration update message according to some embodiments of inventive concepts.
Figure 23:
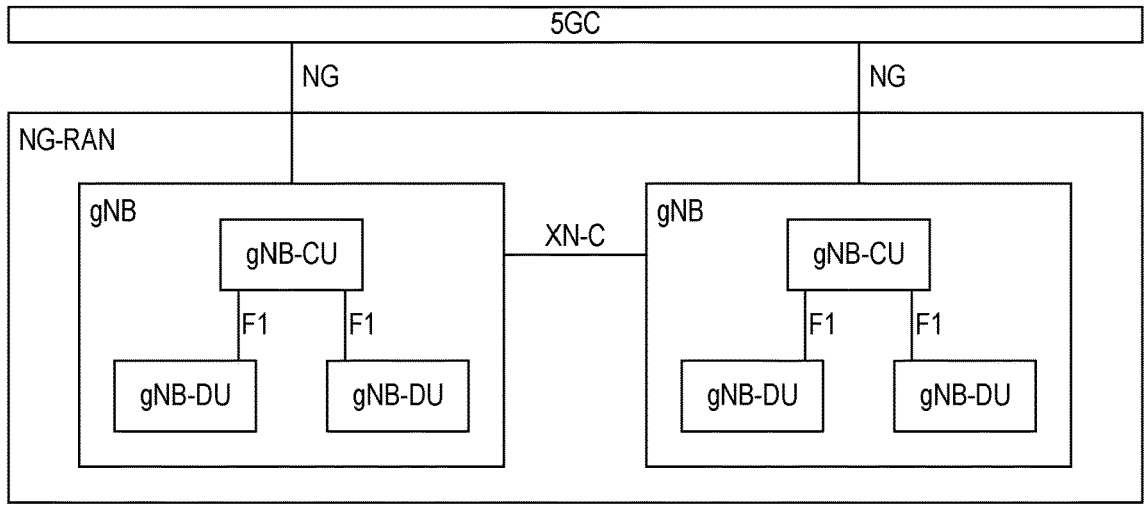
FIG. 23 is a block diagram illustrating a 5G RAN architecture.

FIG. 22 illustrates an example of a gNB-CU Configuration Update procedure: Successful Operation.

In some embodiments, the gNB-CU initiates the procedure by sending a GNB-CU CONFIGURATION UPDATE message including the appropriate updated configuration data to the gNB-DU. The gNB-DU responds with a GNB-CU CONFIGURATION UPDATE ACKNOWLEDGE message to acknowledge that it successfully updated the configuration data. If an information element is not included in the GNB-CU CONFIGURATION UPDATE message, the gNB-DU shall interpret that the corresponding configuration data is not changed and shall continue to operate the F1-C interface with the existing related configuration data.

In additional or alternative embodiments, the updated configuration data shall be stored in the respective node and used as long as there is an operational TNL association or until any further update is performed.

In additional or alternative embodiments, if Cells to be Activated List Item IE is contained in the GNB-CU CONFIGURATION UPDATE message, the gNB-DU shall activate the cell indicated by NR CGI IE and reconfigure the physical cell identity for which the NR PC/IE is included.

In additional or alternative embodiments, if Cells to be Deactivated List Item IE is contained in the GNB-CU CONFIGURATION UPDATE message, the gNB-DU shall deactivate the cell indicated by NR CGI IE.

In additional or alternative embodiments, if Cells to be Activated List Item IE is contained in the GNB-CU CONFIGURATION UPDATE message and the indicated cells are already activated, the gNB-DU shall update the cell information received in Cells to be Activated List Item IE.

In additional or alternative embodiments, if Cells to be Activated List Item IE is included in the GNB-CU CONFIGURATION UPDATE message, and the information for the cell indicated by the NR CGI IE includes the IAB Info IAB-donor-CU IE, the gNB-DU shall, if supported, apply the IAB STC Info IE therein to the indicated cell.

In additional or alternative embodiments, if the gNB-CU System Information IE is contained in the gNB-CU CONFIGURATION UPDATE message, the gNB-DU shall include the Dedicated SI Delivery Needed UE List IE in the GNB-CU CONFIGURATION UPDATE ACKNOWLEDGE message for UEs that are unable to receive system information from broadcast.

In additional or alternative embodiments, if Dedicated SI Delivery Needed UE List IE is contained in the GNB-CU CONFIGURATION UPDATE ACKNOWLEDGE message, the gNB-CU should take it into account when informing the UE of the updated system information via the dedicated RRC message.

In additional or alternative embodiments, if the gNB-CU TNL Association To Add List IE is contained in the gNB-CU CONFIGURATION UPDATE message, the gNB-DU shall, if supported, use it to establish the TNL association(s) with the gNB-CU. The gNB-DU shall report to the gNB-CU, in the gNB-CU CONFIGURATION UPDATE ACKNOWLEDGE message, the successful establishment of the TNL association(s) with the gNB-CU as follows: a list of TNL address(es) with which the gNB-DU successfully established the TNL association shall be included in the gNB-CU TNL Association Setup List IE; and a list of TNL address(es)

with which the gNB-DU failed to establish the TNL association shall be included in the gNB-CU TNL Association Failed To Setup List IE.

In additional or alternative embodiments, if the GNB-CU CONFIGURATION UPDATE message includes gNB-CU TNL Association To Remove List IE, and the Endpoint IP address IE and the Port Number IE for both TNL endpoints of the TNL association(s) are included in the gNB-CU TNL Association To Remove List IE, the gNB-DU shall, if supported, initiate removal of the TNL association(s) indicated by both received TNL endpoints towards the gNB-CU. If the Endpoint IP address IE, or the Endpoint IP address IE and the Port Number IE for one or both of the TNL endpoints is included in the gNB-CU TNL Association To Remove List IE, the gNB-DU shall, if supported, initiate removal of the TNL association(s) indicated by the received endpoint IP address(es).

In additional or alternative embodiments, if the gNB-CU TNL Association To Update List IE is contained in the gNB-CU CONFIGURATION UPDATE message the gNB-DU shall, if supported, overwrite the previously stored information for the related TNL Association(s).

In additional or alternative embodiments, if in the gNB-CU CONFIGURATION UPDATE message the TNL Association usage IE is included in the gNB-CU TNL Association To Add List IE or the gNB-CU TNL Association To Update List IE, the gNB-DU node shall, if supported, use it as described in TS 38.472 [22].

In additional or alternative embodiments, if for NG-RAN, the gNB-CU shall include the gNB-CU System Information IE in the GNB-CU CONFIGURATION UPDATE message. The SIB type to Be Updated List IE shall contain the full list of SIBs to be broadcast.

In additional or alternative embodiments, if Protected E-UTRA Resources List IE is contained in the GNB-CU CONFIGURATION UPDATE message, the gNB-DU shall protect the corresponding resource of the cells indicated by E-UTRA Cells List IE for spectrum sharing between E-UTRA and NR.

In additional or alternative embodiments, if the GNB-CU CONFIGURATION UPDATE message contains the Protected E-UTRA Resource Indication IE, the receiving gNB-DU should forward it to lower layers and use it for cell-level resource coordination. The gNB-DU shall consider the received Protected E-UTRA Resource Indication IE when expressing its desired resource allocation during gNB-DU Resource Coordination procedure. The gNB-DU shall consider the received Protected E-UTRA Resource Indication IE content valid until reception of a new update of the IE for the same gNB-DU.

In additional or alternative embodiments, if Available PLMN List IE, and optionally also Extended Available PLMN List IE, is contained in GNB-CU CONFIGURATION UPDATE message, the gNB-DU shall overwrite the whole available PLMN list and update the corresponding system information.

In additional or alternative embodiments, if Available SNPN ID List IE is contained in GNB-CU CONFIGURATION UPDATE message, the gNB-DU shall overwrite the whole available SNPN ID list and update the corresponding system information.

In additional or alternative embodiments, if Cells Failed to be Activated Item IE is contained in the GNB-CU CONFIGURATION UPDATE ACKNOWLEDGE message, the gNB-CU shall consider that the indicated cells are out-of-service as defined in TS 38.401 [4].

In additional or alternative embodiments, if the Neighbour Cell Information List IE is present in the GNB-CU CONFIGURATION UPDATE message, the receiving gNB-DU shall use the received information for Cross Link Interference management and/or NR-DC power coordination. The gNB-DU shall consider the received Neighbour Cell Information List IE content valid until reception of an update of the IE for the same cell(s). If the Intended TDD DL-UL Configuration NR IE is absent from the Neighbour Cell Information List IE, whereas the corresponding NR CG/ IE is present, the receiving gNB-DU shall remove the previously stored Neighbour Cell Information IE corresponding to the NR CGI.

In additional or alternative embodiments, if the GNB-CU CONFIGURATION UPDATE message includes Transport Layer Address Info IE, the gNB-DU shall, if supported, take into account for IPSec tunnel establishment.

In additional or alternative embodiments, if the GNB-CU CONFIGURATION UPDATE ACKNOWLEDGE message includes Transport Layer Address Info IE, the gNB-CU shall, if supported, take into account for IPSec tunnel establishment.

In additional or alternative embodiments, if the GNB-CU CONFIGURATION UPDATE message contains the Uplink BH Non-UP Traffic Mapping IE, the gNB-DU shall, if supported, consider the information therein for mapping of non-UP uplink traffic.

In additional or alternative embodiments, if the IAB Barred IE is included in the GNB-CU CONFIGURATION UPDATE message, the gNB-DU shall, if supported, consider it as an indication of whether the cell allows IAB-node access or not.

In additional or alternative embodiments, if the CCO Issue detection IE is contained in the GNB-CU CONFIGURATION UPDATE message, the gNB-DU shall, if supported, use it to determine the new cell and beam configuration.

In some embodiments, a GNB-CU CONFIGURATION UPDATE message is sent by the gNB-CU to transfer updated information associated to an F1-C interface instance. If F1-C signalling transport is shared among several F1-C interface instances, this message may transfer updated information associated to several F1-C interface instances. The tables in FIGS. 50-51 illustrate an example of information associated with a GNB-CU CONFIGURATION UPDATE message.

Operations of a first network node (e.g., a first RAN node 400 (implemented using the structure of FIG. 33)) will now be discussed with reference to the flow chart of FIG. 35 according to some embodiments of inventive concepts. For example, modules may be stored in memory 405 of FIG. 33, and these modules may provide instructions so that when the instructions of a module are executed by respective RAN node processing circuitry 403, processing circuitry 403 performs respective operations of the flow chart.

According to some embodiments at block 3505, processing circuitry 403 transmits (through network interface 407) a configuration update request message to the second RAN node. The configuration update request message includes an indication of a requested configuration change for the second RAN node.

According to some embodiments at block 3509, processing circuitry 403 receives (through network interface 407) a configuration update message from the second RAN node. The configuration update message includes an indication of a configuration update selected by the second RAN node.

According to some embodiments at block 3515, processing circuitry 403 transmits (through network interface 407) an acknowledge ACK message to the second RAN node responsive to receiving the configuration update message.

Figure 35:
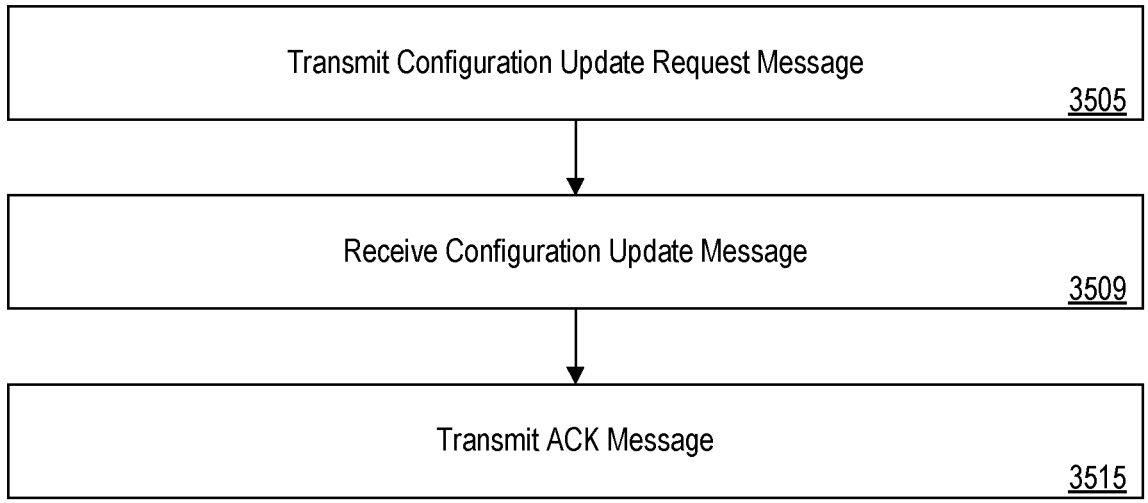
FIGS. 35-36 are flow charts illustrating operations of network nodes according to some embodiments of inventive concepts.

Various operations of FIG. 35 are discussed in greater detail below with respect to Example Embodiments 1-19

Various operations from the flow chart of FIG. 35 may be optional with respect to some embodiments of RAN nodes and related methods. Regarding methods of example embodiment 1 (set forth below), for example, operations of block 3515 of FIG. 35 may be optional.

Operations of a second network node (e.g., a second RAN node 400 (implemented using the structure of FIG. 33)) will now be discussed with reference to the flow chart of FIG. 36 according to some embodiments of inventive concepts. For example, modules may be stored in memory 405 of FIG. 33, and these modules may provide instructions so that when the instructions of a module are executed by respective RAN node processing circuitry 403, processing circuitry 403 performs respective operations of the flow chart.

According to some embodiments at block 3605, processing circuitry 403 receives a configuration update request message from the first RAN node. The configuration update request message includes an indication of a requested configuration change for the second RAN node.

According to some embodiments at block 3609, processing circuitry 403 selects a configuration update to be applied by the second RAN node responsive to receiving the configuration update request message.

According to some embodiments at block 3615, processing circuitry 403 transmits a configuration update message to the first RAN node. The configuration update message includes an indication of the configuration update selected by the second RAN node.

According to some embodiments at block 3619, processing circuitry 403 receives an acknowledge ACK message from the first RAN node after transmitting the configuration update message. The ACK message corresponds to the configuration update message.

Figure 36:
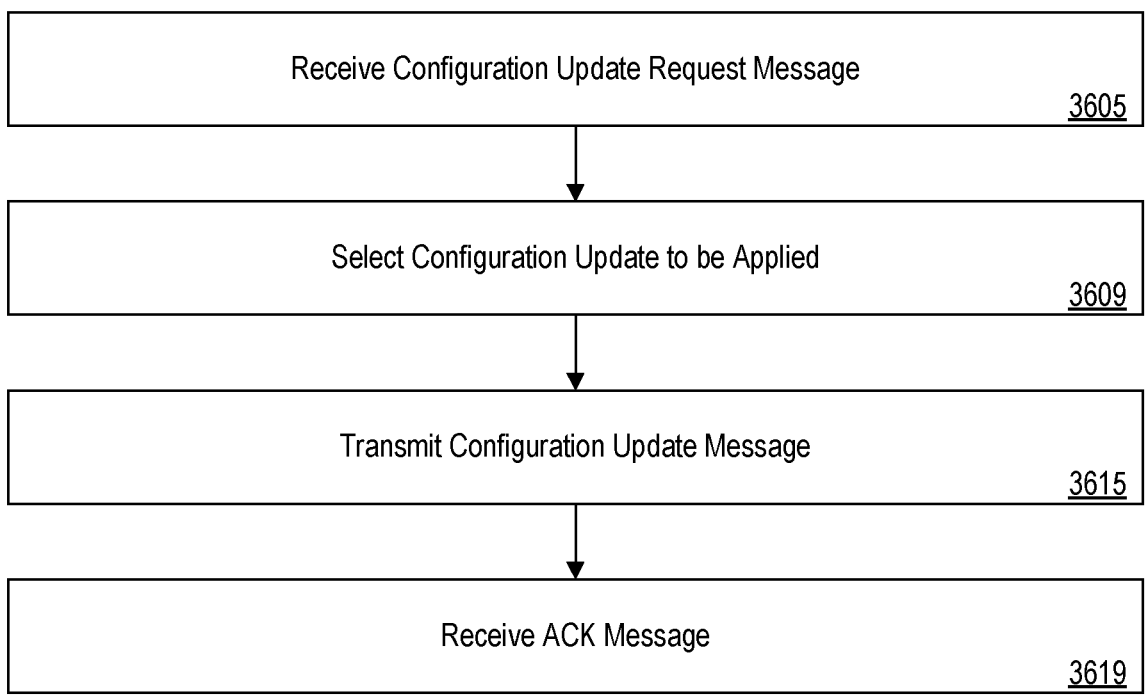

Various operations of FIG. 36 are discussed in greater detail below with respect to Example Embodiments 20-39.

Various operations from the flow chart of FIG. 36 may be optional with respect to some embodiments of RAN nodes and related methods. Regarding methods of example embodiment 20 (set forth below), for example, operations of block 3619 of FIG. 36 may be optional.

Example embodiments are discussed below.

1. A method of operating a first radio access network, RAN, node in a network including a second RAN node, the method comprising:
   transmitting (3505) a configuration update request message to the second RAN node, wherein the configuration update request message includes an indication of a requested configuration change for the second RAN node; and
   receiving (3509) a configuration update message from the second RAN node, wherein the configuration update message includes an indication of a configuration update selected by the second RAN node.

2. The method of Embodiment 1 further comprising:
   transmitting (3515) an acknowledge, ACK, message to the second RAN node responsive to receiving the configuration update message.

3. The method of any of Embodiments 1-2, wherein the indication of the requested configuration change for the second RAN node indicates at least one serving cell of the second RAN node associated with the requested configuration change and/or wherein the indication of the requested configuration change for the second RAN node indicates at least one reference signal, RS, beam coverage area of the second RAN node associated with the requested configuration change.

4. The method of any of Embodiments 1-3, wherein the configuration update request message includes an indication of at least one serving cell of the first RAN node associated with a configuration change at the first RAN node and/or wherein the configuration update request message includes an indication of at least one reference signal, RS, beam coverage area of the first RAN node associated with a configuration change at the first RAN node.

5. The method of any of Embodiments 1-4, wherein configuration update request message further includes at least one of an indication of a capacity issue, an indication of a coverage issue, an indication of a cell/beam edge movement, and/or an indication of an uplink/downlink coverage disparity.

6. The method of any of Embodiments 1-5, wherein the configuration update request message further includes an identity of a serving cell of the first RAN node and/or an identity of a reference signal, RS, beam of a serving cell of the first RAN node.

7. The method of Embodiment 6, wherein the serving cell and/or the RS beam of the first RAN node is involved with a capacity issue and/or a coverage issue.

8. The method of any of Embodiments 1-7, wherein the configuration update request message further includes an identity of a serving cell of the second RAN node and/or an identify of a reference signal, RS, beam of a serving cell of the second RAN node.

9. The method of Embodiment 8, wherein the serving cell and/or the RS beam of the second RAN node is involved with a capacity issue and/or a coverage issue.

10. The method of any of Embodiments 1-9, wherein the indication of the requested configuration change for the second RAN node includes at least one of an indication to contract a coverage area of a serving cell and/or reference signal, RS, beam of the second RAN node, an indication to expand a coverage area of a serving cell and/or RS beam of the second RAN node, an indication to merge coverage areas of at least two serving cells and/or RS beams of the second RAN node, and/or an indication to split the coverage area of a serving cell and/or RS beam of the second RAN node.

11. The method of any of Embodiments 1-10, wherein the configuration update request message further includes an identity of at least one user equipment, UE, or UE group.

12. The method of any of Embodiments 1-11, wherein the configuration update request message further includes a user equipment, UE, measurement report associated with the first RAN node.

13. The method of any of Embodiments 1-12, wherein the configuration update request message further includes a user equipment, UE, measurement report associated with the second RAN node.

14. The method of any of Embodiments 1-13, wherein the first RAN node comprises one of a next generation, NG, RAN node (gNB) and a long term evolution, LTE, RAN node (eNB), and wherein the second RAN node comprises one of an NG RAN node and an LTE RAN node.

15. The method of Embodiment 14, wherein the configuration update request message and the configuration update message are transmitted over at least one of an Xn interface and/or an X2 interface.

16. The method of any of Embodiments 1-13, wherein the first RAN node comprises a RAN node central unit, CU (e.g., gNB-CU or ng-eNB-CU), and wherein the second RAN node comprises a RAN node distributed unit, DU (e.g., gNB-DU or ng-eNB-DU).

17. The method of Embodiment 16, wherein the configuration update request message and the configuration update message are transmitted over an F1 interface.

18. The method of any of Embodiments 1-17, wherein the configuration update request message comprises a coverage and capacity optimization, CCO, request message, wherein the indication of the requested configuration change for the second RAN node comprises an indication of a requested CCO configuration change for the second RAN node, wherein the configuration update message comprises a CCO configuration update message, and wherein the indication of the configuration update selected by the second RAN node comprises an indication of a CCO configuration update selected by the second RAN node.

19. The method of any of Embodiments 1-18, where the indication of the configuration update selected by the second RAN node indicates at least one serving cell of the second RAN node associated with the configuration update selected by the second RAN node and/or wherein the indication of the configuration update for the second RAN node indicates at least one reference signal, RS, beam coverage area of the second RAN node associated with the configuration update selected by the second RAN node.

20. A method of operating a second radio access network, RAN, node in a network including a first RAN node, the method comprising:
  receiving (3605) a configuration update request message from the first RAN node, wherein the configuration update request message includes an indication of a requested configuration change for the second RAN node;
  selecting (3609) a configuration update to be applied by the second RAN node responsive to receiving the configuration update request message; and
  transmitting (3615) a configuration update message to the first RAN node, wherein the configuration update message includes an indication of the configuration update selected by the second RAN node.

21. The method of Embodiment 20 further comprising:
  receiving (3619) an acknowledge, ACK, message from the first RAN node after transmitting the configuration update message, wherein the ACK message corresponds to the configuration update message.

22. The method of any of Embodiments 20-21, where the indication of the requested configuration change for the second RAN node indicates at least one serving cell of the second RAN node associated with the requested configuration change and/or wherein the indication of the requested configuration change for the second RAN node indicates at least one reference signal, RS, beam coverage area of the second RAN node associated with the requested configuration change.

23. The method of any of Embodiments 20-22, wherein the configuration update request message includes an indication of at least one serving cell of the first RAN node associated with a configuration change at the first RAN node and/or wherein the configuration update request message includes an indication of at least one reference signal, RS, beam coverage area of the first RAN node associated with a configuration change at the first RAN node.

24. The method of any of Embodiments 20-23, wherein configuration update request message further includes at least one of an indication of a capacity issue, an indication of a coverage issue, an indication of a cell/beam edge movement, and/or an indication of an uplink/downlink coverage disparity.

25. The method of any of Embodiments 20-24, wherein the configuration update request message further includes an identity of a serving cell of the first RAN node and/or an identity of a reference signal, RS, beam of a serving cell of the first RAN node.

26. The method of Embodiment 25, wherein the serving cell and/or the RS beam of the first RAN node is involved with a capacity issue and/or a coverage issue.

27. The method of any of Embodiments 20-26, wherein the configuration update request message further includes an identity of a serving cell of the second RAN node and/or an identity of a reference signal, RS, beam of a serving cell of the second RAN node.

28. The method of Embodiment 27, wherein the serving cell and/or the RS beam of the second RAN node is involved with a capacity issue and/or a coverage issue.

29. The method of any of Embodiments 20-28, wherein the indication of the requested configuration change for the second RAN node includes at least one of an indication to contract a coverage area of a serving cell and/or reference signal, RS, beam of the second RAN node, an indication to expand a coverage area of a serving cell and/or RS beam of the second RAN node, an indication to merge coverage areas of at least two serving cells and/or RS beams of the second RAN node, and/or an indication to split the coverage area of a serving cell and/or RS beam of the second RAN node.

30. The method of any of Embodiments 20-29, wherein the configuration update request message further includes an identity of at least one user equipment, UE, or UE group.

31. The method of any of Embodiments 20-30, wherein the configuration update request message further includes a user equipment, UE, measurement report associated with the first RAN node.

32. The method of any of Embodiments 20-31, wherein the configuration update request message further includes a user equipment, UE, measurement report associated with the second RAN node.

33. The method of any of Embodiments 20-32, wherein the first RAN node comprises one of a next generation, NG, RAN node (gNB) and a long term evolution, LTE, RAN node (eNB), and wherein the second RAN node comprises one of an NG RAN node and an LTE RAN node.

34. The method of Embodiment 33, wherein the configuration update request message and the configuration update message are transmitted over at least one of an Xn interface and/or an X2 interface.

35. The method of any of Embodiments 20-34, wherein the first RAN node comprises a RAN node central unit, CU (e.g., gNB-CU or ng-eNB-CU), and wherein the second RAN node comprises a RAN node distributed unit, DU (e.g., gNB-DU or ng-eNB-DU).

36. The method of Embodiment 35, wherein the configuration update request message and the configuration update message are transmitted over an F1 interface between the RAN node CU and the RAN node DU.

37. The method of any of Embodiments 20-36, wherein the configuration update request message comprises a coverage and capacity optimization, CCO, request message, wherein the indication of the requested configuration change for the second RAN node comprises an indication of a requested CCO configuration change for the second RAN node, wherein the configuration update message comprises a CCO configuration update message, and wherein the indication of the configuration update selected by the second RAN node comprises an indication of a CCO configuration update selected by the second RAN node.

38. The method of any of Embodiments 20-37, wherein the configuration update to be applied is selected based on the indication of the requested configuration change.

39. The method of any of Embodiments 20-38, where the indication of the configuration update selected by the second RAN node indicates at least one serving cell of the second RAN node associated with the configuration update selected by the second RAN node and/or wherein the indication of the configuration update for the second RAN node indicates at least one reference signal, RS, beam coverage area of the second RAN node associated with the configuration update selected by the second RAN node.

40. A first radio access network, RAN, node (400) comprising:
processing circuitry (403); and
memory (405) coupled with the processing circuitry, wherein the memory includes instructions that when executed by the processing circuitry causes the first RAN node to perform operations according to any of Embodiments 1-19.

41. A first radio access network, RAN, node (400) adapted to perform according to any of Embodiments 1-19.

42. A computer program comprising program code to be executed by processing circuitry (403) of a first radio access network, RAN, node (400), whereby execution of the program code causes the first RAN node (400) to perform operations according to any of embodiments 1-19.

43. A computer program product comprising a non-transitory storage medium including program code to be executed by processing circuitry (403) of a first radio access network, RAN, node (400), whereby execution of the program code causes the first RAN node (400) to perform operations according to any of embodiments 1-19.

44. A second radio access network, RAN, node (400) comprising:
processing circuitry (403); and
memory (405) coupled with the processing circuitry, wherein the memory includes instructions that when executed by the processing circuitry causes the second RAN node to perform operations according to any of Embodiments 20-39.

45. A second radio access network, RAN, node (400) adapted to perform according to any of Embodiments 20-39.

46. A computer program comprising program code to be executed by processing circuitry (403) of a second radio access network, RAN, node (400), whereby execution of the program code causes the second RAN node (400) to perform operations according to any of embodiments 20-39.

47. A computer program product comprising a non-transitory storage medium including program code to be executed by processing circuitry (403) of a second radio access network, RAN, node (400), whereby execution of the program code causes the second RAN node (400) to perform operations according to any of embodiments 20-39.

Explanations are provided below for various abbreviations/acronyms used in the present disclosure.

| Abbreviation | Explanation |
| --- | --- |
| CAC | Composite available capacity |
| CCI | Capacity and/or Coverage Issue |
| CCO | Coverage and Capacity Optimization |
| CU-CP | Centralized unit-control plane |
| CU-UP | Centralized unit-user plane |

| Abbreviation | Explanation |
| --- | --- |
| DL | Downlink |
| DU | Distributed unit |
| ECID | Enhanced cell identity |
| GNSS | Global navigation satellite system |
| LTE | Long term evolution |
| MCG | Master cell group |
| MDT | Minimization of drive test |
| ML | Machine learning |
| MN | Master node |
| NR | New radio |
| PDCP | Packet data convergence protocol |
| RAN | Radio access network |
| RSRP | Reference signal received power |
| RSRQ | Reference signal received quality |
| SCG | Secondary cell group |
| SINR | Signal to interference and noise ratio |
| SN | Secondary node |
| TNL | Transport network layer |
| UE | User equipment |
| UL | uplink |
| WLAN | Wireless local area network |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 52:
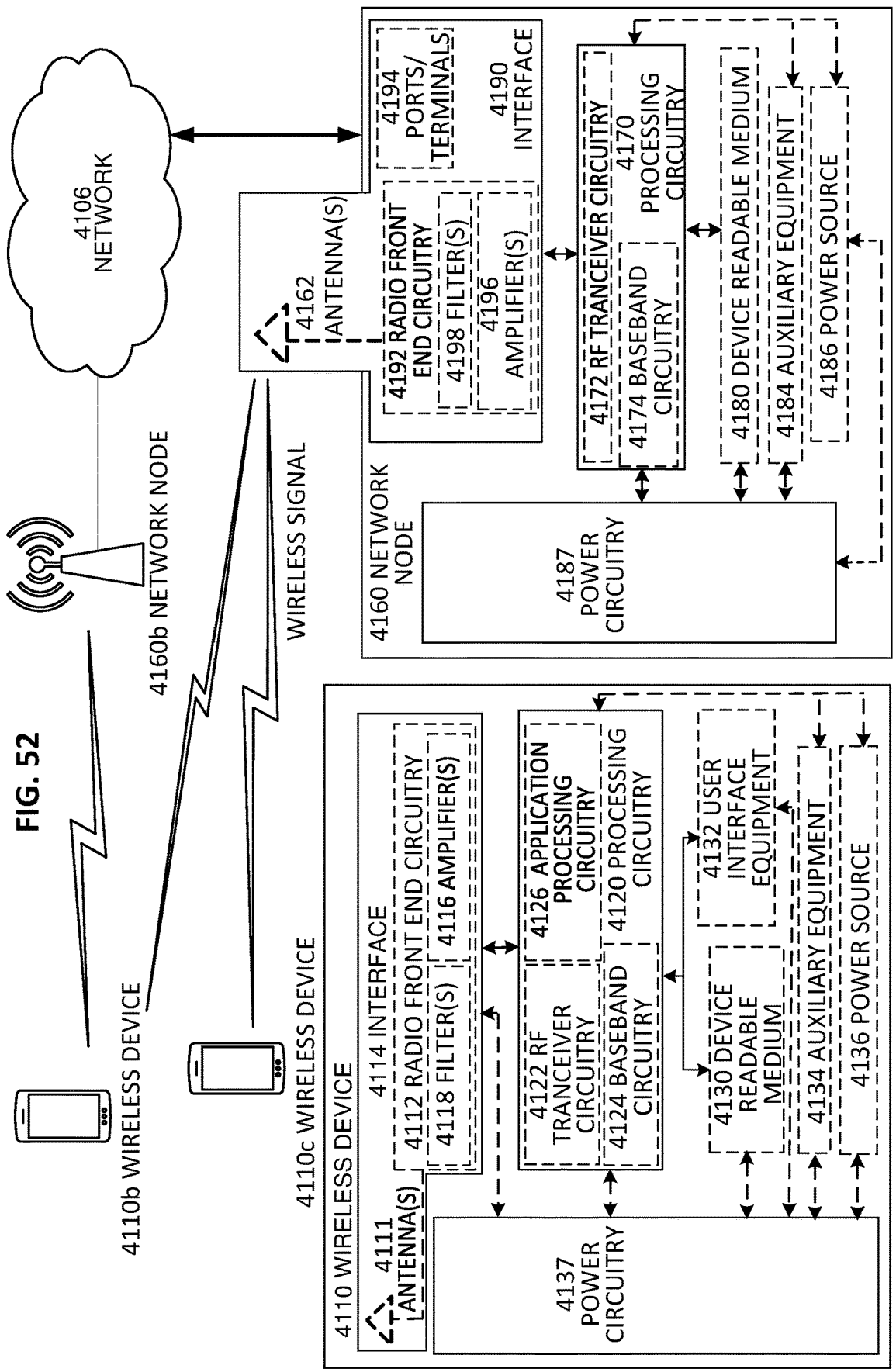
FIG. 52 is a block diagram of a wireless network in accordance with some embodiments.

FIG. 52 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 52. For simplicity, the wireless network of FIG. 52 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 52, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 52 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 52 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD

4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 53:
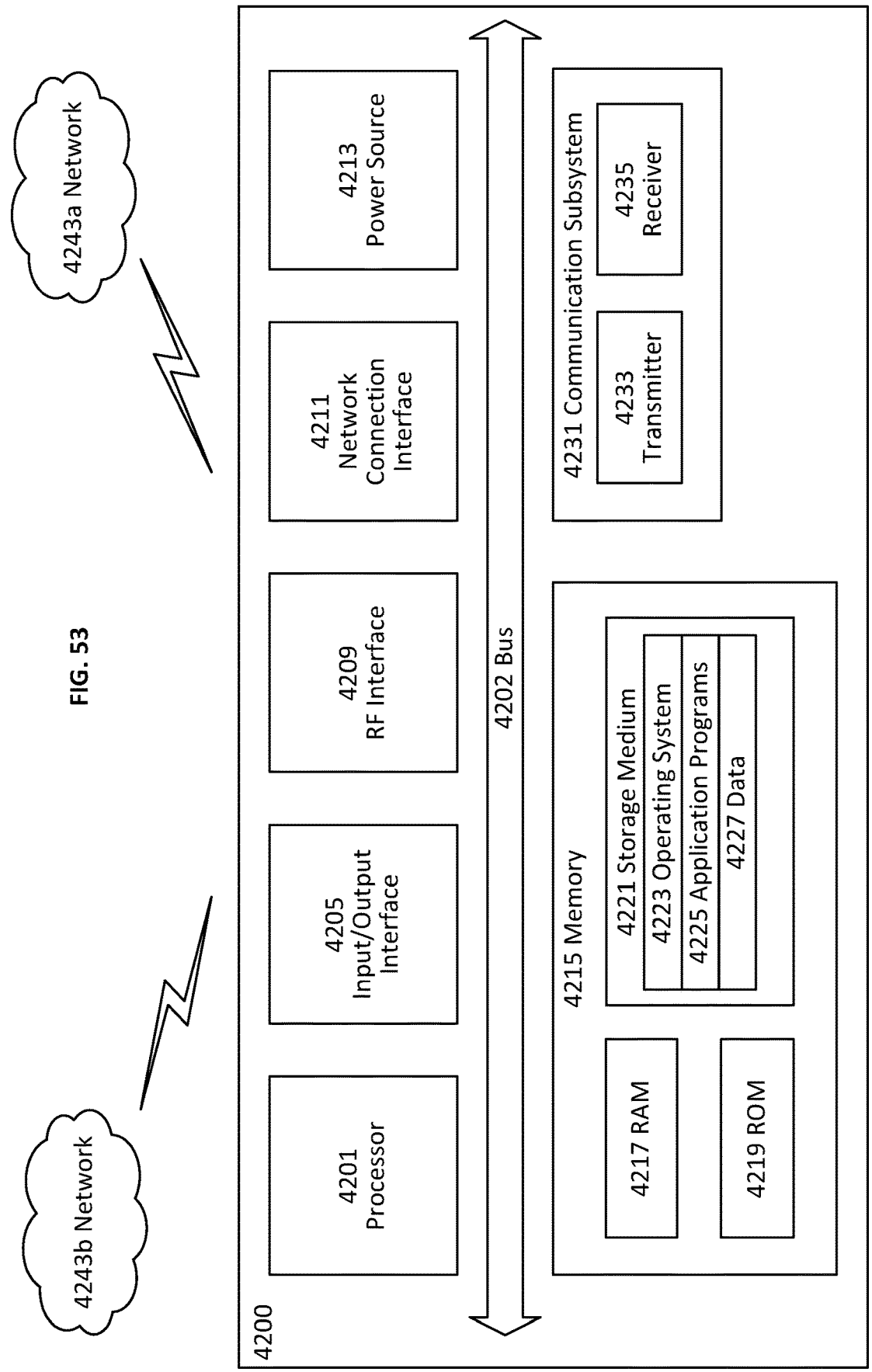
FIG. 53 is a block diagram of a user equipment in accordance with some embodiments

FIG. 53 illustrates a user Equipment in accordance with some embodiments.

FIG. 53 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 53, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 53 is a UE, the components discussed herein are equally applicable to a WD, and vice-versa.

In FIG. 53, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 53, or only a subset of the components. The level of integration between the components may vary from one UE to another UE. Further, certain UEs may contain multiple instances of a component, such as multiple processors, memories, transceivers, transmitters, receivers, etc.

In FIG. 53, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 53, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS)

optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 53, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 54:
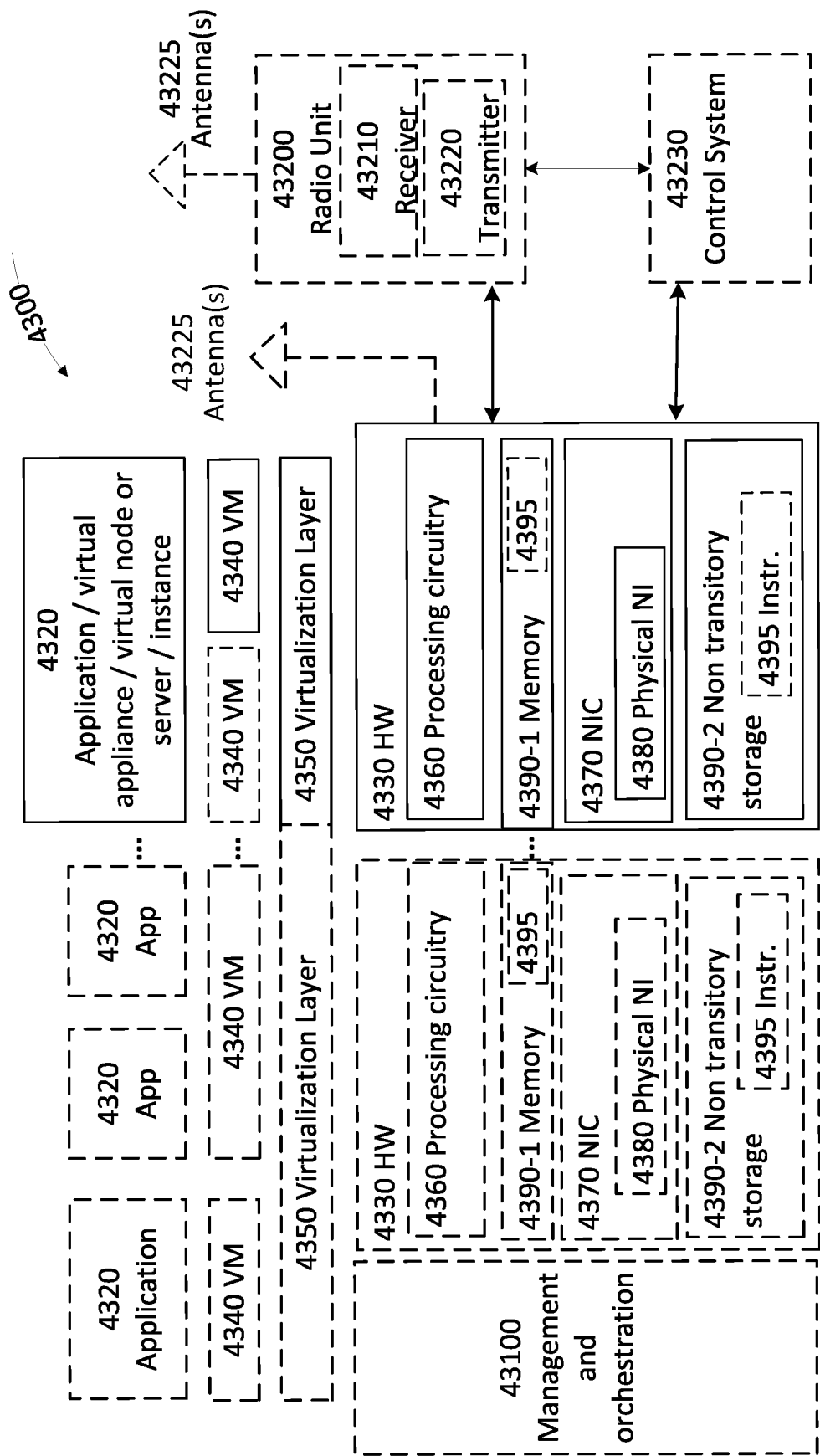
FIG. 54 is a block diagram of a virtualization environment in accordance with some embodiments.

FIG. 54 illustrates a virtualization environment in accordance with some embodiments.

FIG. 54 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 54, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 54.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signaling can be effected with the use of control system 43230 which may alternatively be used for communication between the hardware nodes 4330 and radio units 43200.

Figure 55:
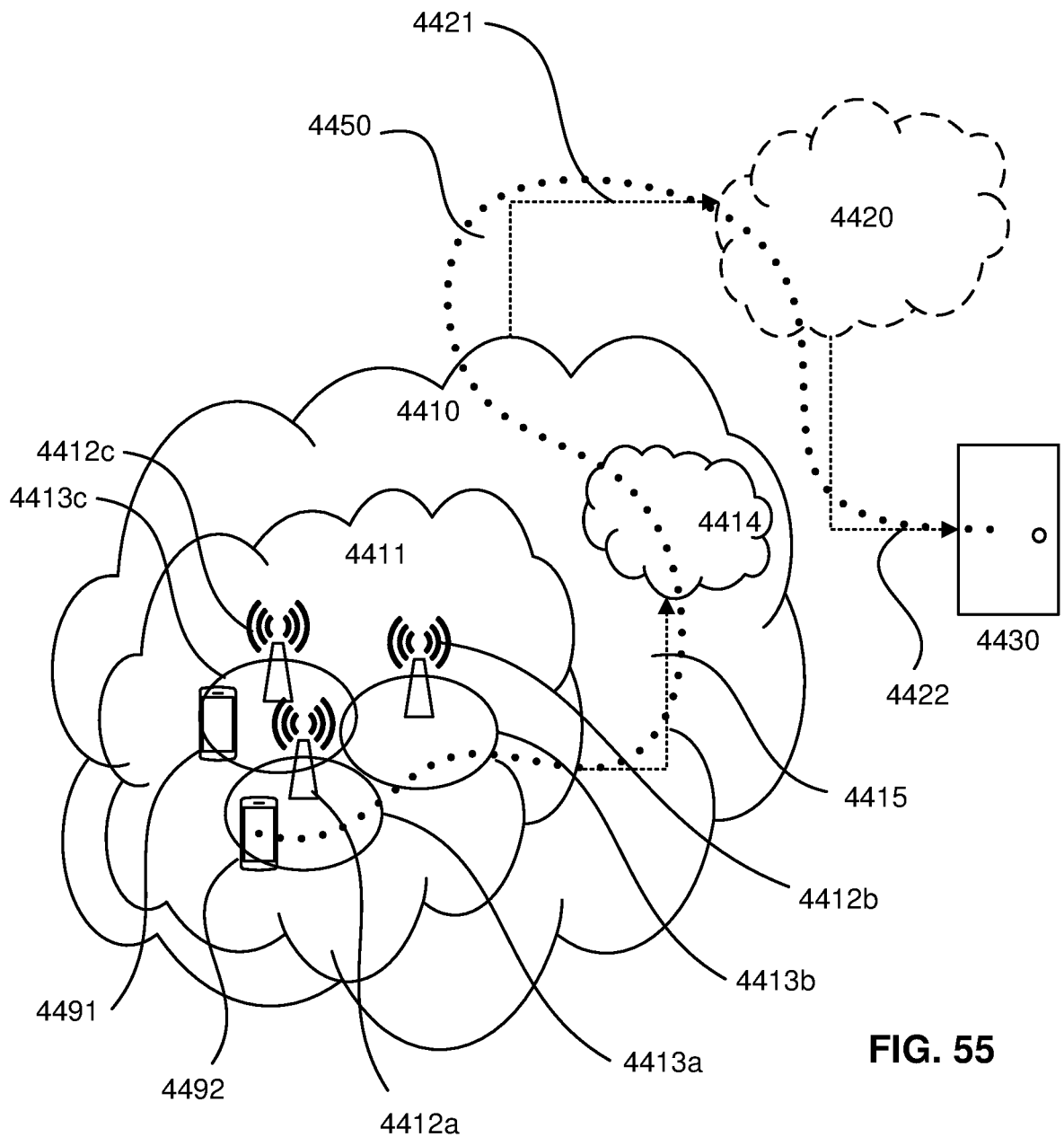
FIG. 55 is a block diagram of a telecommunication network connected via an intermediate network to a host computer in accordance with some embodiments.

FIG. 55 illustrates a telecommunication network connected via an intermediate network to a host computer in accordance with some embodiments.

With reference to FIG. 55, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 55 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 56:
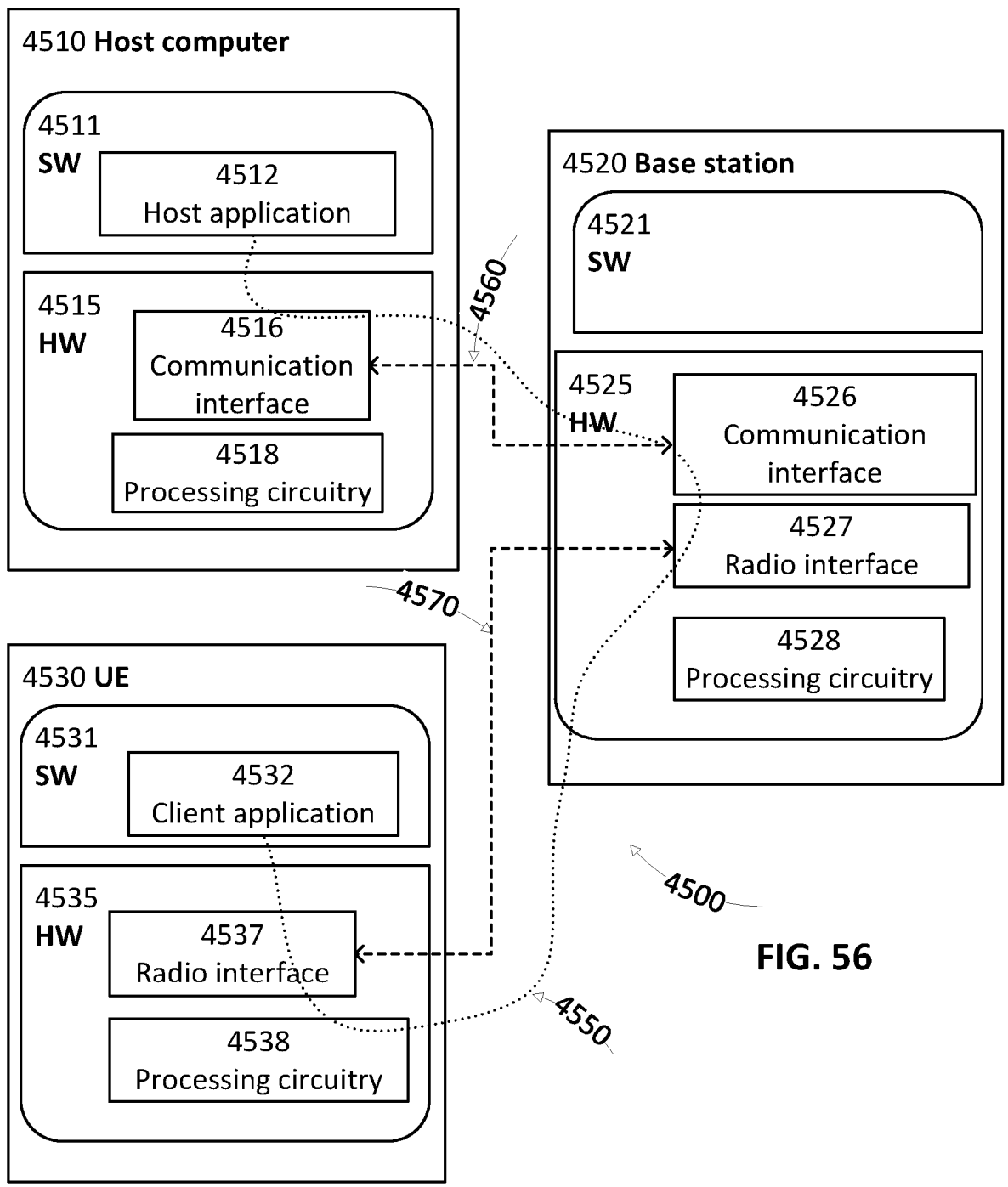
FIG. 56 is a block diagram of a host computer communicating via a base station with a user equipment over a partially wireless connection in accordance with some embodiments.

FIG. 56 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 56. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518.

Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 56) served by base station 4520. Communication interface 4526 may be configured to facilitate connection 4560 to host computer 4510. Connection 4560 may be direct or it may pass through a core network (not shown in FIG. 56) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 56 may be similar or identical to host computer 4430, one of base stations 4412*a*, 4412*b*, 4412*c* and one of UEs 4491, 4492 of FIG. 55, respectively. This is to say, the inner workings of these entities may be as shown in FIG. 56 and independently, the surrounding network topology may be that of FIG. 55.

In FIG. 56, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 57:
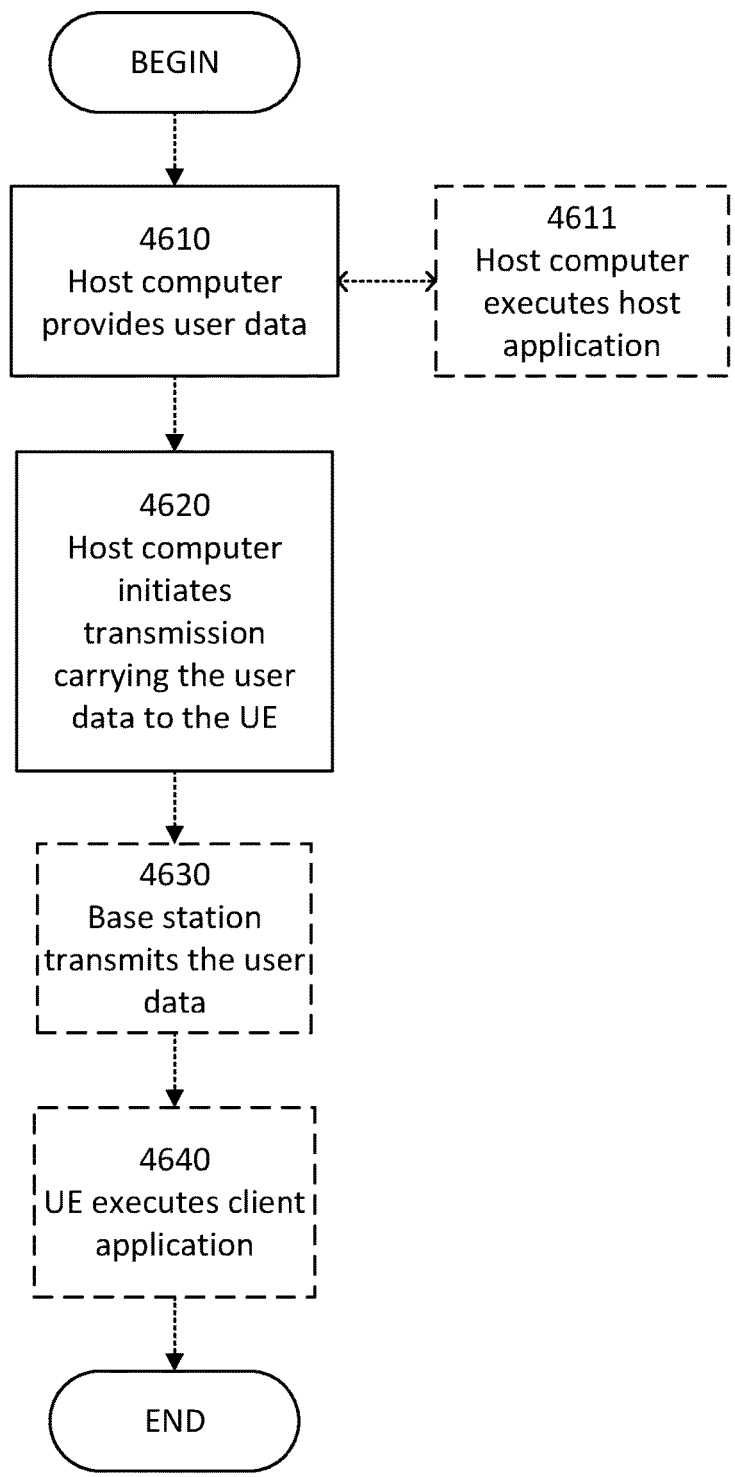
FIG. 57 is a block diagram of methods implemented in a communication system including a host computer, a base station and a user equipment in accordance with some embodiments.

FIG. 57 illustrates methods implemented in a communication system including a host computer, a base station and a user equipment in accordance with some embodiments.

FIG. 57 is a flowchart illustrating a method implemented in a communication system, in accordance with one embodiment. The communication system includes a host computer, a base station and a UE which may be those described with reference to FIGS. 55 and 56. For simplicity of the present disclosure, only drawing references to FIG. 57 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 58:
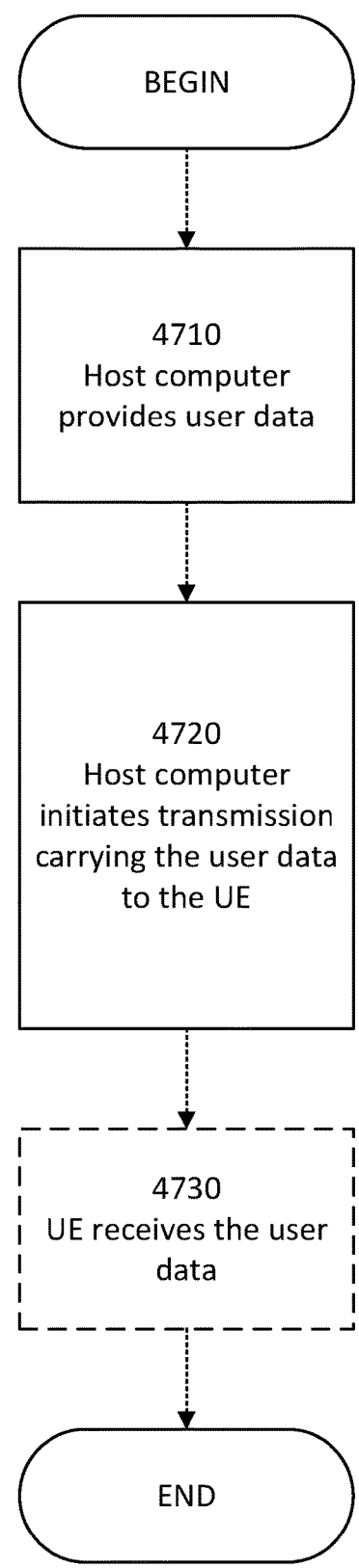
FIG. 58 is a block diagram of methods implemented in a communication system including a host computer, a base station and a user equipment in accordance with some embodiments.

FIG. 58 illustrates methods implemented in a communication system including a host computer, a base station and a user equipment in accordance with some embodiments.

FIG. 58 is a flowchart illustrating a method implemented in a communication system, in accordance with one embodiment. The communication system includes a host computer, a base station and a UE which may be those described with reference to FIGS. 55 and 56. For simplicity of the present disclosure, only drawing references to FIG. 58 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

FIG. 59 illustrates methods implemented in a communication system including a host computer, a base station and a user equipment in accordance with some embodiments FIG. 59 is a flowchart illustrating a method implemented in a communication system, in accordance with one embodiment. The communication system includes a host computer, a base station and a UE which may be those described with reference to FIGS. 55 and 56. For simplicity of the present disclosure, only drawing references to FIG. 59 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 60 illustrates methods implemented in a communication system including a host computer, a base station and a user equipment in accordance with some embodiments FIG. 60 is a flowchart illustrating a method implemented in a communication system, in accordance with one embodiment. The communication system includes a host computer, a base station and a UE which may be those described with reference to FIGS. 55 and 56. For simplicity of the present disclosure, only drawing references to FIG. 60 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a first network node in a network comprising a second network node, the method comprising:
   responsive to detecting a capacity issue and/or a coverage issue, transmitting a configuration update request message to the second network node, the configuration update request message comprising an indication of a requested configuration change for the second network node, wherein the indication of the requested configuration change for the second network node comprises at least one of an indication to contract a coverage area of a serving cell and/or reference signal (RS) beam of the second network node, an indication to expand the coverage area of the serving cell and/or RS beam of the second network node, an indication to merge coverage areas of at least two serving cells and/or RS beams of the second network node, or an indication to split the coverage area of the serving cell and/or RS beam of the second network node; and
   receiving a configuration update message from the second network node, the configuration update message comprising an indication of a configuration update selected by the second network node.

2. The method of claim 1, wherein the configuration update request message comprises a coverage and capacity optimization (CCO) change request message,
   wherein the indication of the requested configuration change for the second network node comprises an indication of a requested configuration change for the second network node to address the capacity issue and/or the coverage issue,
   wherein the configuration update message comprises a CCO change message, and
   wherein the indication of the configuration update selected by the second network node comprises an indication of a configuration update selected by the second network node to address the capacity issue and/or the coverage issue.

3. The method of claim 1, wherein the indication of the requested configuration change for the second network node indicates at least one serving cell of the second network node associated with the requested configuration change, and/or
   wherein the indication of the requested configuration change for the second network node indicates at least one reference signal, RS, beam coverage area of the second network node associated with the requested configuration change.

4. The method of claim 1, wherein the configuration update request message comprises:
an indication of at least one serving cell of the first network node associated with a configuration change at the first network node, and/or
an indication of at least one reference signal, RS, beam coverage area of the first network node associated with a configuration change at the first network node.

5. The method of claim 1, wherein the configuration update request message further comprises at least one of an indication of a capacity issue, an indication of a coverage issue, an indication of a cell/beam edge movement, and/or an indication of an uplink/downlink coverage disparity.

6. The method of claim 1, wherein the configuration update request message further comprises an identity of a serving cell of the first network node and/or an identity of a reference signal (RS) beam of the serving cell of the first network node, and
wherein the serving cell and/or the RS beam of the first network node is involved with the capacity issue and/or the coverage issue.

7. The method of claim 1, wherein the configuration update request message further comprises an identity of a serving cell of the second network node and/or an identity of a reference signal (RS) beam of the serving cell of the second network node, and
wherein the serving cell and/or the RS beam of the second network node is involved with the capacity issue and/or the coverage issue.

8. The method of claim 1, wherein the configuration update request message further comprises at least one of:
an identity of at least one user equipment (UE) or UE group;
a UE measurement report associated with the first network node; and
a UE measurement report associated with the second network node.

9. The method of claim 1, wherein the first network node comprises one of a next generation (NG) radio access network, RAN, node (gNB) and a long term evolution (LTE) RAN node (eNB),
wherein the second network node comprises one of an NG RAN node and an LTE RAN node, and
wherein the configuration update request message and the configuration update message are transmitted over at least one of an Xn interface and/or an X2 interface.

10. A method of operating a second network node in a network comprising a first network node, the method comprising:
subsequent to a capacity issue and/or a coverage issue, receiving a configuration update request message from the first network node, the configuration update request message comprising an indication of a requested configuration change for the second network node, wherein the indication of the requested configuration change for the second network node comprises at least one of an indication to contract a coverage area of a serving cell and/or reference signal (RS) beam of the second network node, an indication to expand the coverage area of the serving cell and/or RS beam of the second network node, an indication to merge coverage areas of at least two serving cells and/or RS beams of the second network node, or an indication to split the coverage area of the serving cell and/or RS beam of the second network node;
responsive to receiving the configuration update request message, selecting a configuration update to be applied by the second network node; and
transmitting a configuration update message to the first network node, the configuration update message comprising an indication of the configuration update selected by the second network node.

11. The method of claim 10, wherein the configuration update request message comprises a coverage and capacity optimization (CCO) change request message,
wherein the indication of the requested configuration change for the second network node comprises the indication of the requested configuration change for the second network node to address the capacity issue and/or the coverage issue,
wherein the configuration update message comprises a CCO change message, and
wherein the indication of the configuration update selected by the second network node comprises the indication of a configuration update selected by the second network node to address the capacity issue and/or the coverage issue.

12. The method of claim 10, wherein the indication of the requested configuration change for the second network node indicates at least one serving cell of the second network node associated with the requested configuration change, and/or
wherein the indication of the requested configuration change for the second network node indicates at least one reference signal (RS) beam coverage area of the second network node associated with the requested configuration change.

13. The method of claim 10, wherein the configuration update request message comprises:
an indication of at least one serving cell of the first network node associated with a configuration change at the first network node, and/or
an indication of at least one reference signal (RS) beam coverage area of the first network node associated with a configuration change at the first network node.

14. The method of claim 10, wherein the configuration update request message further comprises at least one of an indication of the capacity issue, an indication of the coverage issue, an indication of a cell/beam edge movement, and/or an indication of an uplink/downlink coverage disparity.

15. The method of claim 10, wherein the configuration update request message further comprises an identity of a serving cell of the first network node and/or an identity of a reference signal (RS) beam of a serving cell of the first network node, and
wherein the serving cell and/or the RS beam of the first network node is involved with the capacity issue and/or the coverage issue.

16. The method of claim 10, wherein the configuration update request message further comprises an identity of a serving cell of the second network node and/or an identity of a reference signal (RS) beam of a serving cell of the second network node, and
wherein the serving cell and/or the RS beam of the second network node is involved with the capacity issue and/or the coverage issue.

17. A first network node configured to:
transmit a configuration update request message to a second network node, the configuration update request message comprises an indication of a requested configuration change for the second network node, wherein the indication of the requested configuration change for the second network node comprises at least one of an indication to contract a coverage area of a serving cell and/or reference signal (RS) beam of the second network node, an indication to expand the coverage area of the serving cell and/or RS beam of the second network node, an indication to merge coverage areas of at least two serving cells and/or RS beams of the second network node, or an indication to split the coverage area of the serving cell and/or RS beam of the second network node; and
receive a configuration update message from the second network node, the configuration update message comprises an indication of a configuration update selected by the second network node.

18. The first network node of claim 17, wherein the configuration update request message comprises a coverage and capacity optimization (CCO) change request message,
wherein the indication of the requested configuration change for the second network node comprises the indication of the requested configuration change for the second network node to address a capacity issue and/or a coverage issue,
wherein the configuration update message comprises a CCO change message, and
wherein the indication of the configuration update selected by the second network node comprises the indication of the configuration update selected by the second network node to address the capacity issue and/or the coverage issue.

19. A second network node configured to:
receive a configuration update request message from a first network node, the configuration update request message comprises an indication of a requested configuration change for the second network node, wherein the indication of the requested configuration change for the second network node comprises at least one of an indication to contract a coverage area of a serving cell and/or reference signal (RS) beam of the second network node, an indication to expand the coverage area of the serving cell and/or RS beam of the second network node, an indication to merge coverage areas of at least two serving cells and/or RS beams of the second network node, or an indication to split the coverage area of the serving cell and/or RS beam of the second network node;
select a configuration update to be applied by the second network node; and
transmit a configuration update message to the first network node, the configuration update message comprises an indication of the configuration update selected by the second network node.

20. The second network node of claim 19,
wherein the configuration update request message comprises a coverage and capacity optimization (CCO) change request message,
wherein the indication of the requested configuration change for the second network node comprises the indication of the requested configuration change for the second network node to address a capacity issue and/or a coverage issue,
wherein the configuration update message comprises a CCO change message, and
wherein the indication of the configuration update selected by the second network node comprises the indication of the configuration update selected by the second network node to address the capacity issue and/or the coverage issue.

* * * * *